(12) United States Patent
Wyatt et al.

(10) Patent No.: US 10,439,192 B2
(45) Date of Patent: Oct. 8, 2019

(54) ARCHITECTURES FOR BATTERIES HAVING TWO DIFFERENT CHEMISTRIES

(71) Applicant: CPS Technology Holdings LLC, New York, NY (US)

(72) Inventors: Perry M. Wyatt, Fox Point, WI (US); Daniel B. Le, Grafton, WI (US); Ryan S. Mascarenhas, Milwaukee, WI (US); Brian C. Sisk, Mequon, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 16/113,623

(22) Filed: Aug. 27, 2018

(65) Prior Publication Data

US 2018/0366712 A1 Dec. 20, 2018

Related U.S. Application Data

(63) Continuation of application No. 15/389,772, filed on Dec. 23, 2016, now Pat. No. 10,062,892, which is a
(Continued)

(51) Int. Cl.
*H02J 7/00* (2006.01)
*H01M 2/20* (2006.01)
(Continued)

(52) U.S. Cl.
CPC ............... *H01M 2/206* (2013.01); *B60L 7/16* (2013.01); *B60L 58/20* (2019.02); *B60R 16/033* (2013.01);
(Continued)

(58) Field of Classification Search
CPC .................................. H01M 2/206; B60L 7/16
(Continued)

(56) References Cited

U.S. PATENT DOCUMENTS 5,194,799 A 3/1993 Tomantschger
6,229,279 B1 5/2001 Dierker
(Continued)

FOREIGN PATENT DOCUMENTS

CA 2380957 A1 10/2003
CN 102290856 A 12/2011
(Continued)

*Primary Examiner* — Suchin Parihar
(74) *Attorney, Agent, or Firm* — Boardman & Clark LLP

(57) ABSTRACT

A 12 volt automotive battery system includes a first battery coupled to an electrical system, in which the first battery include a first battery chemistry, and a second battery coupled in parallel with the first battery and selectively coupled to the electrical system via a first switch, in which the second battery includes a second battery chemistry that has a higher coulombic efficiency than the first battery chemistry. The first switch couples the second battery to the electrical system during regenerative braking to enable the second battery to capture a majority of the power generated during regenerative braking. The 12 volt automotive battery system further includes a variable voltage alternator that outputs a first voltage during regenerative braking to charge the second battery and a second voltage otherwise, in which the first voltage is higher than the second voltage.

20 Claims, 19 Drawing Sheets

Related U.S. Application Data continuation of application No. 14/161,858, filed on Jan. 23, 2014, now Pat. No. 9,527,402.

(60) Provisional application No. 61/860,448, filed on Jul. 31, 2013.

(51) Int. Cl.

| | |
|---|---|
| *H01M 2/06* | (2006.01) |
| *H01M 10/06* | (2006.01) |
| *H01M 10/052* | (2010.01) |
| *B60L 7/16* | (2006.01) |
| *B60R 16/033* | (2006.01) |
| *H01M 10/0525* | (2010.01) |
| *B60L 58/20* | (2019.01) |

(52) U.S. Cl.
CPC ............ *H01M 2/06* (2013.01); *H01M 10/052* (2013.01); *H01M 10/0525* (2013.01); *H01M 10/06* (2013.01); *H01M 2220/20* (2013.01); *Y02T 10/7005* (2013.01); *Y02T 10/7066* (2013.01)

(58) Field of Classification Search
USPC ........................................................ 320/109
See application file for complete search history.

(56) References Cited

U.S. PATENT DOCUMENTS

| | | |
|---|---|---|
| 6,275,001 B1 | 8/2001 | Dierker |
| 6,331,365 B1 | 12/2001 | King |
| 7,049,792 B2 | 5/2006 | King |
| 7,336,002 B2 | 2/2008 | Kato et al. |
| 7,489,048 B2 | 2/2009 | King et al. |
| 7,869,913 B2 | 1/2011 | Aoyama et al. |
| 8,022,663 B2 | 9/2011 | Davis et al. |
| 8,093,862 B2 | 1/2012 | Mariels |
| 8,288,995 B2 | 10/2012 | Jimbo et al. |
| RE43,956 E * | 2/2013 | King ................ H02J 7/0024 307/10.1 |
| 8,381,852 B2 | 2/2013 | Zolman et al. |
| 8,384,343 B2 | 2/2013 | Kojori et al. |
| 8,392,030 B2 | 3/2013 | Anderson et al. |
| 8,471,521 B2 | 6/2013 | Stewart et al. |
| 8,534,400 B2 | 9/2013 | Stanek et al. |
| 2007/0029124 A1 | 2/2007 | Dasgupta et al. |
| 2007/0219670 A1* | 9/2007 | Tanaka ................ H01M 10/482 700/295 |
| 2008/0113226 A1 | 5/2008 | Dasgupta et al. |
| 2009/0127930 A1 | 5/2009 | Senda |
| 2009/0212626 A1* | 8/2009 | Snyder .................. B60K 6/448 307/10.1 |
| 2009/0243387 A1 | 10/2009 | Conen |
| 2011/0001352 A1* | 1/2011 | Tamura ................. B60R 16/033 307/9.1 |
| 2011/0012553 A1 | 1/2011 | Sloan et al. |
| 2011/0089904 A1* | 4/2011 | Ward ...................... B60L 8/003 320/126 |
| 2011/0170318 A1* | 7/2011 | Chen ...................... B60L 50/61 363/16 |
| 2011/0244346 A1* | 10/2011 | Chowdhury ...... H01M 8/04298 429/429 |
| 2012/0112688 A1 | 5/2012 | Ho |
| 2012/0235642 A1 | 9/2012 | Mao et al. |
| 2013/0018548 A1 | 1/2013 | Shimasaki et al. |
| 2013/0026822 A1* | 1/2013 | Chao ..................... B60L 58/18 307/9.1 |
| 2013/0033102 A1 | 2/2013 | Goff et al. |
| 2013/0082639 A1 | 4/2013 | O'Kane et al. |
| 2013/0116889 A1 | 5/2013 | Zhang et al. |
| 2013/0141045 A1 | 6/2013 | Karim et al. |
| 2013/0181516 A1 | 7/2013 | Phan |
| 2013/0264875 A1 | 10/2013 | Kaminsky et al. |
| 2013/0269921 A1 | 10/2013 | Kusumi et al. |
| 2014/0111121 A1* | 4/2014 | Wu ........................ B60L 58/20 318/139 |
| 2015/0035356 A1 | 2/2015 | Sakata |
| 2015/0046013 A1 | 2/2015 | Kim et al. |
| 2015/0202983 A1* | 7/2015 | Le ...................... H01M 10/441 320/109 |
| 2015/0202985 A1* | 7/2015 | Le ........................... B60L 50/64 307/9.1 |

FOREIGN PATENT DOCUMENTS

| | | |
|---|---|---|
| CN | 101888001 B | 7/2012 |
| JP | 2011015516 A | 1/2011 |
| WO | 2003088375 A3 | 3/2004 |
| WO | 2010091583 A1 | 8/2010 |
| WO | 2012048478 A1 | 4/2012 |

* cited by examiner

ARCHITECTURES FOR BATTERIES HAVING TWO DIFFERENT CHEMISTRIES

CROSS-REFERENCE TO RELATED APPLICATIONS

Under 35 U.S.C. § 120, this application is a continuation of U.S. patent application Ser. No. 15/389,772 filed Dec. 23, 2016, which is a continuation of U.S. patent application Ser. No. No. 14/161,858 filed Jan. 23, 2014, which claims priority from and benefit of U.S. Provisional Application No. 61/860,448 filed Jul. 31, 2013, each of which is incorporated herein by reference in their entireties for all purposes.

BACKGROUND

The present disclosure relates generally to the field of batteries and battery systems. More specifically, the present disclosure relates to battery systems that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Vehicles generally use one or more battery systems to power features in the vehicle including the air conditioning, radio, alarm system, and other electronics. To reduce the amount of undesirable emissions products and improve the fuel efficiency of vehicles, improvements have been made to vehicle technologies. For example, some vehicles, such as a micro-hybrid vehicle, may disable the internal combustion engine when the vehicle is idling and utilize a battery system to continue powering the electronics as well as restarting (e.g., cranking) the engine when propulsion is desired. As used herein, the ability to disable the engine and restart the engine when a vehicle is idling is referred to as an "auto-stop" operation. Additionally, some vehicles may utilize techniques, such as regenerative braking, to generate and store electrical power as the vehicle decelerates or coasts. More specifically, as vehicle reduces in speed, a regenerative braking system may convert mechanical energy into electrical energy, which may then be stored and/or used to power to the vehicle.

Thus, as vehicle technologies (e.g., auto-stop and regenerative braking technology) continue to evolve, there is a need to provide improved power sources (e.g., battery systems or modules) for such vehicles. For example, it may be beneficial to improve the power storage and power distribution efficiency for such power sources.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure relates to batteries and battery systems. More specifically, the present disclosure relates to various electrochemical and electrostatic energy storage technologies (e.g. lead-acid batteries, nickel-zinc batteries, nickel-metal hydride batteries, and lithium batteries). Particular embodiments are directed to dual chemistry battery modules that may be used in vehicular contexts (e.g., micro-hybrid vehicles) as well as other energy storage/expending applications (e.g., energy storage for an electrical grid).

More specifically, the dual chemistry battery modules may include a first battery utilizing a first battery chemistry and a second battery utilizing a second battery chemistry. The first battery and the second battery may be connected in various parallel architectures, such as passive, semi-passive, switch passive, semi-active, or active architectures. For example, in a passive architecture the first battery and the second battery may be directly coupled to the terminals of the battery module. To increase the amount of control over the battery module, in a semi-passive architecture, a switch may be included between either the first battery or the second battery and the terminals of the battery module. The switch may then be opened/closed to selectively connect either the first battery or the second battery. In a switch passive architecture, switches may be included between both the first battery and the second battery and the terminals of the battery module. Thus, the switches enable both the first battery and the second battery to be controlled relatively independently. In a semi-active architecture, a DC/DC converter may be included between either the first battery or the second battery and the terminals of the battery module. The DC/DC converter may function to selectively connect either the first battery or the second battery and to enable the use of a constant voltage alternator. In an active architecture, DC/DC converters may be included between both the first battery and the second battery and the terminals of the battery module. The DC/DC converters enable both the first battery and the second battery to be controlled relatively independently and the use of a constant voltage alternator.

Additionally, the battery chemistries used in the first battery and the second battery may be selected based on desired characteristics for each. For example, the first battery may utilize a lead-acid chemistry to supply large surges of current, which may be utilized to start (e.g., crank) an internal combustion engine. The second battery may utilize various battery chemistries (e.g., nickel manganese cobalt oxide, lithium manganese oxide/nickel manganese cobalt oxide, or lithium manganese oxide/lithium titanate) with a higher coulombic efficiency and/or a higher charge power acceptance rate (e.g., higher maximum charging voltage or charging current) than the first battery. As used herein, "coulombic efficiency" and "charge power acceptance rate" may be used interchangeably to describe charging efficiency. In other words, the second battery may be recharged more efficiently and at a faster rate, for example while capturing regenerative power. Accordingly, in some embodiments, the first battery may be the primary source of electrical power and the second battery may supplement the first battery, for example by capturing, storing, and distributing regenerative power.

Accordingly, in a first embodiment, a battery system includes a first battery coupled directly to an electrical system, in which the first battery includes a first battery chemistry, and a second battery coupled directly to the electrical system in parallel with the first battery, in which second battery includes a second battery chemistry that has a higher coulombic efficiency than the first battery chemistry. The second battery is configured to capture a majority of regenerative power generated during regenerative braking, and to supply the captured regenerative power to power the electrical system by itself or in combination with the first battery.

In another embodiment, a battery system includes a first battery coupled to an electrical system, in which the first battery includes a first battery chemistry, and a second battery selectively coupled to the electrical system via a switch and in parallel with the first battery, in which the second battery includes a second battery chemistry that has a higher coulombic efficiency than the first battery chemistry. The switch is configured to couple the second battery to the electrical system to enable the second battery to capture a majority of regenerative power generated during regenerative braking and to enable the second battery to supply the regenerative power to power the electrical system by itself or in combination with the first battery.

In another embodiment, a battery system includes a first battery selectively coupled to an electrical system via a switch, in which the first battery includes a first battery chemistry, and a second battery directly coupled to the electrical system in parallel with the first battery, in which the second battery includes a second battery chemistry that has a higher charge power acceptance rate than the first battery chemistry. The switch is configured to disconnect the first battery from the electrical system to enable the second battery to be charged at a voltage higher than the first battery maximum charging voltage during regenerative braking.

In another embodiment, a battery system includes a first battery coupled to an electrical system, in which the first battery includes a first battery chemistry, and a second battery selectively coupled to the electrical system via a DC/DC converter and in parallel with the first battery, in which the second battery includes a second battery chemistry that has a higher coulombic efficiency and/or a higher charge power acceptance rate than the first battery chemistry. The DC/DC converter is configured to couple the second battery to the electrical system to enable the second battery to capture a majority of regenerative power generated during regenerative braking and to enable the second battery to supply the regenerative power to power the electrical system by itself or in combination with the first battery.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
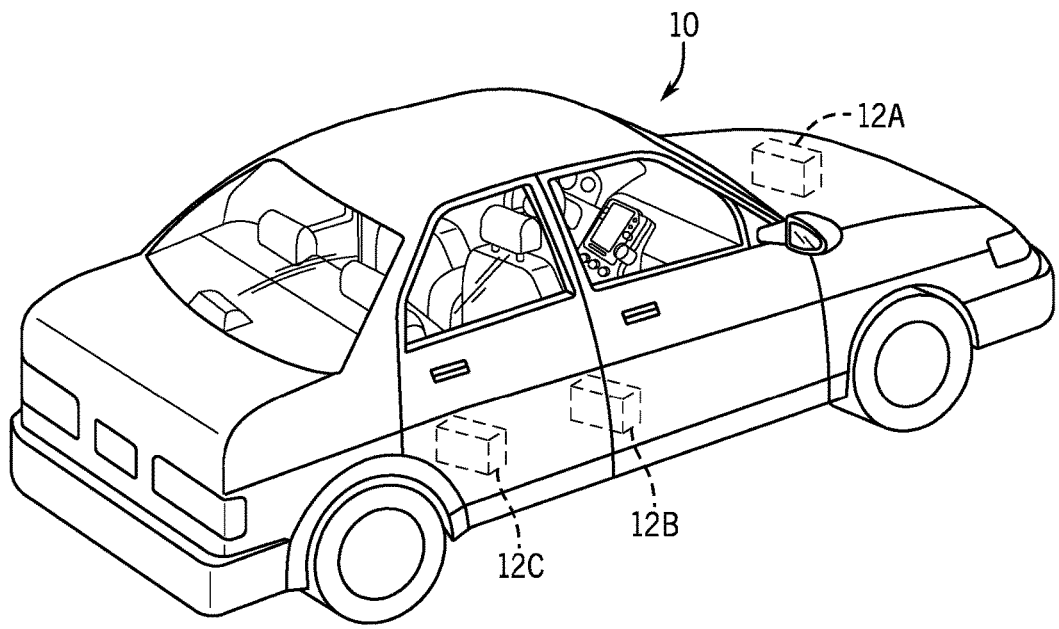
FIG. 1 is a perspective view of a vehicle (e.g., a micro-hybrid vehicle), in accordance with an embodiment of the present approach.

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, vehicle technology has improved to increase fuel economy and/or reduce undesirable emissions compared to more traditional gas-powered vehicles. For example, micro-hybrid vehicles disable the vehicle's internal combustion engine when the vehicle is idling. While the vehicle's internal combustion engine is disabled, the battery system may continue supplying power to the vehicle's electrical system, which may include the vehicle's radio, air conditioning, electronic control units, and the like. Additionally, regenerative braking vehicles capture and store electrical power generated when the vehicle is braking or coasting. In some embodiments, the generated electrical power may then be utilized to supply power to the vehicle's electrical system. In other embodiments, the generated electrical power may be utilized to stabilize voltage during high demand, for example in regenerative storage systems.

Based on the advantages over traditional gas-power vehicles, manufactures, which generally produce traditional gas-powered vehicles, may desire to utilize improved vehicle technologies (e.g., micro-hybrid technology or regenerative braking technology) within their vehicle lines. These manufactures often utilize one of their traditional vehicle platforms as a starting point. Generally, traditional gas-powered vehicles are designed to utilize 12 volt battery systems (e.g., voltage between 7-18 volts), such as a single 12 volt lead-acid battery. Accordingly, the single lead-acid battery may be adapted for the improved vehicle technologies. For example, the lead-acid battery may be utilized to capture and store regenerative power and/or supply power to the electrical system during auto-stop. However, in some embodiments, a lead-acid battery may be less efficient at capturing regenerative electrical power due to the lower coulombic efficiency and/or lower charge power acceptance rate associated with the lead-acid battery chemistry. As used herein, "coulombic efficiency" and "charge power acceptance rate" may be used interchangeably to describe charging efficiency and charging rate. Additionally, the lead-acid battery capacity may be increased to account for the electrical power demand during auto-stop, which may increase cost. As such, it would be beneficial to improve the efficiency of the power storage in the battery system and the efficiency of the power distribution to the vehicle's electrical system while largely conforming with existing vehicle electrical systems.

Accordingly, present embodiments include physical battery system features, and so forth, that facilitate providing improved 12 volt battery systems. As used herein, a "12 volt battery system" is intended to describe a battery system that supplies between 7-18 volts to an electrical system. For example, in some embodiments, the battery module may include multiple differing battery chemistries to improve the storage and distribution efficiency of the battery module. More specifically, as will be described in more detail below, the battery module may include a first battery (e.g., primary battery) with a first battery chemistry and a second battery (e.g., secondary battery) with a second battery chemistry. As used herein, "battery" is intended describe energy storage devices that utilize various chemical reactions to store and/or distribute electrical power. In some embodiments, the first battery and the second battery may operate in tandem. For example, the first (e.g., primary) battery may efficiently supply large amounts of current, for example to crank the internal combustion engine, and the second battery (e.g., power device) may efficiently capture and store power generated due to its higher coulombic efficiency and/or higher power charge acceptance rate. Additionally, the power stored in the second battery may be expended to provide power to the vehicle's electrical system. In other words, the first battery may be the primary source of electrical power and the second battery may supplement the battery, which in some embodiments may enable the storage capacity and/or the overall physical dimensions of the battery module to be reduced.

To facilitate supplementing the first battery with the second battery, the first battery and the second battery may be connected in various parallel architectures. For example, the battery module may utilize a passive architecture, a semi-passive architecture, a switch passive architecture, a semi-active architecture, or an active architecture. As will be described in more detail below, in a passive architecture, the first battery and the second battery may be directly coupled to the terminals of the battery module, which may reduce the complexity of a control algorithm for the battery system. In a semi-passive architecture, one of the first battery and the second battery may be coupled to the terminals of the battery module via a switch while the other may be directly coupled. In some embodiments, the switch may increase the control over operation of the battery module by enabling either the first battery or the second battery to be selectively connected/disconnected. In a switch passive architecture, both the first battery and the second battery may be coupled to the terminals of the battery module via switches. In some embodiments, the switches may further increase the control over operation of the battery module by enabling both the first battery and the second battery to be controlled (e.g., connected/disconnected) relatively independently. In other embodiments, the switches may be replaced by DC/DC converters to enable the use of a constant voltage alternator. For example, in a semi-active architecture, one of the first battery or the second battery is coupled to the terminals of the battery module via a DC/DC converter. In an active architecture, both the first battery and the second battery may be coupled to the terminals of the battery module via DC/DC converters. In some embodiments, utilizing the techniques described herein may increase fuel economy and reduce undesirable emissions by 3-5% as compared to auto-stop technology utilizing traditional 12 volt battery systems (e.g., a single 12 volt lead-acid battery) because the load on the alternator is reduced by more efficiently capturing regenerative power.

With the foregoing in mind, FIG. 1 is a perspective view of an embodiment of a vehicle 10, such as a micro-hybrid vehicle. Although the following discussion is presented in relation to micro-hybrid vehicles, the techniques described herein may be applied to other vehicles including electrical-powered and gas-powered vehicles. As discussed above, it would be desirable for a battery system 12 to be largely compatible with traditional vehicle designs. Accordingly, the battery system 12 may be placed in a location in the micro-hybrid vehicle 10 that would have housed the traditional battery. For example, as illustrated, the micro-hybrid vehicle 10 may include the battery system 12A positioned similarly to a lead-acid battery of a typical combustion-engine vehicle (e.g., under the hood of the vehicle 10). By further example, in certain embodiments, the micro-hybrid vehicle 10 may include the battery system 12B positioned near a center of mass of the micro-hybrid vehicle 10, such as below the driver or passenger seat. By still further example, in certain embodiments, the micro-hybrid vehicle 10 may include the battery system 12C positioned below the rear passenger seat or near the trunk of the vehicle. It should be appreciated that, in certain embodiments, positioning a battery system 12 (e.g., battery system 12B or 12C) in or about the interior of the vehicle may enable the use of air from the interior of the vehicle to cool the battery system 12 (e.g., using a heat sink or a forced-air cooling design).

Figure 2:
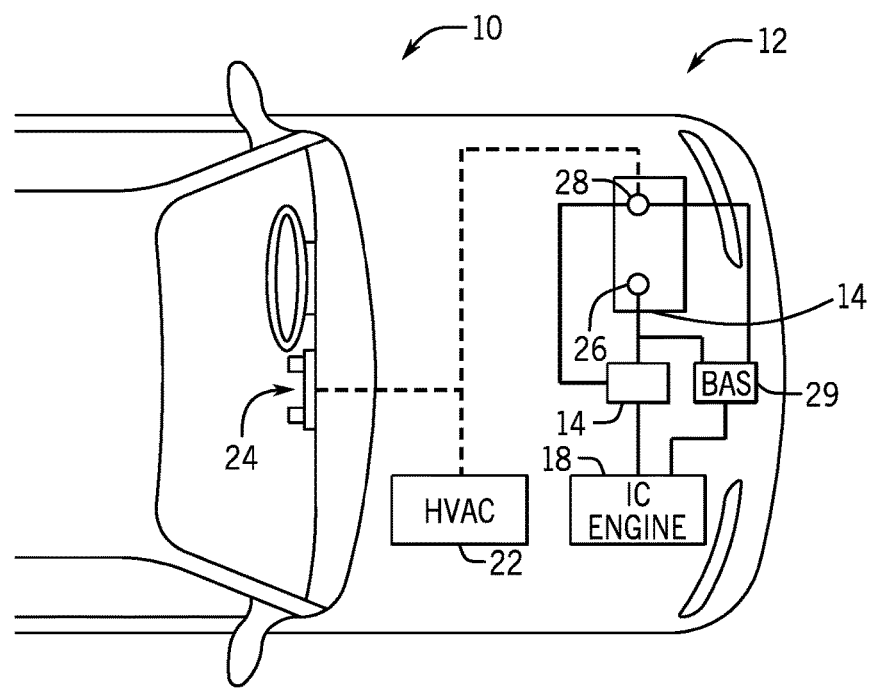
FIG. 2 is a schematic view of the vehicle depicted in FIG. 1 illustrating power distribution through the vehicle, in accordance with an embodiment of the present approach.

To simplify discussion of the battery system 12, the battery system 12 will be discussed in relation to the battery system 12A disposed under the hood of the vehicle 10, as depicted in FIG. 2. As depicted, the battery system 12 includes a battery module 14 coupled to an ignition system 16, an internal combustion engine 18, and a regenerative braking system 20. More specifically, the battery module 14 may supply power to the ignition system 16 to start (i.e., crank) the internal combustion engine 18. In some embodiments, the ignition system 16 may include a traditional starter and/or a belt starter generator (BSG). The regenerative braking system 20 may capture energy to charge the battery module 14. In some embodiments, the regenerative braking system 20 may include an alternator, such as a belt starter generator (BSG), one or more electric motors, to convert mechanical energy into electrical energy, and/or control components.

Furthermore, as described above, the battery system 12 may supply power to components of the vehicle's electrical system. For example, the battery system 12 may supply power to the radiator cooling fans, climate control system, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, the battery system 12 depicted in FIG. 2 supplies power to a heating, ventilation, and air conditioning (HVAC) system 22 and a vehicle console 24.

Figure 3:
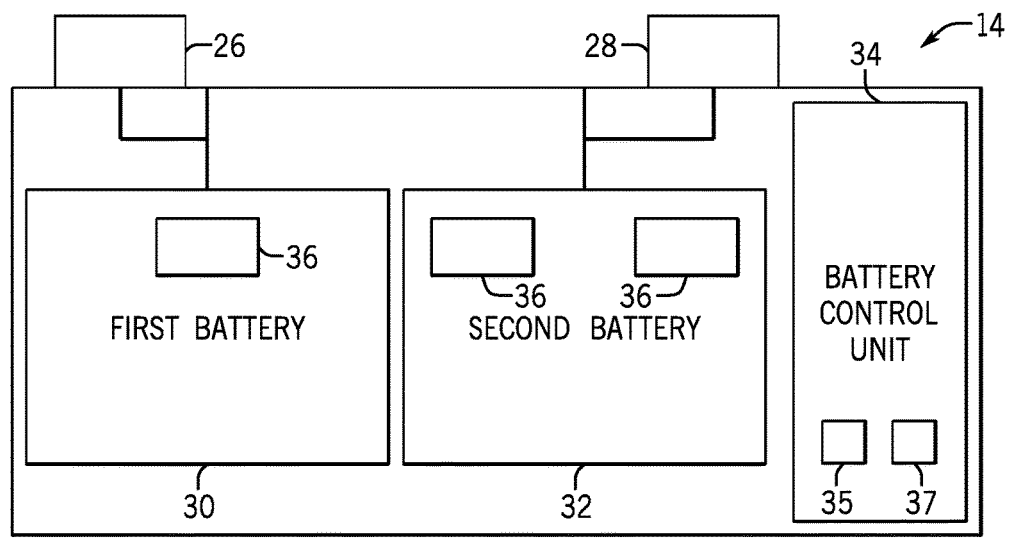
FIG. 3 is a schematic view of a battery system with a first battery and a second battery, in accordance with an embodiment of the present approach.

To facilitate supply of power from the battery system 12 to the various components in vehicle's electrical system (e.g., HVAC system 22 and vehicle console 24), the battery module 14 includes a first terminal 26 and a second terminal 28. In some embodiments, the second terminal 28 may provide a ground connection and the first terminal 26 may provide a positive voltage ranging between 7-18 volts. A more detailed view of an embodiment of a battery module 14 is depicted in FIG. 3. As previously noted, the battery module 14 may have dimensions comparable to those of a typical lead-acid battery to limit modifications to the vehicle 10 design to accommodate the battery system 12. For example, the battery module 14 may be of similar dimensions to an H6 battery, which may be approximately 13.9 inches×6.8 inches×7.5 inches. As depicted, the battery module 14 may be included within a single continuous housing. In other embodiments, the battery module 14 may include multiple housings coupled together (e.g., a first housing including the first battery and a second housing including the second battery).

As depicted, the battery module 14 includes the first terminal 26, the second terminal 28, a first battery (e.g., a lead acid battery) 30, a second battery 32, and a battery control unit 34. As used herein, the "battery control unit" generally refers to control components that control operation of the battery system 12, such as switches within the battery module or an alternator. The operation of the battery module 14 may be controlled by the battery control unit 34. For example, the battery control unit 34 may regulate (e.g., restrict or increase) power output of each battery in the battery module 14, perform load balancing between the batteries, control charging and discharging of the batteries (e.g., via switches or DC/DC converters), determine a state of charge of each battery and/or the entire battery module 14, activate an active cooling mechanism, and the like. Accordingly, the battery control unit 34 may include at least one memory 35 and at least one processor 37 programmed to execute control algorithms for performing such tasks. Additionally, as depicted, the battery control unit 34 may be included within the battery module 14. In other embodiments, the battery control unit 34 may be included separate from the battery module 14, such as a standalone module.

Furthermore, as depicted, the first battery 30 and the second battery 32 are connected in parallel across the first terminal 26 and the second terminal 28 to enable charging and discharging of the batteries. As described above, the battery terminals 26 and 28 may output the power stored in the battery module 14 to provide power to the vehicle's electrical system. Additionally, the battery terminals 26 and 28 may also input power to the battery module 14 to enable the first battery 30 and the second battery 32 to charge, for example, when the alternator generates electrical power through regenerative braking.

As depicted in FIG. 3, the first battery 30 and the second battery 32 are separate, which enables each to be configured based on desired characteristics, such as output voltage. For example, the output voltage of the first battery 30 and second battery 32 may depend on the configuration of battery cells 36 within each (e.g., in serial or parallel) and the battery chemistries selected. As will be described in more detail below, the configuration of battery cells and the battery chemistries selected may cause different voltage characteristics (e.g., non-voltage matched, partial voltage matched, or voltage matched). More specifically, the differing voltage characteristics may cause the first battery 30 and the second battery 32 to operate differently in the various architectures (e.g., passive, semi-passive, switch passive, semi-active, or active) described herein.

Examples of various chemistries that may be utilized for the first battery 30 and second battery 32 are described in Table 1 below. Table 1 is merely illustrative and is not intended as an exhaustive list of battery chemistries. Other battery chemistries that exhibit similar characteristics may also be utilized for the techniques described herein.

TABLE 1

| Battery Cell Chemistry Characteristics | | | | | | | |
|---|---|---|---|---|---|---|---|
| | | NMC | LTO/NMC | LTO/LMO | NiMH | NiZn | LFP | PbA |
| Nominal Voltage | V | 3.6-3.75 | 2.5 | 2.51 | 1.2 | 1.65 | 3.3 | 12 |
| Min Voltage | V | 2.4-3.0 | 2 | 1.5 | 1 | 1.1 | 2.5 | 8 |
| Max Voltage | V | 4.1-4.3 | 2.8 | 2.8 | 1.5 | 1.9 | 3.65 | 18 |
| Average Capacity (C rate, 20° C.) | Ah | 3.8-5.5 | 3.5 | 3.3 | 6.5 | 39-40 | 2.3 | 64-75 |

Table 1 describes the characteristics of a single lithium nickel manganese cobalt oxide (NMC), lithium-titanate/lithium nickel manganese cobalt oxide (LTO/NMC), lithium-titanate/lithium manganese oxide (LTO/LMO), nickel-metal hydride (NiMH), nickel-zinc (NiZn), lithium iron phosphate (LFP) battery cells. More specifically, NMC battery chemistry refers to a graphite anode with a lithium nickel manganese cobalt oxide cathode, the LTO/NMC battery chemistry refers to a lithium-titanate anode with a lithium manganese oxide cathode, the LTO/LMO battery chemistry refers to a lithium-titanate anode with a lithium manganese oxide cathode, and the LFP battery chemistry refers to a graphite anode with a lithium iron phosphate cathode. Additionally, Table 1 describes the characteristics of a 12-volt lead-acid (PbA) battery.

As described above, the battery chemistries utilized in the first battery 30 and the second battery 32 may be selected based on desired characteristics. In some embodiments, a battery chemistry selected for the second battery 32 may have a higher coulombic efficiency and/or a higher power charge acceptance rate (e.g., higher maximum charge current or charge voltage) to improve the capture, storage, and/or distribution efficiency of the battery system 12. For example, the NMC battery chemistry due to its higher maximum charging voltage (e.g., 16.8 volts when four in series) and its higher maximum charging current (e.g., 200 A) may be selected to reduce the recharge time of the second battery 32. As used herein, "maximum charging voltage" is intended to describe a voltage above which may negatively affect the battery. Illustratively, the maximum charging voltage of a lead-acid battery may be 14.8 volts because when charged at a higher voltage (e.g., 16.8 volts) the lead-acid battery may begin gassing (e.g., producing hydrogen gas and/or oxygen gas), which may negatively affect the lifespan of the lead-acid battery. Furthermore, the chemistry selected for the first battery 30 may have a high energy density (e.g., lead-acid) and the chemistry selected for the secondary battery (e.g., power device) may have a high power density.

Moreover, as described above, the battery cells 36 may be arranged (e.g., in serial or parallel) to achieve desired characteristics. For example, when four NMC battery cells are arranged in series, the resulting nominal voltage is 14.63 volts, which corresponds with the NMC voltage curve 38 depicted in FIG. 4. More specifically, FIG. 4 is an XY plot that describes the voltage of a first battery 30 or second battery 32, utilizing various battery chemistries, over the battery's total state of charge range (e.g., from 0% state of charge to 100% state of charge), in which state of charge is shown on the X-axis and voltage is shown on the Y-axis.

Figure 4:
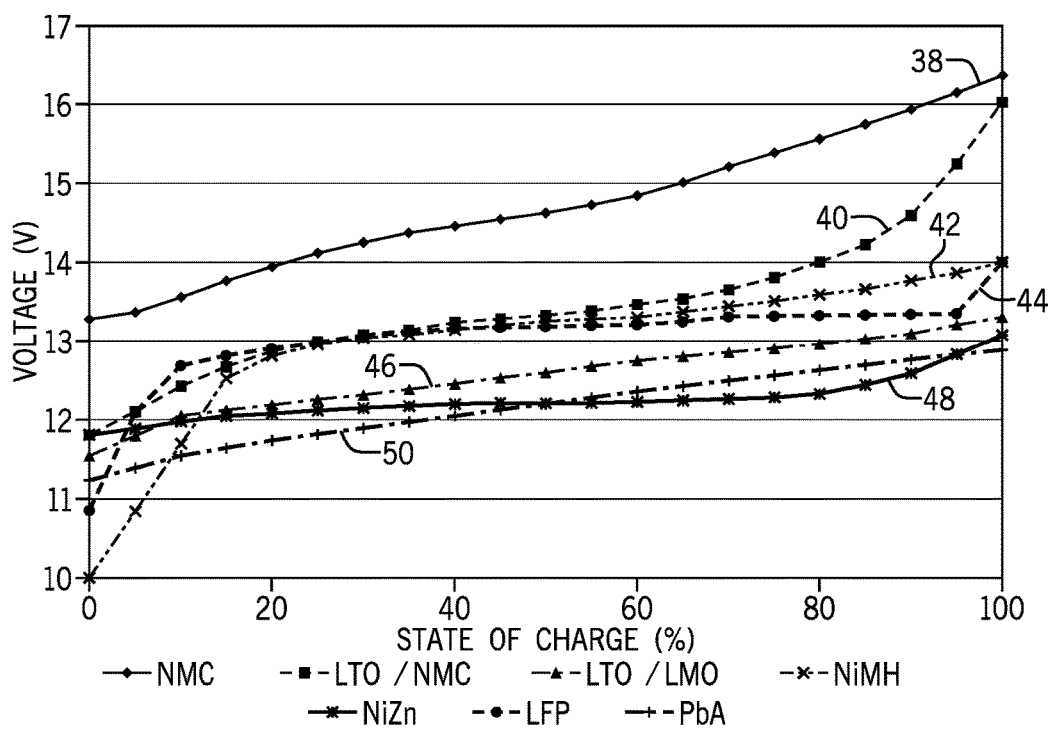
FIG. 4 is a graph illustrating voltage characteristics for various battery chemistries, in accordance with an embodiment of the present approach.

In addition to describing the voltage characteristics for an NMC battery, FIG. 4 also describes the open circuit (e.g., static) voltage characteristics (e.g., open circuit voltage ranges) for the above described battery chemistries. More specifically, FIG. 4 also depicts a LTO/NMC voltage curve 40, a NiMH voltage curve 42, a LFP voltage curve 44, a LTO/LMO voltage curve 46, a NiZn voltage curve 48, and a PbA voltage curve 50. As discussed above, battery cells 36 (e.g., a NMC battery cell, a LTO/LMO battery cell, or a LTO/NMC battery cell) may be arranged within each battery 30 or 32 to have characteristics corresponding with the curves (e.g., NMC voltage curve 38, LTO/NMC voltage curve 40, or LTO/LMO voltage curve 46) depicted in FIG. 4. Additionally, because voltages range between 8-17 volts, a dual chemistry battery module utilizing the battery chemistries described in FIG. 4 may generally conform with a 12 volt battery system. In other words, the dual chemistry battery module may supply power to an electrical system designed to be powered by a traditional 12 volt battery system, such as a single 12 volt lead-acid battery.

Based on the battery voltage curves depicted in FIG. 4, different pairs of battery chemistries may be selected. In other words, a first battery chemistry may be selected for the first battery 30 and a second battery chemistry may be selected for the second battery 32. Depending on the chemistry pairings, the battery module 14 may function differently. More specifically, the chemistry pair selected may cause the first battery 30 and the second battery 32 to be non-voltage matched, partial voltage matched, or voltage matched. As used herein, "non-voltage matched" is intended to describe when the first battery 30 and the second battery 32 open circuit voltage ranges do not overlap, "partial voltage matched" is intended to describe when the first battery 30 and the second battery 32 open circuit voltage ranges partially overlap, for example when the voltage overlap corresponds to between 1-74% of the second battery's total state of charge range, and "voltage matched" is intended to describe when the first battery 30 and the second battery 32 voltages largely overlap, for example when the voltage overlap corresponds to between 75-100% of the second battery's total state of charge range. It should be noted that as described above, the second battery 32 has a higher coulombic efficiency and/or a higher charge power acceptance rate than the first battery 30. In other words, the battery pairing characteristics are described based on the relationship of the higher coulombic efficiency and/or a higher charge power acceptance rate battery (e.g., second battery) to the other battery (e.g., first battery).

Figure 5:
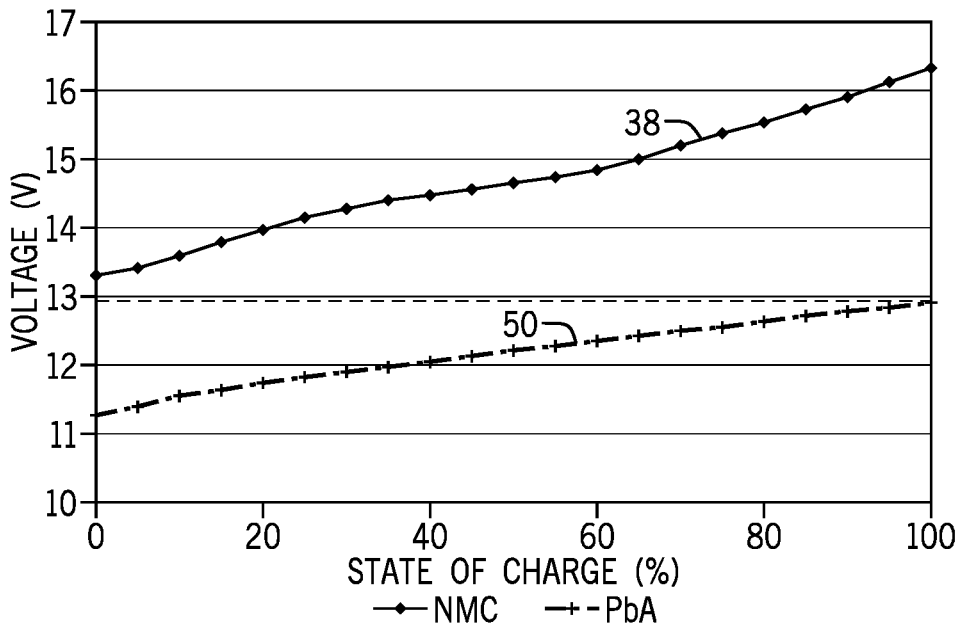
FIG. 5 is a graph illustrating voltage characteristics of non-voltage matched battery chemistries, in accordance with an embodiment of the present approach.
Figure 6:
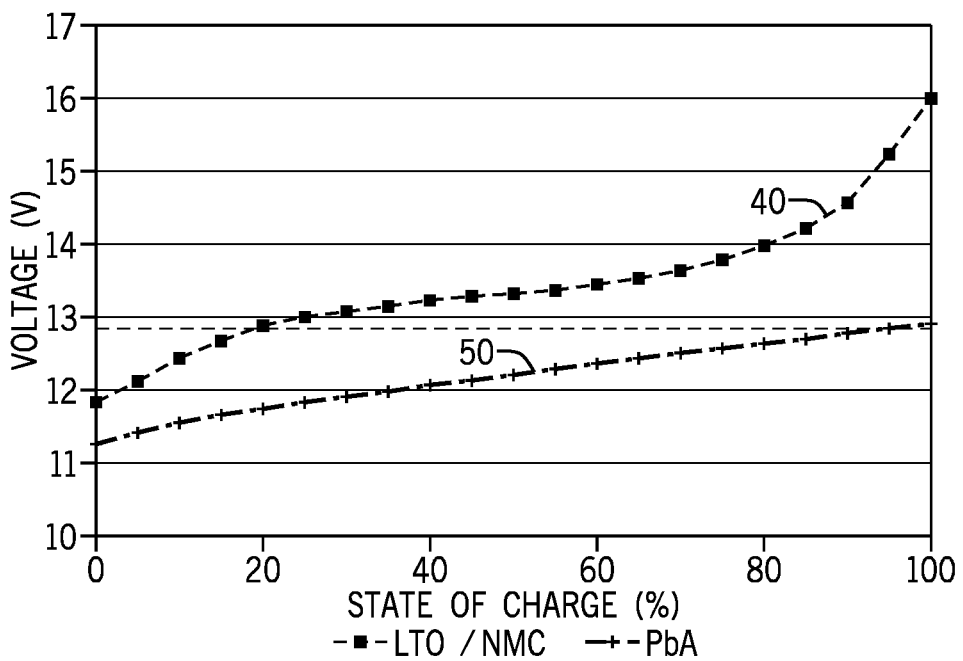
FIG. 6 is a graph illustrating voltage characteristics of partial voltage matched battery chemistries, in accordance with an embodiment of the present approach.
Figure 7:
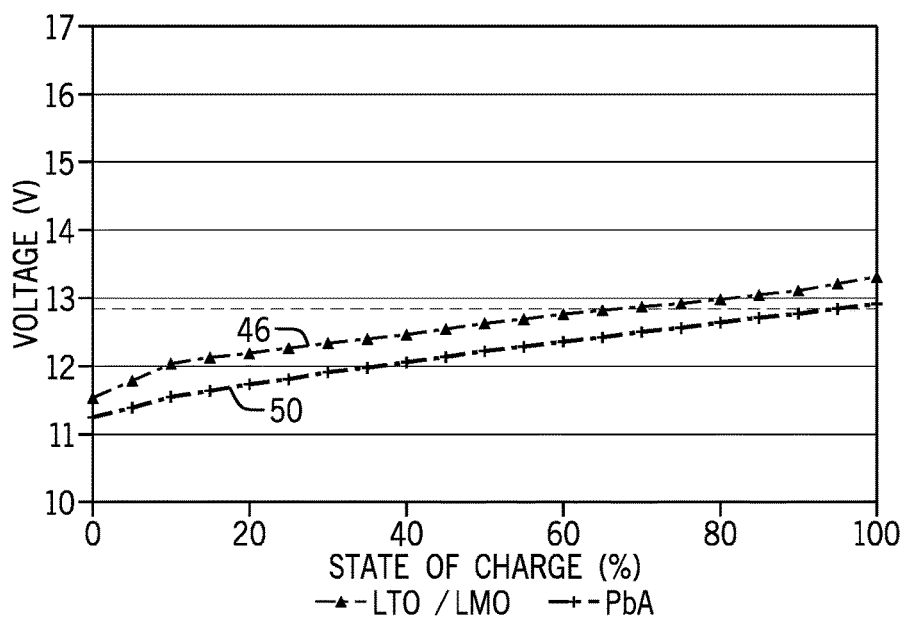
FIG. 7 is a graph illustrating voltage characteristics of voltage matched battery chemistries, in accordance with an embodiment of the present approach.

Illustratively, voltage curves for an example of non-voltage matched batteries is depicted in FIG. 5, voltage curves for an example of partial voltage matched batteries is depicted in FIG. 6, and voltage curves for an example of voltage matched batteries is depicted in FIG. 7, which each is an XY plot depicting battery voltage curves from FIG. 4. To simplify the following discussion, the first battery 30 will be described as a lead-acid battery and the second battery 32 will be described as a battery that utilizes the one of the other battery chemistries described above. As described will be described in more detail below, the voltage of each battery may vary with its state of charge (SOC). For example, a lead-acid battery 30 at 0% state of charge may have a voltage of 11.2 volts, at 50% state of charge may have a voltage of 12.2 volts, and at 100% state of charge may have a voltage of 12.9 volts. In other words, the lead-acid battery has a voltage range of 11.2-12.9 volts. Although the following discussion is made in reference to a lead-acid battery and a second battery, the present techniques may be applied to other battery pairings that have the same characteristics (e.g., non-voltage matched, partial voltage matched, or non-voltage matched).

As depicted in FIG. 5, when the second battery 32 is a NMC battery, the lead-acid battery 30 and the second battery 32 are non-voltage matched because at no point do the PbA voltage curve 50 and the NMC voltage curve 38 overlap. In other words, regardless of their respective state of charge (SOC), the open circuit voltage of the lead-acid battery 30 and the second battery 32 voltages do not overlap. To help illustrate, the lead-acid battery 30 has an open circuit voltage range of 11.2-12.9 volts and the NMC battery 32 has an open circuit voltage range between 13.3-16.4 volts. Accordingly, when the second battery 32 is at its lowest voltage (e.g., at 0% state of charge), its voltage is approximately 13.3 volts. On the other hand, when the lead-acid battery 30 is at its highest voltage (e.g., 100% state of charge), its voltage is approximately 12.9 volts. In other embodiments, the batteries may also be non-voltage matched when the second battery 32 is a Lithium Nickel Cobalt Aluminum Oxide (NCA) (e.g., NCA cathode with graphite anode) or NMC-NCA battery (e.g., blended NMC-NCA cathode with graphite anode).

As depicted in FIG. 6, when the second battery 32 is a LTO/NMC battery, the lead-acid battery 30 and the second battery 32 are partial voltage matched because the PbA voltage curve 50 and the LTO/NMC voltage curve 40 partially overlap. In other words, depending on their respective states of charge, the open circuit voltage of the lead acid battery 30 and the second battery 32 may be the same. To help illustrate, the lead-acid battery 30 has an open circuit voltage range of 11.2-12.9 volts and the LTO/NMC battery 32 has an open circuit voltage range between 11.8-16 volts. As described above, the battery 30 and the second battery 32 may be partial voltage matched when the voltage overlap corresponds to between 1-74% of the second battery's total state of charge range. In the depicted embodiment, the first battery 30 and the second battery 32 may overlap between 11.8-12.9 volts. For example, when the second battery 32 is at a 20% state of charge and the lead-acid battery 30 is at a 100% state of charge, both will have a voltage of approximately 12.9 volts. In other words, the voltages may overlap when the second battery 32 is between 0-20% state of charge (e.g., 20% of the total state of charge range). Based on the battery voltage curves depicted in FIG. 4, in other embodiments, the batteries 30 and 32 may also be partial voltage matched when the second battery 32 is a NiMH or LFP battery. In other embodiments, the batteries may also be non-voltage matched when the second battery 32 is a LTO/NMC-LMO battery (e.g., NMC-LMO cathode with LTO anode).

As depicted in FIG. 7, when the second battery 32 is a LTO/LMO battery, the lead-acid battery 30 and the second battery 32 are voltage matched because the PbA voltage curve 50 and the LTO/LMO voltage curve 46 largely overlap. In other words, the open circuit voltage of the lead-acid battery 30 and the open circuit voltage of the second battery 32 may be the same for most of their respective states of charge. To help illustrate, the lead-acid battery 30 has an open circuit voltage range of 11.2-12.9 volts and the LTO/ NMC battery 32 has an open circuit voltage range between 11.5-13.3 volts. As described above, the lead-acid battery 30 and the second battery 32 may be voltage matched when the voltage overlap corresponds to between 75-100% of the second battery's total state of charge range. In the depicted embodiment, the first battery 30 and the second battery 32 may overlap between 11.5-12.9 volts. For example, when the second battery 32 is at a 75% state of charge and the lead-acid battery 30 is at 100% state of charge, both will have a voltage of approximately 12.9 volts. In other words, the voltages may overlap when the second battery 32 is between 0-75% state of charge (e.g., 75% of the total state of charge range). Based on the voltage curves depicted in FIG. 4, in other embodiments, the batteries 30 and 32 may also be voltage matched when the second battery is a NiZn battery.

As will be described in more detail below, the voltage pairing (e.g., non-voltage match, partial-voltage match, or voltage match) selected may determine the operation of the batteries 30 and 32 within the vehicle. Additionally, as described above, the lead-acid battery 30 and the second battery 32 are connected in various parallel architectures within the battery module 14. Accordingly, when the battery module 14 is connected to the vehicle 10, the lead-acid battery 30 and the second battery 32 are also connected in parallel with the rest of the vehicle, such as the ignition system 16, the regenerative braking system 20, and the vehicle's electrical system.

Figure 8:
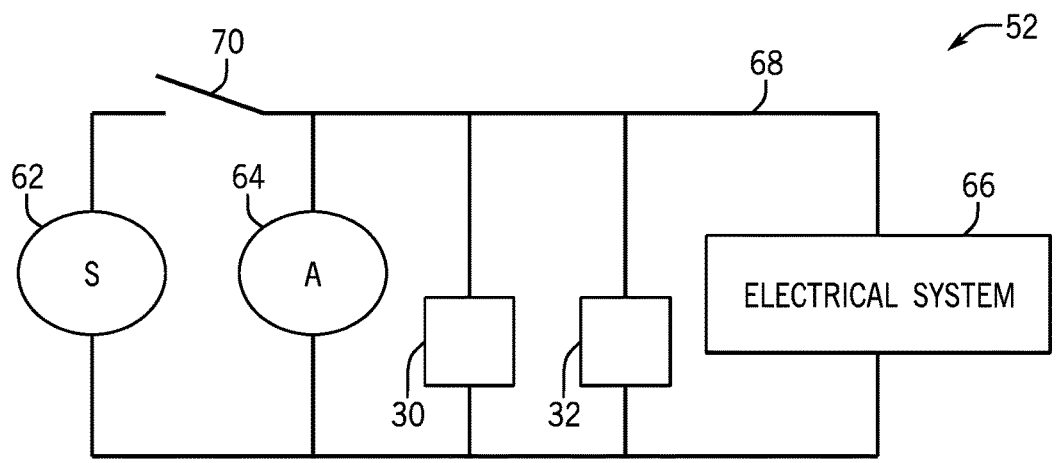
FIG. 8 is a schematic diagram of a passive battery architecture, in accordance with an embodiment of the present approach.
Figure 11A:
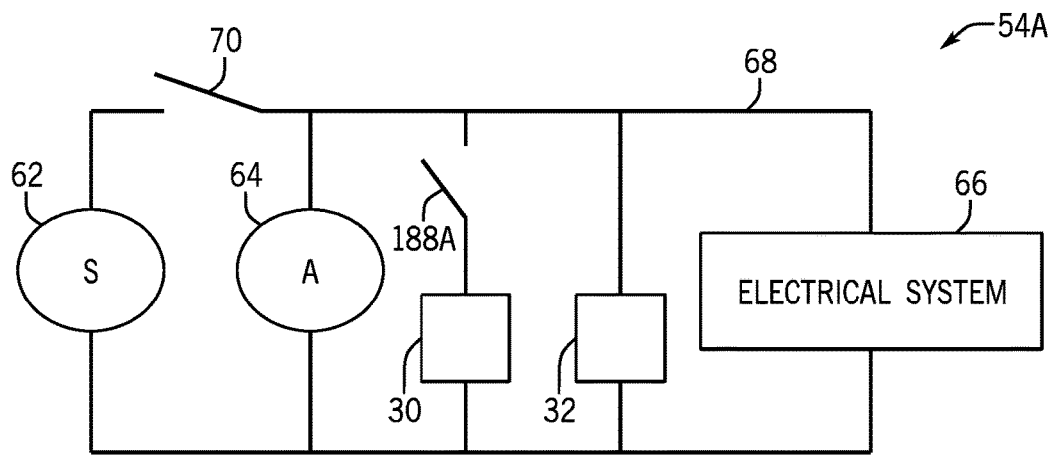
FIG. 11A is a schematic diagram of a semi-passive battery architecture with a switch to selectively connect a first battery, in accordance with an embodiment of the present approach.
Figure 19:
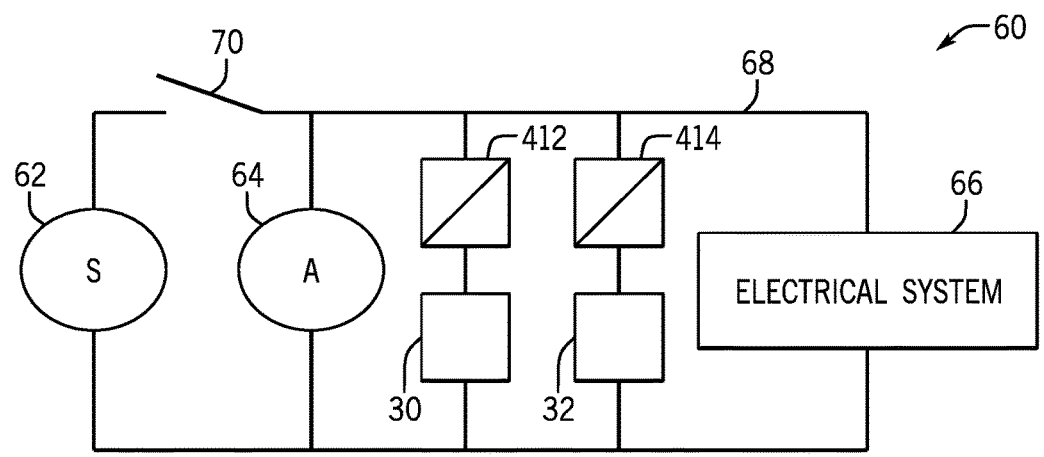
FIG. 19 is a schematic diagram of an active battery architecture, in accordance with an embodiment of the present approach.

More specifically, as described above, the lead-acid battery 30 and the second battery 32 may utilize various parallel architectures including a passive architecture, a semi-passive architecture, a switch-passive architecture, a semi-active architecture, an active architecture, or a switch active architecture. As will be described in more detail below, one embodiment of a passive architecture 52 is depicted in FIG. 8, embodiments of a semi-passive architecture 54 are depicted in FIGS. 11A and B, one embodiment of a switch-passive architecture 56 is described in FIG. 13, embodiments of a semi-active architecture 58 are described in FIGS. 15A and B, and one embodiment of an active architecture 60 is depicted in FIG. 19. As depicted in each architecture, the lead-acid battery 30 and the second battery 32 are coupled in parallel with a starter (e.g., ignition system) 62, an alternator (e.g., regenerative braking system) 64, and the vehicle's electrical system 66 via a bus 68. Additionally, the lead-acid battery 30 and the second battery 32 are selectively connected to the starter 62 via a switch 70. As can be appreciated, the switch 70 may represent the various mechanisms, such as solenoids, that enable the lead-acid battery 30 and/or the second battery 32 to start (e.g., crank) the internal combustion engine. As will be described in more detail below, the differences between each of the architectures is the amount of control over the operation of each of the lead-acid battery 30 and the second battery 32.

Figure 9:
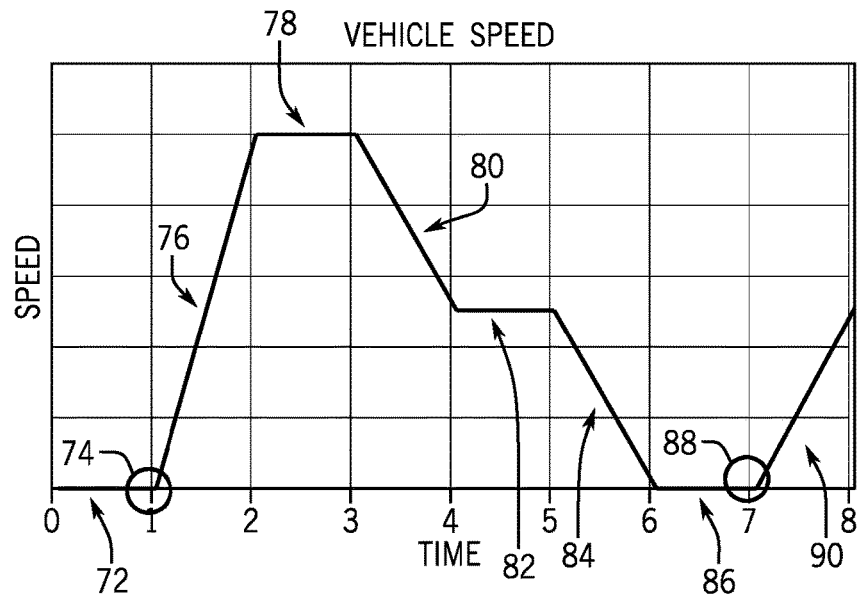
FIG. 9 is a graph describing various hypothetical operations of a vehicle over time, in accordance with an embodiment of the present approach.

To help illustrate the functional differences between each of the architectures (e.g., passive, semi-passive, switch-passive, semi-active, and active), each architecture will be described in relation to a hypothetical operation of the vehicle 10 as described in FIG. 9. FIG. 9 is an XY plot that describes various vehicle operations between time 0 and time 8, in which the Y-axis is vehicle speed and the X-axis is time (i.e., time 0 to time 8). More specifically, between time 0 and time 1, the vehicle 10 is key-off 72. As used herein, "key-off" is intended to describe when an operator (e.g., a driver) is not using the vehicle 10. For example, key-off 72 may describe when the vehicle 10 is parked in a garage overnight. During key-off 72, the internal combustion engine 18 is disabled and the battery system 12 continues to provide power to components of the vehicle's electrical system 66 that remain in operation even when the operator is away, such as the alarm system or engine control unit. Accordingly, as depicted, the vehicle has no speed.

At time 1, the vehicle 10 is cold cranked 74. As used herein, "cold crank" is intended to describe when an operator starts (i.e., cranks) the internal combustion engine 18 from key-off 72. Accordingly, during cold crank 74, the battery system 12 supplies power to the ignition system 16 (e.g., starter 62) to start the internal combustion engine 18. After the internal combustion engine 18 is started, between time 1 and 2, the vehicle 10 accelerates 76. Accordingly, as depicted, the vehicle 10 increases speed. Between time 2 and time 3, the vehicle 10 cruises 78. Accordingly, as depicted, the vehicle 10 remains at a relatively constant speed. While the vehicle 10 accelerates 76 and cruises 78, the battery system 12 supplies power to the vehicle's electrical system 66, which may include the HVAC system 22 and the vehicle console 24. To recharge the battery system 12, the alternator 64 may periodically be turned on, which as will be described in more detail below may result in micro-cycles. It should be noted that the embodiments described below may micro-cycle a battery 30 or 32 to achieve a target state charge; however additionally or alternatively, in other embodiments, the alternator 64 may supply power directly to the vehicle's electrical system 66 while the vehicle 10 is accelerating 76 and/or cruising 78 without micro-cycling the battery 30 or 32. In other words, the alternator 64 may supply power directly to the vehicle's electrical system, for example while the vehicle 10 accelerates 76 or cruises 78.

Between time 3 and time 4, the vehicle 10 decelerates and generates electrical power via regenerative braking 80. Accordingly, as depicted, the vehicle 10 reduces speed. More specifically, the kinetic energy (e.g., motion of the vehicle) is converted into electrical power through the alternator 64. The generated electrical power may be stored by the battery system 12 and/or distributed to supply power to the vehicle's electrical system 66. As will be described in more detail below, depending on the configuration of the battery system 12, the generated electrical power may be stored in and distributed from the battery 30, the second battery 32, or both. Between time 4 and time 5, the vehicle 10 again cruises 82, and between time 5 and 6, the vehicle 10 again decelerates and generates electrical power via regenerative braking 84.

Between time 6 and time 7, the vehicle 10 enters auto-stop 86. As described above, during auto-stop 86, the internal combustion engine 18 is disabled while the vehicle 10 is idle. Accordingly, as depicted, the vehicle has no speed. From auto-stop 86, to resume driving the vehicle, the battery system 12 warm cranks 88 the internal combustion engine 18. As used herein, "warm crank" is intended to refer to starting (i.e., cranking) the internal combustion engine 18 from auto-stop 86. As will be described further below, the power used to warm crank 88 the internal combustion engine 18 may be less than the power to cold crank 74. After the internal combustion engine 18 is started (i.e., cranked), the vehicle 10 again accelerates 90 between time 7 and time 8.

While the vehicle is in auto-stop 86, the battery system 12 continues to supply power to the vehicle's electrical system 66. Additionally, this may include supplying power to the starter 62 to warm crank 88 the internal combustion engine 18. However, while in auto-stop 86, because the internal combustion engine 18 is disabled, the battery system 12 is not charged by the alternator 64. Accordingly, as described above, it may be beneficial to improve the efficiency of the battery system 12 in storing (e.g., capturing) generated electrical power during regenerative braking (e.g., 80 or 84). Additionally, it may be beneficial to improve the efficiency of the battery system in distributing (e.g., supplying) stored electrical power during various vehicle operations (e.g., cruising 82, auto-stop 86, warm cranking 88, and/or acceleration 90).

As discussed above, to help illustrate the difference between each of the architectures (e.g., passive, semi-passive, switch passive, semi-active, active), the operation of battery systems 12 utilizing each of the architectures will be described below with regard to the hypothetical vehicle operation described in FIG. 9. Additionally, for each of the architectures, different battery chemistry configurations (e.g., non-voltage match, partial voltage match, voltage match) will be described. Furthermore, to simplify the following discussion, the battery system 12 will be discussed in relation to a battery module 14 that includes both the lead-acid battery 30 and the second battery 32. However, in other embodiments, the lead-acid battery 30 and the second battery 32 may be located in different regions of the vehicle 10, for example as separate modules.

Passive Architectures for Dual Chemistry Batteries

Returning to FIG. 8, a passive battery system 52 is depicted. As depicted, the lead-acid battery 30 and the second battery 32 are directly coupled to the bus 68. Accordingly, the operation of the battery 30 and the second battery 32 may be controlled by the characteristics of each of the batteries. More specifically, the charging and discharging of the batteries 30 and 32 may be controlled by the current steering characteristics (e.g., internal resistance) of the lead-acid battery 30 and the second battery 32. For example, when the lead-acid battery 30 is fully charged or close to fully charged (e.g., generally full state of charge), the lead-acid battery 30 may have a high internal resistance that steers current toward the second battery 32. On the other hand, when the lead-acid battery 30 is less fully charged, the current may be shared between the lead-acid battery 30 and the second battery 32. In other words, the internal resistance may be proportionally related to the battery state of charge (e.g., high state of charge high internal resistance). Additionally, when the second battery 32 has higher open circuit voltage than the first battery 30, the second battery 32 may provide power by itself, for example to the electrical system 66, until it nears the open circuit voltage of the first battery. The exact voltage when the first battery 30 may begin providing power may be based on the various factors, such as the internal resistance of the batteries and the diffusional resistance of the electrical system 66.

With the proceeding in mind, FIGS. 10A-10D describe the illustrative voltage of the passive battery system 52 in relation to the hypothetical vehicle operation described above. FIGS. 10A-10D are XY plots that each includes a voltage curve that describes the voltage of the passive battery system between time 0 and time 8, in which voltage is on the Y-axis and time is on the X-axis. More specifically, FIG. 10A describes a passive battery system 52 with a non-voltage matched battery pairing, FIG. 10B describes a passive battery system 52 with a first embodiment of a partial voltage matched battery pairing, FIG. 10C describes a passive battery system 52 with a second embodiment of a partial voltage matched battery pairing, and FIG. 10D describes a passive battery system 52 with a voltage matched battery pairing. As depicted, FIGS. 10A-10D each depicts a battery system voltage curve. As used herein, the "battery system voltage" is intended to describe the dynamic voltage measured at the terminals of the battery module. Since both the lead-acid battery 30 and the second battery 32 are directly connected to the bus 68, the voltage across the battery system, the lead-acid battery 30, and the second battery 32 is generally the same.

Passive Architecture—Non-Voltage Matched

Figure 10A:
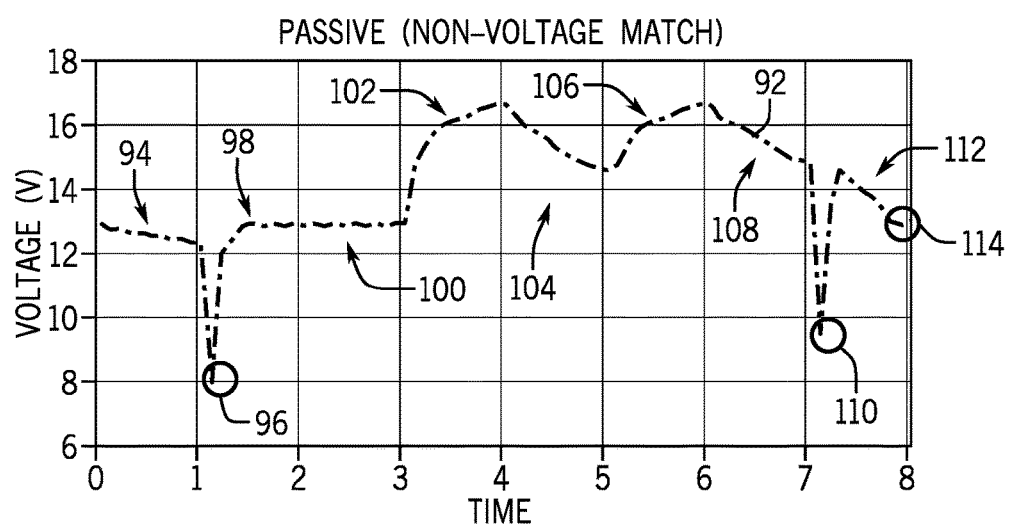
FIG. 10A is a graph illustrating the voltage of a passive battery system with non-voltage matched battery chemistries for the vehicle described in FIG. 9, in accordance with an embodiment of the present approach.

As described above, FIG. 10A describes a passive battery system when the batteries 30 and 32 are non-voltage matched. FIG. 10A depicts a voltage curve 92 that describes the voltage of the passive battery system 52. More specifically, the voltage curve 92 is based on the voltage characteristics described in FIG. 5. In other words, a lead-acid battery 30 and a NMC battery 32, for example. Additionally, as discussed above, the operation (e.g., charging and discharging) of the passive battery system 52 may be controlled via current steering. Furthermore, the NMC battery 32 may have a higher coulombic efficiency and/or higher charge power acceptance than the lead-acid battery 30. Accordingly, to more efficiently capture electrical power generated via regenerative braking, the lead-acid battery 30 may generally be operated between 95-100% state of charge and the NMC battery 32 may generally be operated at 0% state of charge. In other words, the lead-acid battery 30 is maintained at a relatively full state of charge to steer the generated electrical power to the NMC battery 32, and the NMC battery 32 is maintained at a relatively empty state of charge to utilize the full storage capacity (i.e., 0-100% state of charge) of the second battery 32.

Accordingly, during key-off 94 (e.g., between time 0 and time 1), the NMC second battery 32 may be at 0% state of charge. Thus, the lead-acid battery 30 may supply electrical power to components of the electrical system 66 that are powered while the vehicle is key-off 94, such as the alarm system and the engine control unit. As depicted, the battery system voltage 92 may decrease as the lead-acid battery state of charge decreases. At cold crank 96 (e.g., at time 1), the battery system voltage 92 sharply decreases as the lead-acid battery 30 supplies power to the starter 62. As the vehicle begins to accelerate 98 and cruise 100, the battery system voltage 92 micro-cycles as the alternator 64 periodically turns on to recharge the lead-acid battery 30. More specifically, the alternator 64 may be turned on to charge the lead-acid battery 30 to an upper threshold (e.g., 100% state of charge). Once the lead-acid battery 30 reaches the upper threshold, the alternator 64 may be turned off and the lead-acid battery 30 may continue supplying power to the vehicle's electrical system 66 until its state of charge reaches a lower threshold (e.g., 95% state of charge). Once the lead-acid battery 30 reaches the lower threshold, the alternator 64 may again be turned on to charge the lead-acid battery 30. In the present embodiment, the lead-acid battery 30 may be micro-cycled between 95-100% state of charge.

As the vehicle 10 decelerates and generates electrical power via regenerative braking 102 (e.g., between time 3 and time 4), the alternator 64 outputs electrical power to charge the NMC battery 32. As described above, because the lead-acid battery 30 may have a high internal resistance due to its high state of charge, the electrical power generated may be steered toward the NMC second battery 32, which may more efficiently capture the regenerative electrical power due to its higher coulombic efficiency and/or higher charge power acceptance rate. Accordingly, as depicted, the battery system voltage 92 begins to increase as the NMC battery 32 state of charge increases.

Once the vehicle 10 begins to cruise 104 (e.g., between time 4 and time 5), the NMC second battery 32 may supply electrical power to the vehicle's electrical system 66. Accordingly, as depicted, the battery system voltage 92 begins to decrease as the NMC battery state of charge decreases. More specifically, because the NMC battery voltage (e.g., between 13.3-16.6 volts) is higher than the lead-acid battery voltage (e.g., 11.2-12.9 volts), current generally does not flow out of the lead-acid battery 30 until the NMC battery 32 nears depletion. In other words, in some embodiments, the NMC battery 32 may supply electrical power to the electrical system 66 by itself until nearly depleted, at which point, the lead-acid battery 30 may also begin supplying electrical power. As described above, the NMC battery state of charge at which the lead-acid battery 30 begins to discharge may depend on the internal resistance of the NMC battery 32 as it discharges and/or diffusional resistance of the electrical system 66. After cruising 104, the vehicle 10 again decelerates 106 and captures electrical power via regenerative braking (e.g., between time 5 and time 6). Accordingly, as depicted, the battery system voltage 92 increases as the NMC battery state of charge increases.

As the vehicle idles and enters auto-stop 108 (e.g., between time 6 and time 7), the NMC battery 32 again supplies electrical power to the electrical system 66 and the battery system voltage 92 decreases as the NMC battery state of charge decreases. In the depicted embodiment, when the internal combustion engine 18 is to be warm cranked 110 (e.g., at time 7), the NMC battery 32 still has approximately a 60% state of charge (e.g., 14.8 volts). Accordingly, the second battery 32 and the lead-acid battery 30 may both supply power to the starter 62 to restart (e.g., warm crank) the internal combustion engine 18. As depicted, the battery system voltage 92 again sharply drops to warm crank the internal combustion engine 18. As described above, the voltage drop at the warm crank 110 may be less than the voltage drop at the cold crank 96. After the internal combustion engine 18 is restarted, the NMC battery 32 may continue supplying power to the vehicle's electrical system 66 by itself until nearly depleted, for example as the vehicle accelerates 112 (e.g., between time 7 and time 8). In the depicted embodiment, once the NMC battery 32 is nearly depleted, the lead-acid battery 30 resumes supplying power 114. Supplying power from the second battery 32 until depleted (e.g., 0% state of charge) enables the second battery 32 to maximize the use of its storage capacity for capturing regenerative power. Accordingly, in some embodiments, it may be beneficial to deplete the NMC battery 32 before the lead-acid battery 30 begins to supply power.

Passive Architecture—First Embodiment Partial Voltage Matched

Figure 10B:
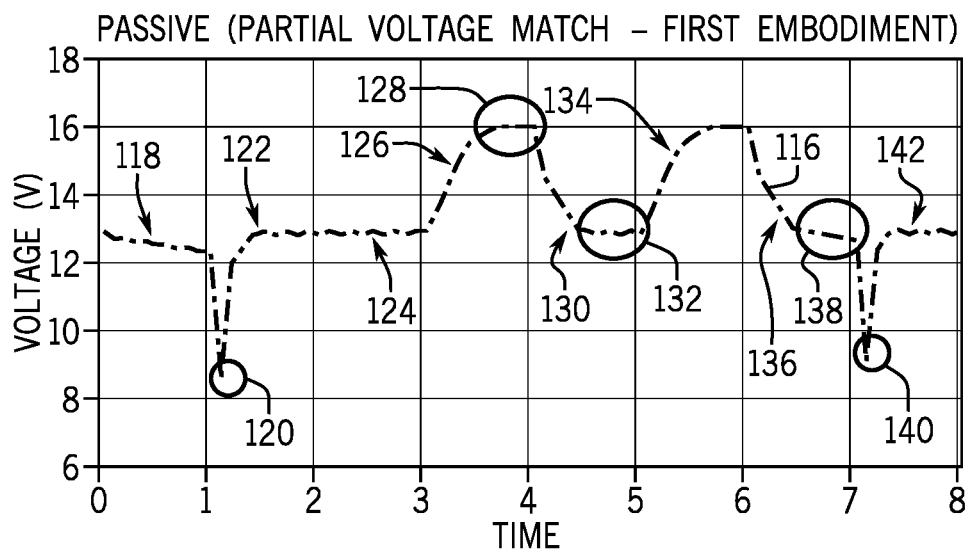
FIG. 10B is a graph illustrating the voltage of a first embodiment of a passive battery system with partial voltage matched battery chemistries for the vehicle described in FIG. 9, in accordance with an embodiment of the present approach.

As described above, FIG. 10B describes a passive battery system when the batteries 30 and 32 are partial voltage matched, in accordance with a first embodiment. FIG. 10B depicts a voltage curve 116 that describes the voltage of a passive battery system 52 when the lead-acid battery 30 and the second battery 32 are partial voltage matched, in accordance with a first embodiment. More specifically, the voltage curve 116 is based on the voltage characteristics described in FIG. 6. In other words, a lead-acid battery 30 and a LTO/NMC battery 32, for example.

As discussed above in regards to the non-voltage match pair, the lead-acid battery 30 may be operated between 95-100% state of charge to steer regenerative power toward the LTO/NMC battery 32, which may more efficiently capture regenerative power. Additionally, based on the voltage characteristics of the batteries 30 and 32 (e.g., current steering), the LTO/NMC battery 32 may supply power by itself until its voltage nears the lead-acid battery voltage. As used herein, that voltage may be referred to as the "threshold voltage." Accordingly, in the present embodiment, because the lead-acid battery 30 is operated between 95-100% state of charge, the LTO/NMC battery 32 may supply power to the electrical system 66 by itself until it nears a voltage threshold of approximately 12.9 volts, at which point, the lead-acid battery 30 or both the lead-acid battery 30 and the LTO/NMC battery 32 may supply power to the electrical system 66. In other words, the lead-acid battery may begin outputting electrical power once the LTO/NMC battery 32 decreases to approximately 20% state of charge. Thus, only a portion of the LTO/NMC battery storage capacity is utilized. For example, in the present example, 80% (e.g., between 20-100% state of charge) of the LTO/NMC battery storage capacity may be utilized. As used herein, the "first embodiment" of a partial voltage match battery system is intended to describe maintaining the battery 30 (e.g., lead-acid battery) generally at a full state of charge (e.g., 100% state of charge) and maintaining the second battery 32 at the state of charge corresponding with the threshold voltage (e.g., 20% state of charge).

In operation, the first embodiment of partial voltage match is similar to the non-voltage match embodiment described above with the exception that the LTO/NMC battery 32 is generally maintained at 20% state of charge. In other words, the lead-acid battery 30 is maintained at a relatively full state of charge to steer the generated electrical power to the LTO/NMC battery 32, and the LTO/NMC battery 32 is maintained at approximately 20% state of charge to maximize the storage capacity of the second battery 32 (e.g., 20-100% state of charge). Accordingly, during key-off 118 (e.g., between time 0 and time 1), both the lead-acid battery 30 and the LTO/NMC battery 32 may supply power to the electrical components in the vehicle. As depicted, the battery system voltage 116 decreases as the lead-acid battery and LTO/NMC battery states of charge decrease.

At cold crank 120 (e.g., at time 1), both the lead-acid battery 30 and the LTO/NMC battery 32 may supply power to the starter 62 to start (e.g., crank) the internal combustion engine 18. Similar to the non-voltage match embodiment, the battery system voltage 116 sharply drops. However, as depicted, the voltage drop at the non-voltage match cold crank 96 may be greater than at the first embodiment of the partial voltage match cold crank 120. The reduction in the voltage drop is a result of using both the lead-acid battery 30 and the LTO/NMC battery 32 to crank the internal combustion engine as compared to just the lead-acid battery 30.

As the vehicle 10 begins to accelerate 122 and cruise 124, the battery system voltage 116 begins to micro-cycle. More specifically, the alternator 64 may micro-cycle the lead-acid battery 30, the LTO/NMC battery 32, or both to maintain the lead-acid battery between 95-100% state of charge and the LTO/NMC battery 32 at approximately 20% state of charge. As the vehicle decelerates and generates electrical power via regenerative braking 126 (e.g., between time 3 and time 4), the alternator 64 outputs electrical power to charge the LTO/NMC battery 32. However, as described above, less than the full storage capacity of the LTO/NMC battery 32 may be utilized to capture regenerative power (e.g., 80% of storage capacity). In other words, the LTO/NMC battery 32 may capture regenerative power from 20% state of charge to 100% state of charge during regenerative braking. Accordingly, as depicted, the battery system voltage 116 increases as the LTO/NMC battery state of charge increase until the LTO/NMC battery 32 reaches 100% state of charge. Once the storage capacity of the LTO/NMC battery 32 is full 128, the battery system voltage 116 remains relatively constant.

As the vehicle 10 cruises 130 (e.g., between time 4 and time 5), the LTO/NMC battery 32 may supply electrical power to the vehicle's electrical system until the LTO/NMC battery 32 nears the threshold voltage (e.g., approximately 20% state of charge). As described above, the storage capacity of the LTO/NMC battery 32 may be limited (e.g., between 20-100% state of charge). In other words, assuming the same capacity, compared to the NMC battery described above in the non-voltage match embodiment, the LTO/NMC battery 32 may supply less electrical power. Accordingly, as depicted, the battery system voltage 116 decreases as the LTO/NMC battery state of charge decreases until the LTO/NMC battery 32 nears the threshold voltage (e.g., approximately 20% state of charge). As described above, the lead-acid battery 30 may begin to discharge before the LTO/NMC battery 32 reaches threshold voltage. The exact point may depend on the internal resistance of the second battery 32 as it discharges and/or diffusional resistance of the electrical system 66. For example, the lead-acid battery 30 may begin to supply power when the LTO/NMC battery 32 reaches 40% state of charge. Upon reaching the threshold voltage, the alternator 64 may be turned on periodically to micro-cycle 132 the battery system (e.g., the lead-acid battery 30, the LTO/NMC battery 32, or both). In some embodiments, after the LTO/NMC battery 32 reaches the threshold voltage, the second battery 32 may continue to supply electrical power, but at a reduced level.

The vehicle 10 again decelerates and captures regenerative electrical power 134 (e.g., between time 5 and time 6) in the LTO/NMC battery 32. The captured electrical power is then used to supply power the electrical system 66 while the internal combustion engine 18 is disabled during auto-stop 136 (e.g., between time 6 and time 7). As described above in regards to cruising 130, the storage capacity of the LTO/NMC battery 32 may be restricted to a portion of the LTO/NMC battery's full storage capacity. Accordingly, as depicted, the battery system voltage 116 decreases as the LTO/NMC battery state of charge decreases until the LTO/NMC battery 32 nears the threshold voltage. However, because the internal combustion engine 18 is disabled during auto-stop 136, the battery system is not micro-cycled. Accordingly, at this point, the battery system voltage 116 decreases as both the lead-acid battery 30 and the LTO/NMC battery 32 discharge 138. In other embodiments, the internal combustion engine 18 may be restarted to micro-cycle the battery system voltage 116.

To exit auto-stop 136, the LTO/NMC battery 32 and the lead-acid battery 30 may warm crank 140 (e.g., at time 7) the internal combustion engine 18. Once the internal combustion engine 18 is restarted, the battery system voltage 116 is again micro-cycled by the alternator 64 as the vehicle accelerates 142.

Passive Architecture—Second Embodiment Partial Voltage Matched

Based on the above description of the first embodiment of the passive battery system 52 with partial voltage matched batteries, the amount of regenerative power utilized by the LTO/NMC battery 32 may be less than its full storage capacity. Accordingly, in a second embodiment of a passive battery system 52 with partial voltage matched batteries, the threshold voltage may be reduced to increase the amount of regenerative power that may be captured and supplied by the LTO/NMC battery 32. For example, the threshold voltage is lowered to approximately 12.6 volts in the second embodiment described in FIG. 10C, which depicts a battery system voltage curve 144. In other words, the lead-acid battery 30 is generally maintained at between 80-85% state of charge and the LTO/NMC battery 32 is generally maintained at 15% state of charge. Accordingly, in the second embodiment, the LTO/NMC battery 32 may utilize 85% of its storage capacity (e.g., 15-100% state of charge) to capture regenerative power, which is a 5% state of charge increase over the first embodiment (e.g., 80%). In other embodiments, the threshold voltage may be lowered by maintaining the lead-acid battery 30 between 50-55%, 55-60%, 60-65%, 65-70%, 70-75%, 85-90% state of charge, or any combination thereof. As used herein, the "second embodiment" of a partial voltage match battery system is intended to describe maintaining the battery 30 (e.g., lead-acid battery) at a generally less than full state of charge (e.g., between 80-85% state of charge) to lower the threshold voltage.

Similar to the first embodiment of a passive partial voltage match battery system, during key-off 146 (e.g., between time 0 and time 1) both the lead-acid battery 30 and the LTO/NMC battery 32 may supply power to electrical components in the vehicle, and at cold crank 148 (e.g., at time 1) both the lead-acid battery 30 and the LTO/NMC battery 32 may supply power to the starter 62 to start (i.e., crank) the internal combustion engine 18. Accordingly, as depicted, the battery system voltage 144 begins to decrease as the lead-acid battery and LTO/NMC battery states of charge decrease. However, as described above, the lead-acid battery 30 is generally maintained between 80-85% state of charge and the LTO/NMC battery 32 is generally maintained at 15% state of charge. In other words, assuming the same total capacity, the amount of electrical power stored in the second embodiment may be less that the amount of electrical power stored in the first embodiment (e.g., 95-100% lead-acid battery state of charge and 25% NMC battery state of charge). Accordingly, in some embodiments, to ensure that the battery system has stored sufficient electrical power to support the electrical components during key-off 146 and to cold crank 148 the internal combustion engine 18, a larger capacity battery system (e.g., lead-acid battery 30 and LTO/NMC battery 32) may be utilized. In some embodiments, the storage capacity of the battery system may be increased to enable the vehicle to cold crank 148 after sitting idle for thirty days.

Again similar to the first embodiment, as the vehicle 10 begins to accelerate 150 and cruise 152, the vehicle system voltage 144 is micro-cycled to maintain the lead-acid battery generally between 80-85% state of charge and the LTO/NMC battery 32 at approximately 15% state of charge (e.g., target states of charge). More generally, the lead-acid battery 30 is maintained at a partial state of charge while the LTO/NMC battery 32 is maintained at its lowest state of charge (e.g., corresponding with the threshold voltage). As the vehicle decelerates and generates electrical power via regenerative braking 154 (e.g., between time 3 and time 4), the alternator 64 outputs electrical power to charge the battery system.

More specifically, because the lead-acid battery 30 is maintained at less than full state of charge, the current of the regenerative power is split between the lead-acid battery 30 and the LTO/NMC battery 32, which as describe above may depend on the internal resistance of each. In other words, the alternator 64 charges both the lead-acid battery 30 and the LTO/NMC battery 32. However, as described above, the LTO/NMC battery 32 may have a higher coulombic efficiency and/or a higher charge power acceptance rate than the lead-acid battery 30. Accordingly, since a larger portion of the regenerative power is captured by the lead-acid battery 30, the regenerative power may be less efficiently captured in the second embodiment than the first embodiment. Thus, as depicted, the battery system voltage 144 increases during regenerative braking 154 as the lead-acid battery and LTO/NMC battery states of charge increase, but the voltage increase during the regenerative braking 154 in the second embodiment may be flatter than the voltage increase during the regenerative braking 126 in the first embodiment because the LTO/NMC battery state of charge increases at a slower rate in the second embodiment. Accordingly, as depicted, the LTO/NMC battery 32 has not reached its full capacity (e.g., 16 volts) during regenerative braking 154 (e.g., charging 155).

As in the first embodiment, when the vehicle 10 cruises 156 (e.g., between time 4 and time 5), the LTO/NMC battery 32 may supply electrical power to the vehicle's electrical system 66 until it nears the threshold voltage (e.g., approximately 15% state of charge). As described above, the lead-acid battery 30 may begin to discharge before the LTO/NMC battery 32 reaches threshold voltage depending on the internal resistance of the second battery 32 as it discharges and/or diffusional resistance of the electrical system 66. In some embodiments, the LTO/NMC battery 32 may continue to supply electrical power after reaching the threshold voltage, but at a reduced level. As described above, the amount of regenerative power stored in the LTO/NMC battery 32 may be increased in the second embodiment. Accordingly, as depicted, the stored power in the LTO/NMC battery 32 is sufficient to supply power to the electrical system 66 without turning on the alternator 64. As depicted, the battery system voltage 144 again increases as regenerative electrical power is captured in both the lead-acid battery 30 and the LTO/NMC battery 32 during regenerative braking 158 (e.g., between time 5 and 6), the battery system voltage 144 decreases as the battery system supplies electrical power to the electrical system 66 during auto-stop 160 (e.g., between time 6 and time 7), the battery system voltage 144 drops sharply as the battery system supplies electrical power to the alternator 64 to warm crank 162 (e.g., at time 7) the internal combustion engine 18, and the battery system voltage 144 is micro-cycled as the vehicle accelerates 164 (e.g., between time 7 and time 8).

Passive Architecture—Voltage Matched

As described above, FIG. 10D describes a passive battery system when the batteries 30 and 32 are voltage matched. FIG. 10D depicts a voltage curve 166 that describes the voltage of the passive battery system 52. More specifically, the voltage curve 166 is based on the voltage characteristics described in FIG. 7. In other words, a lead-acid battery 30 and a LTO/LMO battery 32, for example. As described above, the second battery 32 may supply power to the electrical system 66 by itself until the second battery 32 nears the threshold voltage. Accordingly, similar to second embodiment of the partial voltage match described above, the threshold voltage may be reduced to increase the storage capability of the LTO/LMO battery 32. Illustratively, if the threshold voltage is approximately 12.9 volts, the lead-acid battery 30 is generally maintained at between 95-100% state of charge and the LTO/LMO battery 32 is maintained at approximately 75% state of charge. In other words, the LTO/LMO battery 32 is capable of utilizing 25% of its storage capacity to capture regenerative power (e.g., 75-100% state of charge). Comparatively, if the threshold voltage is reduced to approximately 12.3 volts, the lead-acid battery 30 is generally maintained at between 60-65% state of charge (e.g., generally less than full state of charge) and the LTO/LMO battery 32 is generally maintained at 35% state of charge. Accordingly, the LTO/LMO battery is capable of utilizing 65% of its storage capacity to capture regenerative power (e.g., 35-100% state of charge).

In operation, the voltage match embodiment may function similarly to the second embodiment of the partial voltage match embodiment. During key-off 168 (e.g., between time 0 and time 1) both the lead-acid battery 30 and the LTO/LMO battery 32 may supply power to electrical components in the vehicle, and at cold crank 170 (e.g., at time 1) both the lead-acid battery 30 and the LTO/LMO battery 32 may supply power to the starter 62 to start (e.g., crank) the internal combustion engine 18. Accordingly, as depicted, the battery system voltage 166 begins to decrease as the lead-acid battery and LTO/NMC battery states of charge decrease. However, similar to the second embodiment of the partial voltage match, reducing the threshold voltage also reduces the amount of electrical power stored in the battery system (e.g., 60-65% lead-acid state of charge and 35% LTO/LMO battery state of charge). Accordingly, the storage capacity of the battery system may be increased even further to enable the vehicle to cold crank 170 after sitting idle for thirty days.

Similar to the embodiments described above, the battery system voltage 166 is micro-cycled as the vehicle 10 accelerates 172 and cruises 174. More specifically, the lead-acid battery 30 may be generally maintained between 60-65% state of charge and the LTO/LMO battery 32 may be maintained at approximately 35% state of charge (e.g., target states of charge). As the vehicle 10 decelerates and generates electrical power via regenerative braking 176 (e.g., between time 3 and time 4), the alternator 64 outputs electrical power to charge both the lead-acid battery 30 and the LTO/LMO battery 32 because the lead-acid battery 30 is maintained at less than full state of charge. Accordingly, as depicted, the battery system voltage 166 increases as the lead-acid battery and LTO/LMO battery states of charge increase. However, as described above, the LTO/LMO battery 32 may have a higher coulombic efficiency and/or a higher charge power acceptance rate than the lead-acid battery 30, which may result in the regenerative power being less efficiently captured in the lead-acid battery 30.

Furthermore, when the vehicle 10 begins to cruise 178 (e.g., between time 4 and time 5), the LTO/LMO battery 32 may supply electrical power to the vehicle's electrical system 66 until it nears the threshold voltage (e.g., approximately 35% state of charge). As described above, the lead-acid battery 30 may begin to discharge before the LTO/NMC battery 32 reaches threshold voltage depending on the internal resistance of the second battery 32 as it discharges and/or diffusional resistance of the electrical system 66. Upon reaching the threshold voltage, the alternator 64 may periodically micro-cycle the battery system voltage 166. Additionally, as depicted, the battery system voltage 166 increases as regenerative electrical power is captured in both the lead-acid battery 30 and the LTO/LMO battery 32 during regenerative braking 180 (e.g., between time 5 and 6), the battery system voltage 166 decreases as the battery system supplies electrical power to the electrical system 66 during auto-stop 182 (e.g., between time 6 and time 7). In some embodiments, both the lead-acid battery 30 and the LTO/LMO battery 32 may supply power during auto-stop 182. Furthermore, in other embodiments, the alternator may be restarted to maintain the battery system voltage 166 above the threshold voltage. The battery system voltage 166 then drops sharply as the battery system supplies electrical power to the alternator 64 to warm crank 184 (e.g., at time 7) the internal combustion engine 18, and the battery system voltage 144 is micro-cycled as the vehicle accelerates 186 (e.g., between time 7 and time 8).

Based on the various embodiments of passive battery systems 52 described above, the control algorithm utilized by the battery control unit 34 may be less complex than the algorithm utilized for other architectures. More specifically, based on the voltage characteristics of the batteries (e.g., non-voltage matched, partial voltage matched, or voltage matched) the battery control unit 34 may control the operation of the passive battery system 52 by turning on/off the alternator 64 to maintain each of the batteries 30 and 32 at their respective target states of charge. For example, in a non-voltage matched embodiment, the battery control unit 34 may generally maintain the lead-acid battery 30 at a full state of charge to steer regenerative power to the second battery 32, and may generally maintain the second battery 32 at a generally empty state of charge to more fully utilize the storage capacity of the second battery 32. Additionally, in a voltage matched or partial voltage matched embodiment, the battery control unit 34 may generally maintain the lead-acid battery 30 at less than a full state of charge to reduce the threshold voltage and increase the utilization of the second battery storage capacity.

Semi-Passive Architectures for Dual Chemistry Batteries

To increase the control over the operation of one of the batteries 30 or 32, a semi-passive architecture 54, as depicted in FIGS. 11A and B, may be utilized. More specifically, a semi-passive architecture 54 enables one of the batteries 30 or 32 to be selectively connected and disconnected from the bus 68. For example, FIG. 11A, depicts an embodiment of a semi-passive architecture 54A with a switch 188A included between the lead-acid battery 30 and the bus 68 while the second battery 32 is directly connected to the bus 68. As used herein, a "switch" is intended to describe any mechanism that can selectively connect and disconnect a battery, such as a hardware switch, a contactor, or a relay. In some embodiments, it may be desirable to utilize a relay to minimize the risk of arcing, which may result from the use of a hardware switch.

Figure 11B:
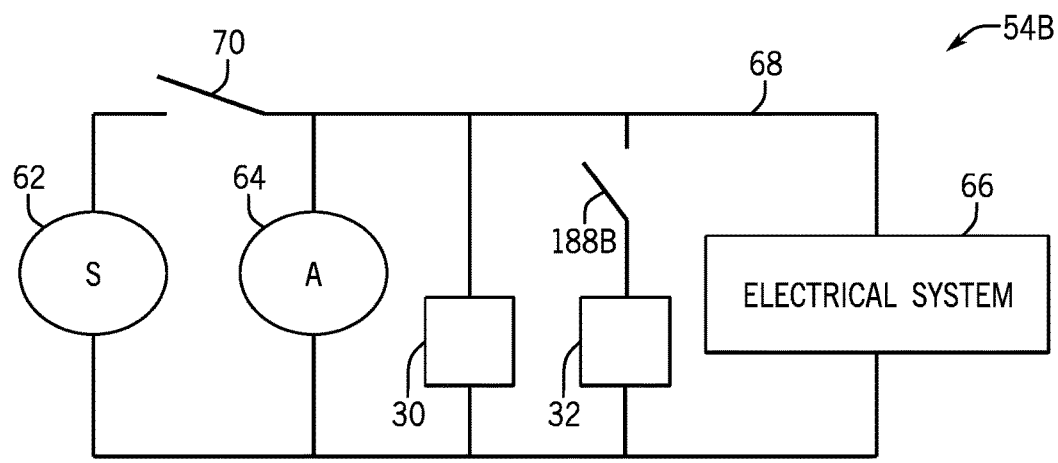
FIG. 11B is a schematic diagram of a semi-passive battery architecture with a switch to selectively connect a second battery, in accordance with an embodiment of the present approach.

Alternatively, FIG. 11B depicts an embodiment of a semi-passive architecture 54B with a switch 188B included between the second battery 32 and the bus 68 while the lead-acid battery 30 is directly connected to the bus 68. In operation, the switch 188B may be closed when it is desirable to charge or discharge the second battery 32. On the other hand, the switch 188B may be open when the second battery 32 is neither charging nor discharging. In other words, current steering characteristics may control the operation of the lead-acid battery 30 while the battery control unit 34 may control the operation of the second battery 32 directly via the switch 188B.

Accordingly, in operation, the semi-passive battery system 54 embodiments may be similar to the passive battery system 52 embodiments. However, as will be described in further detail below, the semi-passive battery system architecture 54B may improve the reliability of the battery system by enabling the second battery 32 to be disabled (e.g., disconnected from the vehicle 10) when it is undesirable to charge and/or discharge the second battery 32. Additionally, the semi-passive battery system 54A may improve reliability of the battery system by enabling the lead-acid battery 30 to be disabled (e.g., disconnected from the vehicle 10) when it is undesirable to charge and/or discharge the lead-acid battery 30, for example to protect the lead-acid battery 30 from overvoltage. In other words, operation of one of the batteries 30 or 32 may be directly controlled by the battery control unit 34.

With the proceeding in mind, FIGS. 12A-12D describe the illustrative voltage of the semi-passive battery system 54B, depicted in FIG. 11B, in relation to the hypothetical vehicle operation described above. FIGS. 12A-12D are XY plots that each includes a voltage curve that describes the dynamic voltage of the semi-passive battery system 54B and a second battery voltage curve that describes the dynamic voltage of the second battery 32 between time 0 and time 8, in which voltage is on the Y-axis and time is on the X-axis. More specifically, FIG. 12A describes a semi-passive battery system 54B with a non-voltage matched battery pairing, FIG. 12B describes a semi-passive battery system 54B with a first embodiment of a partial voltage matched battery pairing, FIG. 12C describes a semi-passive battery system 54B with a second embodiment of a partial voltage matched battery pairing, and FIG. 12D describes a semi-passive battery system 54B with a voltage matched battery pairing. As should be appreciated, since the lead-acid battery 30 is directly connected to the bus 68, the battery system voltage will be the same as the lead-acid battery voltage.

Semi-Passive Architecture—Non-Voltage Matched

Figure 12A:
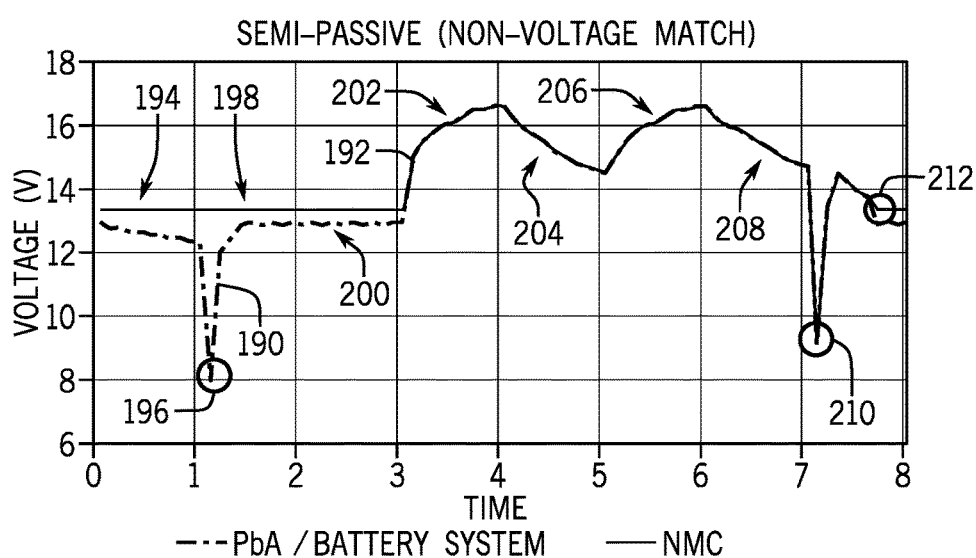
FIG. 12A is a graph illustrating the voltage of a semi-passive battery system with non-voltage matched battery chemistries for the vehicle described in FIG. 9, in accordance with an embodiment of the present approach.

Functionally, the semi-passive embodiments (e.g., non-voltage match, first embodiment partial voltage match, second embodiment partial voltage match, voltage match) are similar to their respective passive battery system embodiments. For example, the semi-passive non-voltage match battery system described in FIG. 12A is generally the same as the passive non-voltage match battery system described in FIG. 10A. As described above, FIG. 12A depicts a battery system voltage curve 190 and a second battery voltage curve 192 when the lead-acid battery 30 and the second battery 32 are non-voltage matched. More specifically, the voltage curves 190 and 192 are based on the voltage characteristics described in FIG. 5. In other words, a lead-acid battery 30 and a NMC battery 32.

Similar to the battery system voltage 92 described in FIG. 10A, the battery system voltage 190 decreases as the lead-acid battery supplies electrical power to the component of the electrical system 66 during key-off 194 (e.g., between time 0 and time 1), sharply drops as the lead-acid battery 30 cold cranks 196 the internal combustion engine (e.g., at time 1), micro-cycles while the vehicle accelerates 198 and cruises 200 (e.g., between time 1 and time 3), increases as electrical power is stored in the NMC battery 32 during regenerative braking 202 (e.g., between time 3 and time 4), decreases as the NMC battery 32 supplies electrical power to the electrical system 66 during cruising 204 (e.g., between time 4 and time 5), increases as electrical power is again stored in the NMC battery 32 during regenerative braking 206 (e.g., between time 5 and time 6), decreases as the NMC battery 32 supplies electrical power to the electrical system 66 during auto-stop 208 (e.g., between time 6 and time 7), sharply drops to warm crank 210 the internal combustion engine 18 (e.g., at time 7), decreases until the electrical power stored in the NMC battery 32 is depleted 212 or nearly depleted, and micro-cycles thereafter (e.g., micro-cycling).

More specifically, as described above, the switch 188B may be closed when it is desirable to charge or discharge the second battery 32. For example, between time 0 and time 3 (e.g., key-off 194, cold crank 196, acceleration 198, and cruising 200), the switch 188B may be open to enable the lead-acid battery 30 to supply electrical power to the electrical system 66 by itself. Accordingly, as depicted, the NMC battery voltage 192 is maintained at approximately 13.3 volts (e.g., 0% state of charge). Additionally, between time 3 and time 7 (e.g., regenerative braking 202, cruising 204, regenerative braking 206, auto-stop 208, and warm-crank 210), the switch 188B may be closed to enable the NMC battery 32 to charge, for example during regenerative braking 202 and 206, and discharge for example during cruising 204 and auto-stop 208. Furthermore, the switch 188B may remain closed until the electrical power stored in the NMC battery 32 is depleted 212. Accordingly, since the NMC battery 32 contains approximately 60% state of charge, the lead-acid battery 30 along with the NMC battery 32 may both supply power to warm crank 210 the internal combustion engine as depicted. More specifically, whether to utilize the second battery 32 to crank the internal combustion engine may be based at least in part on a minimum state of charge for the second battery. In some embodiments, the minimum state of charge may be 20%, 40%, or 60% of second battery state of charge. As used herein, "minimum state of charge" is intended to describe the minimum amount of power, which is a function of the battery state of charge, that may be contributed by the second battery 32 to facilitate a vehicle operation, such as crank the internal combustion engine 18 or supply power to the electrical system 66. Once the NMC battery 32 is depleted, the switch 188B may be open, disconnecting the NMC battery 32 and enabling the lead-acid battery 30 may supply power to the electrical system 66 by itself.

Semi-Passive Architecture—First Embodiment
Partial Voltage Matched

Figure 12B:
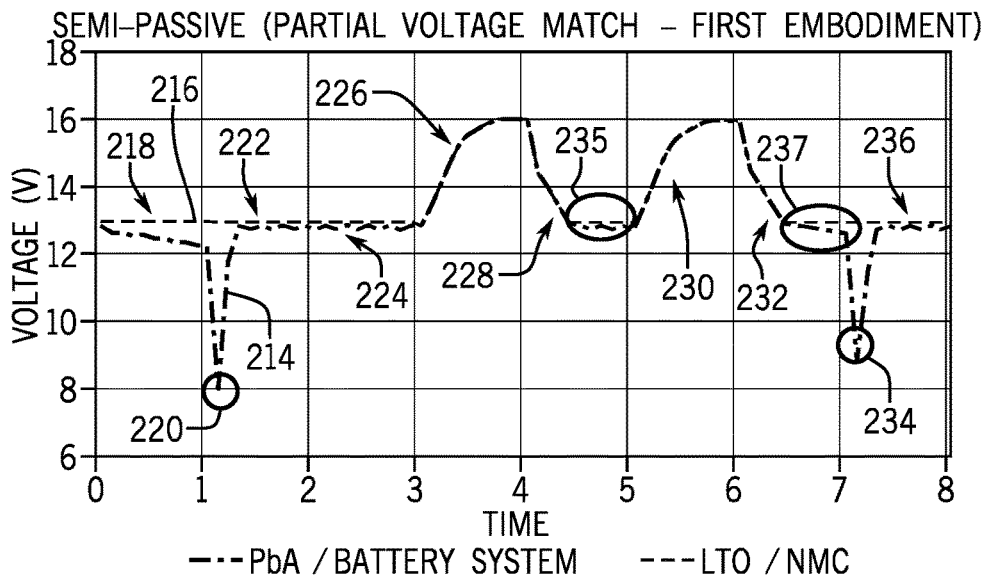
FIG. 12B is a graph illustrating the voltage of a first embodiment of a semi-passive battery system with partial voltage matched battery chemistries for the vehicle described in FIG. 9, in accordance with an embodiment of the present approach.

As described above, FIG. 12B describes a semi-passive battery system 54B when the batteries 30 and 32 are partial voltage matched, in accordance with the first embodiment. FIG. 12B depicts a battery system voltage curve 214 and a second battery voltage curve 216, in accordance with the first embodiment. More specifically, the voltage curves 214 and 216 are based on the voltage characteristics described in FIG. 6. In other words, a lead-acid battery 30 and a LTO/NMC battery 32.

Similar to the battery system voltage 116 described in FIG. 10B, the battery system voltage 214 decreases as the lead-acid battery 30 supplies electrical power to the electrical system 66 during key-off 218 (e.g., between time 0 and time 1), sharply drops as the lead-acid battery 30 cold cranks 220 the internal combustion engine (e.g., at time 1), micro-cycles (e.g., to maintain the lead-acid battery 30 between 95-100% state of charge) while the vehicle accelerates 222 and cruises 224 (e.g., between time 1 and time 3), increases as electrical power is stored in the LTO/NMC battery 32 during regenerative braking 226 (e.g., between time 3 and time 4), decreases as the battery system supplies electrical power to the electrical system 66 during cruising 228 (e.g., between time 4 and time 5), increases as electrical power is again stored in the LTO/NMC battery 32 during regenerative braking 230 (e.g., between time 5 and time 6), decreases as the battery system supplies electrical power to the electrical system 66 during auto-stop 232 (e.g., between time 6 and time 7), sharply drops as the lead-acid battery 30 warm cranks 234 the internal combustion engine 18 (e.g., at time 7), and micro-cycles after the electrical power stored in the LTO/NMC battery 32 is depleted or nearly depleted (e.g., during acceleration 236).

More specifically, similar to the semi-passive non-voltage match described above, in the depicted embodiment, the switch 188B is open between time 0 and time 3 (e.g., key-off 218, cold crank 220, acceleration 222, and cruising 224) to enable the lead-acid battery 30 to supply power to the electrical system 66 by itself. Additionally, the switch 188B may open after the LTO/NMC battery 32 has discharged to the threshold voltage. For example, in the depicted embodiment, the switch 188B is open during micro-cycling 235 and discharging 237 to disconnect the LTO/NMC battery 32. Accordingly, as depicted, the LTO/NMC battery voltage 216 remains relatively constant during these periods. As can be appreciated, the LTO/NMC battery voltage 216 may experience some decay due to voltage relaxation and/or self-discharge. Furthermore, in the depicted embodiment, since the switch 188B is open, the lead-acid battery 30 supplies power to warm crank 234 the internal combustion engine 18 by itself.

On the other hand, the switch 188B may be closed to enable the LTO/NMC battery to charge/discharge. For example, in the depicted embodiment, the switch 188B is closed during regenerative braking 226 and 230 to charge the LTO/NMC battery 32. Additionally, the switch 188B is closed while the LTO/NMC battery 32 supplies power, for example during the portion of cruising 228 and auto-stop 232 before reaching its threshold voltage (e.g., before micro-cycling 235 and discharging 237). More generally, the switch 188B may be closed when electrical power is desired by the electrical system 66 and the second battery 32 is above a minimum state of charge.

Semi-Passive Architecture—Second Embodiment
Partial Voltage Matched

Figure 12C:
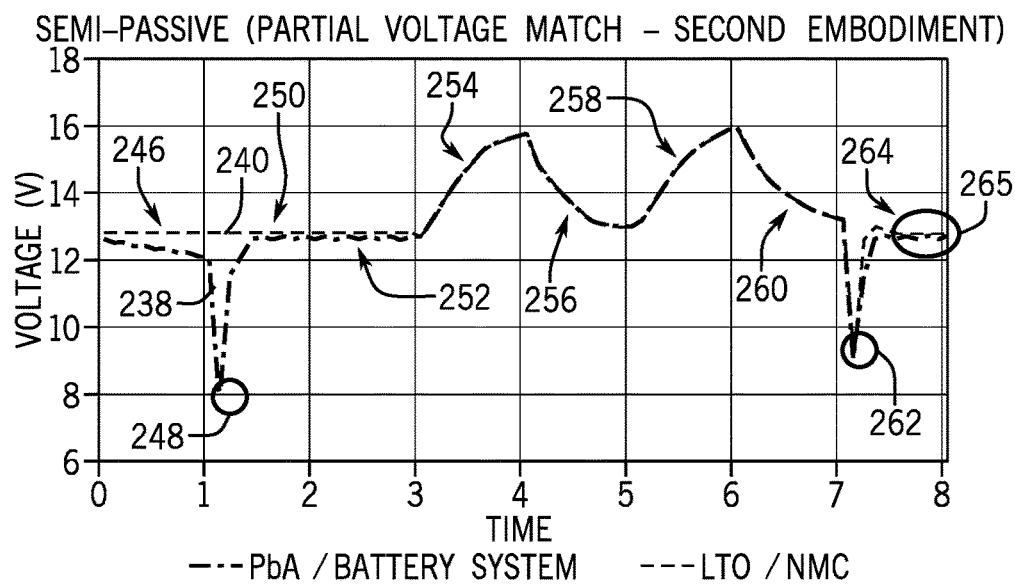
FIG. 12C is a graph illustrating the voltage of a second embodiment of a semi-passive battery system with partial voltage matched battery chemistries for the vehicle described in FIG. 9, in accordance with an embodiment of the present approach.

Additionally, as described above, FIG. 12C describes a semi-passive battery system 54B when the batteries 30 and 32 are partial voltage matched, in accordance with the second embodiment. FIG. 12C depicts a battery system voltage curve 238 that describes the voltage of the battery system and a second battery voltage curve 240 that describes the voltage of a second battery 32. More specifically, the voltage curves 238 and 240 are based on the voltage characteristics described in FIG. 6. In other words, a lead-acid battery 30 and a LTO/NMC battery 32.

Figure 10C:
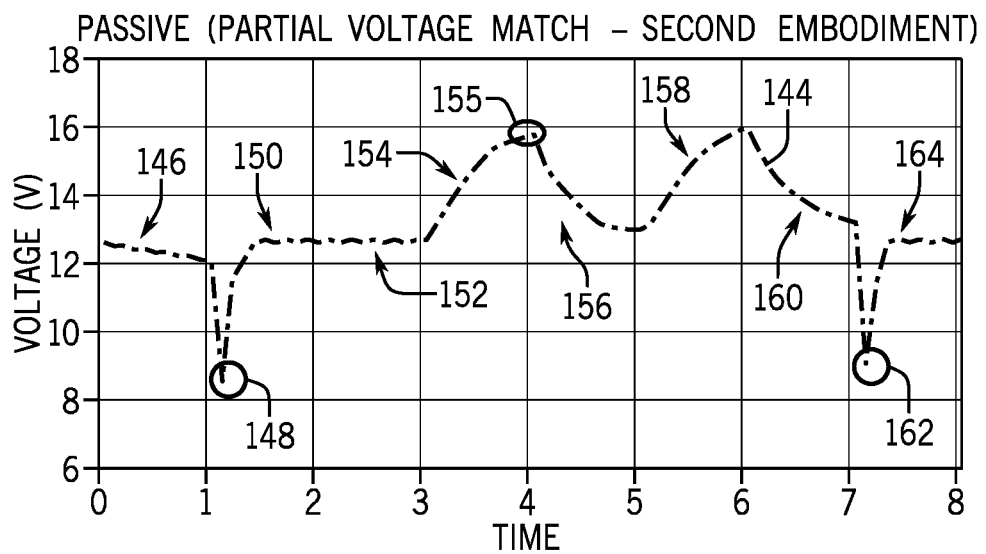
FIG. 10C is a graph illustrating the voltage of a second embodiment of a passive battery system with partial voltage matched battery chemistries for the vehicle described in FIG. 9, in accordance with an embodiment of the present approach.
Figure 10D:
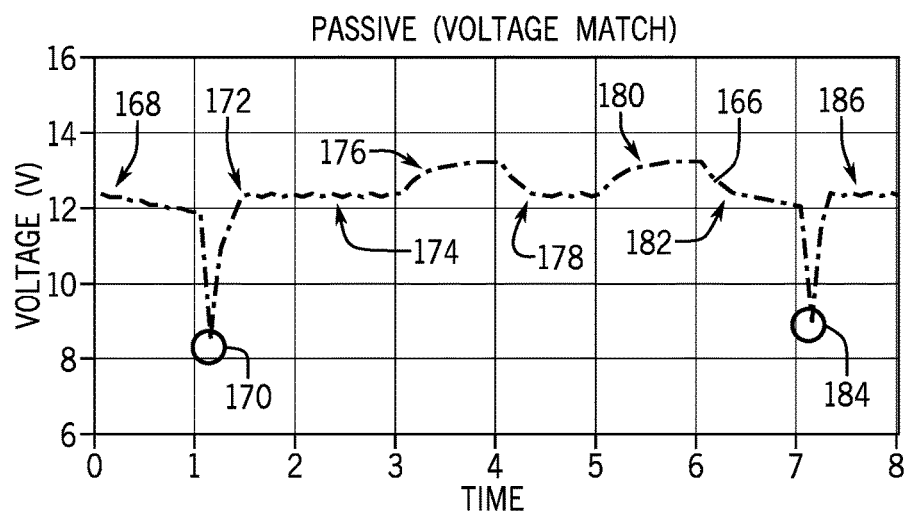
FIG. 10D is a graph illustrating the voltage of a passive battery system with voltage matched battery chemistries for the vehicle described in FIG. 9, in accordance with an embodiment of the present approach.

Similar to the battery system voltage 144 described in FIG. 10C, the battery system voltage 238 decreases as the lead-acid battery 30 supplies electrical power to the component of the electrical system 66 during key-off 246 (e.g., between time 0 and time 1), sharply drops as the lead-acid battery 30 cold cranks 248 the internal combustion engine (e.g., at time 1), micro-cycles (e.g., to maintain the lead-acid battery between 80-85% state of charge) while the vehicle accelerates 250 and cruises 252 (e.g., between time 1 and time 3), increases as electrical power is stored in the LTO/NMC battery 32 during regenerative braking 254 (e.g., between time 3 and time 4), decreases as the LTO/NMC battery 32 supplies electrical power to the electrical system 66 during cruising 256 (e.g., between time 4 and time 5), increases as electrical power is again stored in the LTO/NMC battery 32 during regenerative braking 258 (e.g., between time 5 and time 6), decreases as the LTO/NMC battery 32 supplies electrical power to the electrical system 66 during auto-stop 232 (e.g., between time 6 and time 7), sharply drops to warm crank 262 the internal combustion engine 18 (e.g., at time 7), and micro-cycles after the electrical power stored in the LTO/NMC battery 32 is depleted or nearly depleted (e.g., during acceleration 264).

More specifically, similar to the first semi-passive partial voltage match embodiment described above, in the depicted embodiment, the switch 188B is open between time 0 and time 3 (e.g., key-off 246, cold crank 248, acceleration 250, and cruising 252) to enable the lead-acid battery 30 to supply power to the electrical system 66 by itself. Additionally, the switch 188B may open after the LTO/NMC battery 32 has discharged to the threshold voltage. For example, in the depicted embodiment, the switch 188B opens to disconnect the LTO/NMC battery 32 and the lead-acid battery 30 provides power (e.g., during micro-cycling 265). Accordingly, as depicted, the LTO/NMC battery voltage 240 remains at a relatively constant voltage during these periods. Furthermore, since the LTO/NMC battery 32 has not reached the threshold voltage, the LTO/NMC battery 32 along with the lead-acid battery 30 may both supply power to warm crank 262 the internal combustion engine 18.

On the other hand, the switch 188B may be closed to enable the LTO/NMC battery to charge/discharge. For example, in the depicted embodiment, the switch 188B is closed during regenerative braking 254 and 258 to charge the LTO/NMC battery 32. Additionally, the switch 188B is closed while the LTO/NMC battery 32 supplies power, for example during cruising 256 and auto-stop 260.

Semi-Passive Architecture—Voltage Matched

Figure 12D:
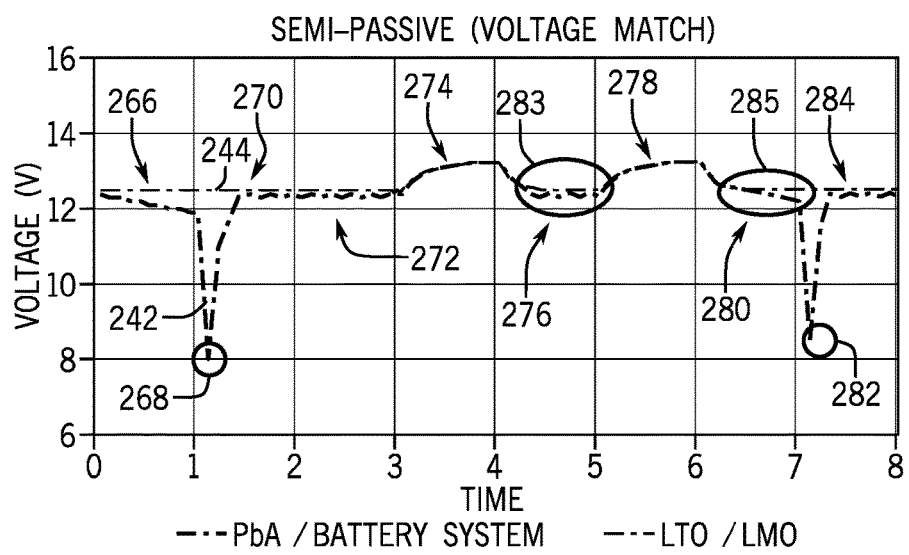
FIG. 12D is a graph illustrating the voltage of a semi-passive battery system with voltage matched battery chemistries for the vehicle described in FIG. 9, in accordance with an embodiment of the present approach.

Furthermore, as described above, FIG. 12D describes a semi-passive battery system 54B when the batteries 30 and 32 are voltage matched. As depicted, FIG. 12D depicts a battery system voltage curve 242 that describes the voltage of the battery system and a second battery voltage curve 244 that describes the voltage of a second battery 32. More specifically, the voltage curves 242 and 244 are based on the voltage characteristics described in FIG. 7. In other words, a lead-acid battery 30 and a LTO/LMO battery 32.

Similar to the battery system voltage 166 described in FIG. 10D, the battery system voltage 242 decreases as the lead-acid battery 30 supplies electrical power to the component of the electrical system 66 during key-off 266 (e.g., between time 0 and time 1), sharply drops as the lead-acid battery 30 cold cranks 268 the internal combustion engine (e.g., at time 1), micro-cycles (e.g., to maintain the lead-acid battery between 60-65% state of charge) while the vehicle accelerates 270 and cruises 272 (e.g., between time 1 and time 3), increases as electrical power is stored in the LTO/LMO battery 32 during regenerative braking 274 (e.g., between time 3 and time 4), decreases as the battery system supplies electrical power to the electrical system 66 during cruising 276 (e.g., between time 4 and time 5), increases as electrical power is again stored in the LTO/LMO battery 32 during regenerative braking 278 (e.g., between time 5 and time 6), decreases as the battery system supplies electrical power to the electrical system 66 during auto-stop 280 (e.g., between time 6 and time 7), sharply drops as the lead-acid battery warm cranks 282 the internal combustion engine 18 (e.g., at time 7), and micro-cycles after the electrical power stored in the LTO/LMO battery 32 is depleted or nearly depleted (e.g., during acceleration 284).

More specifically, similar to the semi-passive embodiments described above, in the depicted embodiment, the switch 188B is open between time 0 and time 3 (e.g., key-off 266, cold crank 268, acceleration 270, and cruising 272) to enable the lead-acid battery 30 to supply power to the electrical system 66 by itself. Additionally, the switch 188B may open after the LTO/LMO battery 32 has discharged to the threshold voltage. For example, in the depicted embodiment, when the threshold voltage is reached, the switch 188B opens to disconnect the NMC battery 32 during micro-cycling 283 or discharging 285. Accordingly, as depicted, the LTO/NMC battery voltage 240 remains at a relatively constant voltage during these periods. Furthermore, in the depicted embodiment, since the switch 188B is open, the lead-acid battery 30 supplies power to warm crank 282 the internal combustion engine 18 by itself.

On the other hand, the switch 188B may be closed to enable the LTO/NMC battery to charge/discharge. For example, in the depicted embodiment, the switch 188B is closed during regenerative braking 274 and 278 to charge the LTO/LMO battery 32. Additionally, the switch 188B is closed while the LTO/LMO battery 32 supplies power, for example during the portion of cruising 276 and auto-stop 280 before reaching its threshold voltage (e.g., before micro-cycling 283 and discharging 285).

As discussed above with regard to the embodiments described in FIGS. 12A-12D, the switch 188B may be open to disconnect the second battery 32 when it is undesirable to charge or discharge the second battery 32. For example, the switch 188B may be open when the lead-acid battery 30 is supplying power (e.g., during key-off, cold crank, acceleration, and cruising). Additionally, the switch 188B may be open when the second battery 32 discharges to the threshold voltage (e.g., 235, 237, 265, 283, or 285). Comparatively, as discussed above with regard to the passive embodiments described in FIGS. 10A-10D, the lead-acid battery 30 along with the second battery 32 may supply power during key-off (e.g., 118, 146, or 168), and the alternator 64 may micro-cycle both the lead-acid battery 30 and the second battery 32 because the second battery 32 is directly coupled to the bus 68.

In some embodiments, micro-cycling the lead-acid battery 30 by itself (e.g., without micro-cycling the second battery 32) may increase the vehicle's fuel economy and/or reduce undesirable emissions because the alternator 64 charges a single battery (e.g., lead-acid battery 30) as compared to two batteries (e.g., lead-acid battery 30 and second battery 32). Additionally, not micro-cycling the second battery 32 may improve the lifespan of the second battery 32 because the second battery 32 is not repeatedly charged and discharged during micro-cycling. Accordingly, the overall cost of a semi-passive battery system 54B may be reduced based on these factors.

Similarly, including the switch 188A to selectively couple the lead-acid battery 30, as depicted in FIG. 11A, may improve the lifespan of the lead-acid battery 30 and improve the recharge efficiency of the second battery 32. For example, when the lead-acid battery 30 is maintained at less than full state of charge (e.g., the second partial voltage match embodiment) the switch 188A may disconnect the lead-acid battery 30 during regenerative braking to steer all of the regenerative power to the second battery 32, which more efficiently captures the regenerative power. Additionally, the switch 188A may disconnect the lead-acid battery 30 to enable the second battery 32 to be charged at a higher voltage (e.g., 16.8 volts), which may be higher than the maximum charging voltage of to the lead-acid battery 30 (e.g., overvoltage), to improve the charging rate of the second battery 32. For example, in the present embodiment, the alternator 64 may output a voltage up to 16.8 volts to charge the NMC battery 32. However, the maximum charging voltage of lead-acid battery 30 may be 14.8 volts because above that point the lead-acid battery 30 may begin to produce oxygen and hydrogen gas, which negatively affects the lifespan of the lead-acid battery 30. In other words, the switch 188A may be opened to enable the second battery 32 to be more optimally charged while protecting the lead-acid battery 30 from overvoltage, for example when the batteries 30 and 32 are non-voltage matched or partial voltage matched.

Based on the various embodiments of semi-passive battery systems 54 described above, the control algorithm utilized by the battery control unit 34 may be more complex than the algorithm utilized for passive battery systems 52. More specifically, in addition to controlling the alternator 64, the battery control unit 34 may close and open the switch 188 to control the operation of the semi-passive battery system 54. As described above, the switch 188 may be closed when the battery 30 or 32 is charging or discharging and open otherwise. For example, in some embodiments, the battery control unit 34 may open the switch 188A to enable the second battery 32 to be more optimally charged (e.g., with a higher charging voltage) while protecting the lead-acid battery 30 from overvoltage. Accordingly, the battery control unit 34 may turn on/off the alternator 64 as well as open/close the switch 188 to maintain each of the batteries 30 and 32 at their respective target states of charge. In addition to opening/closing the switch 188 to facilitate maintaining the batteries 30 and 32 at their target states of charge, the battery control unit 34 may disconnect the battery 30 or 32 for other reasons, such as extreme temperatures that may cause one of the batteries 30 or 32 to be outside of its optimum operating zones.

Switch Passive Architectures for Dual Chemistry Batteries

Figure 13:
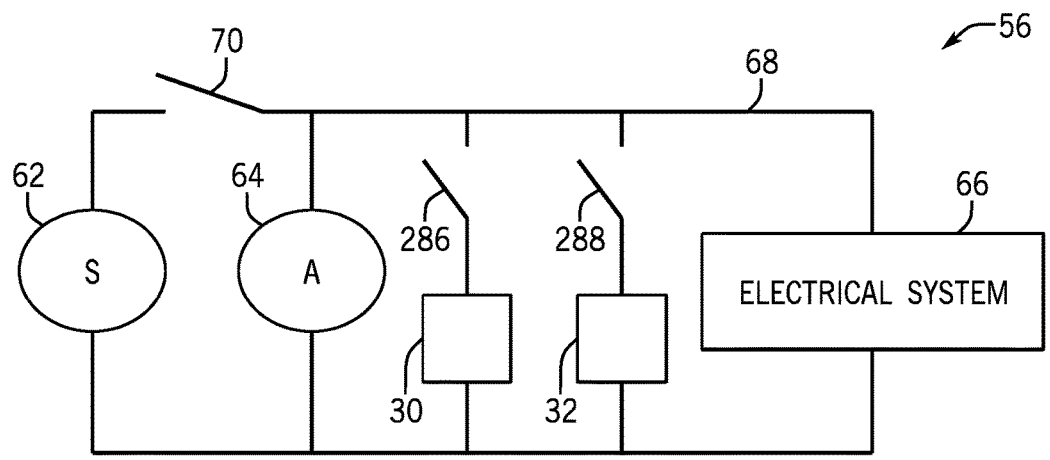
FIG. 13 is a schematic diagram of a switch-passive battery architecture, in accordance with an embodiment of the present approach.

Further expanding on the control provided by the semi-passive architecture to both batteries 30 and 32, a switch passive architecture 56, as depicted in FIG. 13, may be utilized. Similar to the semi-passive architecture 54 described above, switches may be utilized to selectively connect a battery 30 or 32 to the bus 68. For example, as depicted in FIG. 13, a first switch 286 is included between the lead-acid battery 30 and the bus 68, and a second switch 288 is included between the second battery 32 and the bus 68. Accordingly, the switch-passive architecture 56 provides greater control over the operation of both batteries 30 and 32 by enabling each battery 30 and 32 to be selectively connected and disconnected from the bus 68. For example, in some embodiments, this enables the lead-acid battery 30 to be disconnected while the second battery 32 is charging/discharging, and vice versa. In other words, the battery control unit 34 may control the operation of the lead-acid battery 30 via the first switch 286 and the operation of the second battery 32 via the second switch 288, which enables the lead-acid battery 30 and the second battery 32 to operate (e.g., charge or discharge) relatively independently.

With the proceeding in mind, FIGS. 14A-14D describe the illustrative voltage of the switch passive battery system 56 in relation to the hypothetical vehicle operation described above. FIGS. 14A-14D are XY plots that each includes a battery system voltage curve that describes the dynamic voltage of the switch passive battery system 56, a lead-acid battery voltage curve that describes the dynamic voltage of the lead-acid battery 30, and a second battery voltage curve that describes the dynamic voltage of the second battery 32 between time 0 and time 8, in which voltage is on the Y-axis and time is on the X-axis. More specifically, FIG. 14A describes a switch passive battery system 56 with a non-voltage matched battery pairing, FIG. 14B describes a switch passive battery system 56 with the first embodiment of a partial voltage matched battery pairing, FIG. 14C describes a switch passive battery system 56 with a third embodiment of a partial voltage matched battery pairing, and FIG. 14D describes a switch passive battery system 56 with a voltage matched battery pairing. As will be illustrated in the embodiments described below, the battery system voltage follows the lead-acid battery voltage, the second battery voltage, or both depending on the position (e.g., open or closed) of the switches 286 and 288.

Switch Passive—Non-Voltage Matched

Figure 14A:
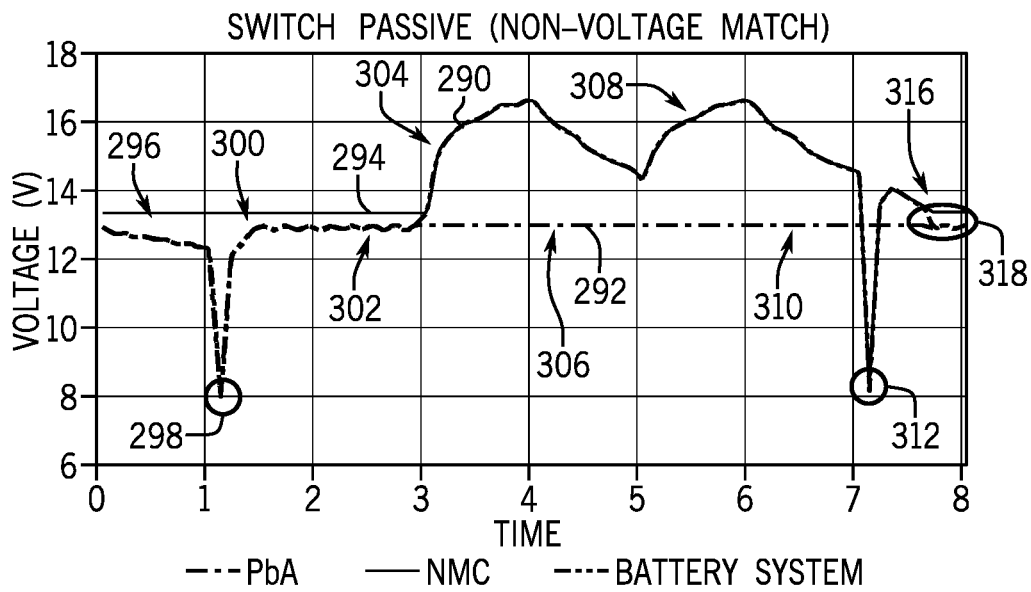
FIG. 14A is a graph illustrating the voltage of a switch passive battery system with non-voltage matched battery chemistries for the vehicle described in FIG. 9, in accordance with an embodiment of the present approach.

Functionally, the switch passive embodiments (e.g., non-voltage match, first embodiment partial voltage match, second embodiment partial voltage match, voltage match) are similar to their respective semi-passive battery system embodiments. For example, FIG. 14A depicts a battery system voltage curve 290 (represented as dotted line), a lead-acid battery curve 292, and a second battery curve 294 when the lead-acid battery 30 and the second battery 32 are non-voltage matched. More specifically, the voltage curves 290, 292, and 294 are based on the voltage characteristics described in FIG. 5. In other words, a lead-acid battery 30 and a NMC battery 32.

Similar to the battery system voltage 190 described in FIG. 12A, the battery system voltage 290 decreases as the lead-acid battery 30 supplies electrical power to the electrical system 66 during key-off 296 (e.g., between time 0 and time 1), sharply drops as the lead-acid battery 30 cold cranks 298 the internal combustion engine (e.g., at time 1), micro-cycles (e.g., to maintain the lead-acid battery 30 between 95-100% state of charge) while the vehicle accelerates 300 and cruises 302 (e.g., between time 1 and time 3), increases as electrical power is stored in the NMC battery 32 during regenerative braking 304 (e.g., between time 3 and time 4), decreases as the NMC battery 32 supplies electrical power to the electrical system 66 during cruising 306 (e.g., between time 4 and time 5), increases as electrical power is again stored in the NMC battery 32 during regenerative braking 308 (e.g., between time 5 and time 6), decreases as the NMC battery 32 supplies electrical power to the electrical system 66 during auto-stop 310 (e.g., between time 6 and time 7), sharply drops as the NMC battery 32 warm cranks 312 the internal combustion engine 18 (e.g., at time 7), decreases until the electrical power stored in the NMC battery 32 is depleted 314 or nearly depleted, and micro-cycles thereafter (e.g., after 316).

More specifically, as described above, the first switch 286 may be closed while the lead-acid battery 30 supplies power, and the second switch 288 may be closed when it is desirable to charge or discharge the second battery 32. For example, in the depicted embodiment, the first switch 286 is closed and the second switch 288 is open between time 0 and time 3 (e.g., key-off 296, cold crank 298, acceleration 300, and cruising 302) to enable the lead-acid battery 30 to supply electrical power to the electrical system 66 by itself. Accordingly, as depicted, the battery system voltage 290 is the lead-acid battery voltage 292 and the NMC battery voltage 294 is maintained at approximately 13.3 volts (e.g., 0% state of charge).

Between time 3 and time 7 (e.g., regenerative braking 304, cruising 306, regenerative braking 308, and auto-stop 310), the first switch 286 is open and the second switch 288 is closed to enable the NMC battery 32 to charge, for example during regenerative braking 304 and 308, and discharge, for example during cruising 306 and auto-stop 310. Accordingly, as depicted, the battery system voltage 290 is the second battery voltage 294 while the NMC battery 32 captures regenerative power and supplies power to the electrical system 66 by itself, and the lead-acid voltage 292 is maintained at approximately 12.9 volts (e.g., 100% state of charge).

Similar to the semi-passive battery system 54A, the first switch 286 may be open to enable the second battery 32 to be more efficiently charged while protecting the lead-acid battery 30 from overvoltage. For example, in the depicted embodiment to increase the charge power acceptance rate of the NMC battery 32, the alternator 64 may output up to the maximum charging voltage of the NMC battery 32 (e.g., 16.8 volts). However, the maximum charging voltage may be above the maximum charging voltage of the lead-acid battery 30 (e.g., overvoltage), which may reduce the lifespan of the lead-acid battery 30 (e.g., by producing oxygen and hydrogen gas). In other words, the first switch 286 may open to protect the lead-acid battery 30.

The second switch 288 may remain closed until the electrical power stored in the NMC battery 32 is nearly depleted or until the electrical power output by the NMC battery is lower than the electrical power desired by the electrical system 66, at which point, the second switch 288 may open and the first switch 286 may close to enable the lead-acid battery 30 may supply power to the electrical system 66 (e.g., at micro-cycling 318). In other embodiments, both the first switch 286 and the second switch 288 may both be closed to further deplete the NMC battery 32. Accordingly, as depicted, since not yet depleted, the NMC battery 32 may supply power to warm crank 312 the internal combustion engine by itself. Thus, in the present embodiment, the captured regenerative power may be used in place of the power stored in the lead-acid battery.

Switch Passive—First Embodiment Partial Voltage Matched

Figure 14B:
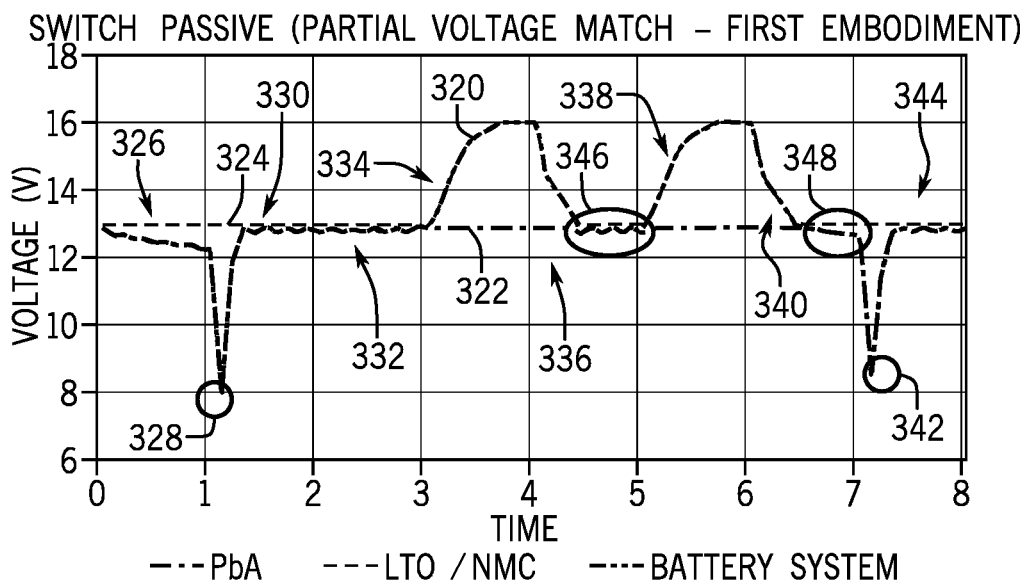
FIG. 14B is a graph illustrating the voltage of a first embodiment of a switch passive battery system with partial voltage matched battery chemistries for the vehicle described in FIG. 9, in accordance with an embodiment of the present approach.

As described above, FIG. 14B describes a switch passive battery system when the batteries 30 and 32 are partial voltage matched, in accordance with the first embodiment. FIG. 14B depicts a battery system voltage curve 320 (represented by dotted line), a lead-acid battery voltage curve 322, and a second battery voltage curve 324. More specifically, the voltage curves 322 and 324 are based on the voltage characteristics described in FIG. 6. In other words, a lead-acid battery 30 and a LTO/NMC battery 32.

Similar to the battery system voltage 214 described in FIG. 12B, the battery system voltage 320 decreases as the lead-acid battery 30 supplies electrical power to the electrical system 66 during key-off 326 (e.g., between time 0 and time 1), sharply drops as the lead-acid battery 30 cold cranks 328 the internal combustion engine (e.g., at time 1), micro-cycles (e.g., to maintain the lead-acid battery 30 between 95-100% state of charge) while the vehicle accelerates 330 and cruises 332 (e.g., between time 1 and time 3), increases as electrical power is stored in the LTO/NMC battery 32 during regenerative braking 334 (e.g., between time 3 and time 4), decreases as the battery system supplies electrical power to the electrical system 66 during cruising 336 (e.g., between time 4 and time 5), increases as electrical power is again stored in the LTO/NMC battery 32 during regenerative braking 338 (e.g., between time 5 and time 6), decreases as the battery system supplies electrical power to the electrical system 66 during auto-stop 340 (e.g., between time 6 and time 7), sharply drops as the lead-acid battery 30 warm cranks 342 the internal combustion engine 18 (e.g., at time 7), and micro-cycles after the electrical power stored in the LTO/NMC battery 32 is depleted or nearly depleted (e.g., during acceleration 344).

More specifically, in the depicted embodiment, the first switch 286 is closed and the second switch 288 is open between time 0 and time 3 (e.g., key-off 326, cold crank 328, acceleration 330, and cruising 332) and after the LTO/NMC battery 32 discharges to the threshold voltage (e.g., micro-cycling 346 or discharging 348) to enable the lead-acid battery 30 to supply power to the electrical system 66 by itself. Accordingly, as depicted, the battery system voltage 320 is the lead-acid battery voltage 322 and the second battery voltage 324 remains relatively constant during these periods.

On the other hand, the first switch 286 is open and the second switch 288 is closed when the LTO/NMC battery 32 captures regenerative power (e.g., regenerative braking 334 and 338) and when the second battery 32 provides electrical power by itself. Illustratively, in the depicted embodiment, the first switch 286 is open and the second switch 288 is closed as the LTO/NMC battery 32 begins supplying power during cruising 336 (e.g., before micro-cycling 346) and auto-stop 340 (e.g., before discharging 348). Accordingly, as depicted, the battery system voltage 320 is the second battery voltage 324 and the lead-acid battery voltage 322 remains relatively constants (e.g., 12.9 volts). Additionally, as described above, the first switch 286 may be open to enable the alternator 64 to output the up to maximum charging voltage of the LTO/NMC battery 32 (e.g., 16.8 volts) while protecting the lead-acid battery 30 from overvoltage.

Once the LTO/NMC battery 32 has discharged to the threshold voltage (e.g., 13.3 volts), as described above, the first switch 286 may close and the second switch 288 may open (e.g., micro-cycling 346 or discharging 348). Furthermore, in the depicted embodiment, since the first switch 286 is closed and the second switch 288 is open, the lead-acid battery 30 supplies power to warm crank 342 and accelerate 344.

Switch Passive—Third Embodiment Partial Voltage Matched

Figure 14C:
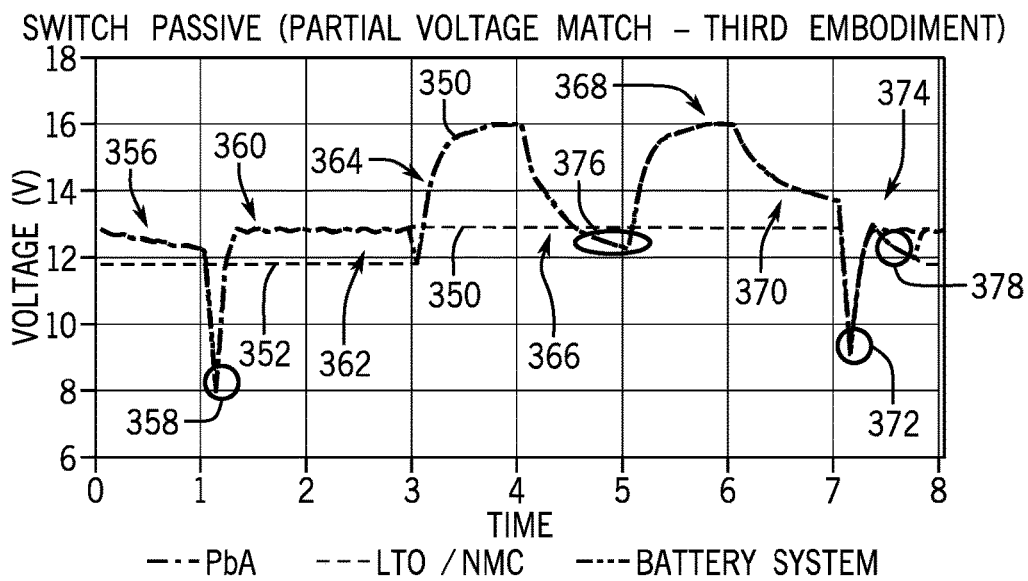
FIG. 14C is a graph illustrating the voltage of a third embodiment of a switch passive battery system with partial voltage matched battery chemistries for the vehicle described in FIG. 9, in accordance with an embodiment of the present approach.

Based on the above description of the first partial voltage match embodiment, less than the full storage capacity of the second battery 32 is utilized to capture regenerative power because the second battery 32 discharges until it reaches the threshold voltage. However, in the switch passive embodiment, because the operation (e.g., charging/discharging) of the batteries 30 and 32 may be relatively independent, the second battery 32 may be enabled to discharge below the threshold voltage (e.g., lead-acid battery voltage). In other words, the storage capacity of the second battery 32 may be more fully utilized. Illustratively, FIG. 14C depicts a battery system voltage curve 350 (represented by dotted line), a lead-acid battery voltage curve 350, and a second battery voltage curve 352, in accordance with a third embodiment. Accordingly, as used herein, the "third embodiment" is intended to describe maintaining the lead-acid battery 30 at a generally full charge (e.g., 95-100% state of charge) while maintain the second battery 32 generally empty (e.g., 0% state of charge).

Similar to the first partial voltage match battery system voltage described in FIG. 14B, the battery system voltage 350 decreases as the lead-acid battery 30 supplies electrical power to the electrical system 66 during key-off 356 (e.g., between time 0 and time 1), sharply drops as the lead-acid battery cold cranks 358 the internal combustion engine (e.g., at time 1), micro-cycles (e.g., to maintain the lead-acid battery between 95-100% state of charge) while the vehicle accelerates 360 and cruises 362 (e.g., between time 1 and time 3), increases as electrical power is stored in the LTO/NMC battery 32 during regenerative braking 364 (e.g., between time 3 and time 4), decreases as the LTO/NMC battery 32 supplies electrical power to the electrical system 66 during cruising 366 (e.g., between time 4 and time 5), increases as electrical power is again stored in the LTO/NMC battery 32 during regenerative braking 368 (e.g., between time 5 and time 6), decreases as the LTO/NMC battery 32 supplies electrical power to the electrical system 66 during auto-stop 370 (e.g., between time 6 and time 7), sharply drops to warm crank 372 the internal combustion engine 18 (e.g., at time 7), and micro-cycles after the electrical power stored in the LTO/NMC battery 32 is depleted or nearly depleted (e.g., during acceleration 374).

More specifically, in the depicted embodiment, the first switch 286 is closed and the second switch 288 is open between time 0 and time 3 (e.g., key-off 356, cold crank 358, acceleration 360, and cruising 362). However, instead of maintain the LTO/NMC battery 32 at approximately 25% state of charge, the LTO/NMC battery 32 is maintained at approximately 0% state of charge to utilize the full storage capacity of the second battery 32. Accordingly, as depicted, the battery system voltage 352 is the lead-acid battery voltage 352. As regenerative power is generated (e.g., during regenerative braking 364 and 368), the first switch 286 is open and the second switch 288 is closed to steer the regenerative power to the LTO/NMC battery 32. Additionally, the first switch 286 may remain open and the second switch 288 may remain closed as the LTO/NMC battery 32 provides power to the electrical system 66 by itself (e.g., during cruising 366 and auto-stop 370). Accordingly, as depicted, during these periods, the battery system voltage 350 is the second battery voltage 354 and the lead-acid battery voltage 352 remains constant (e.g., at 12.9 volts). Additionally, as described above, the first switch 286 may be open to enable the alternator 64 to output up to the maximum charging voltage of the LTO/NMC battery 32 (e.g., 16.8 volts) while protecting the lead-acid battery 30 from overvoltage.

Moreover, as depicted, the LTO/NMC battery 32 may continue to supply power even after it has discharged to the threshold voltage (e.g., discharge 376 and 378). For example, at discharge 378, the LTO/NMC battery 32 discharges until it is depleted (e.g., to 11.8 volts). Comparatively, when lead-acid battery 30 is directly coupled to the bus 68, such as in the passive architecture 52 or the semi-passive architecture 54B, the lead-acid battery 30 may begin to discharge once the battery system voltage nears the lead-acid battery voltage. Accordingly, the switch passive architecture 56 enables the utilization of the full storage capacity of the second battery 32 by disconnecting the lead-acid battery 30 when the second battery 32 is discharging. Once the LTO/NMC battery 32 is depleted or nearly depleted, the second switch 288 may be open and the first switch 286 may be closed to enable the lead-acid battery 30 to supply power by itself (e.g., during acceleration 374 after discharge 378). Accordingly, as depicted, the battery system voltage 350 again is the lead-acid battery voltage 352.

Additionally, in the depicted embodiment, both the first switch 286 and the second switch 288 may be closed to enable both the lead-acid battery 30 and the LTO/NMC battery 32 to supply power to the starter 62 to warm crank the internal combustion engine. More specifically, similar to the non-voltage match embodiment described in FIG. 14C, the LTO/NMC battery 32 still contains stored power. However, because cranking the internal combustion engine may require a large amount of power (e.g., 5 kW) both batteries 30 and 32 may be utilized. In other words, whether to use the lead-acid battery 30, the second battery 32, or both to crank the internal combustion engine may be determined based on the second battery state of charge when the engine is to be cranked. More specifically, when the second battery state of charge is greater than a minimum state of charge, the second battery 32 may crank the internal combustion engine 18 by itself, when the second battery 32 is depleted the lead-acid battery 30 may crank the internal combustion engine 18 by itself, and when the second battery is not depleted but less than the minimum state of charge both the lead-acid battery 30 and the second battery 32 may crank the internal combustion engine together. Additionally, in other embodiments, both the first switch 286 and the second switch 288 may both be closed to supply power for other operations besides cranking.

Switch Passive—Voltage Matched

Figure 14D:
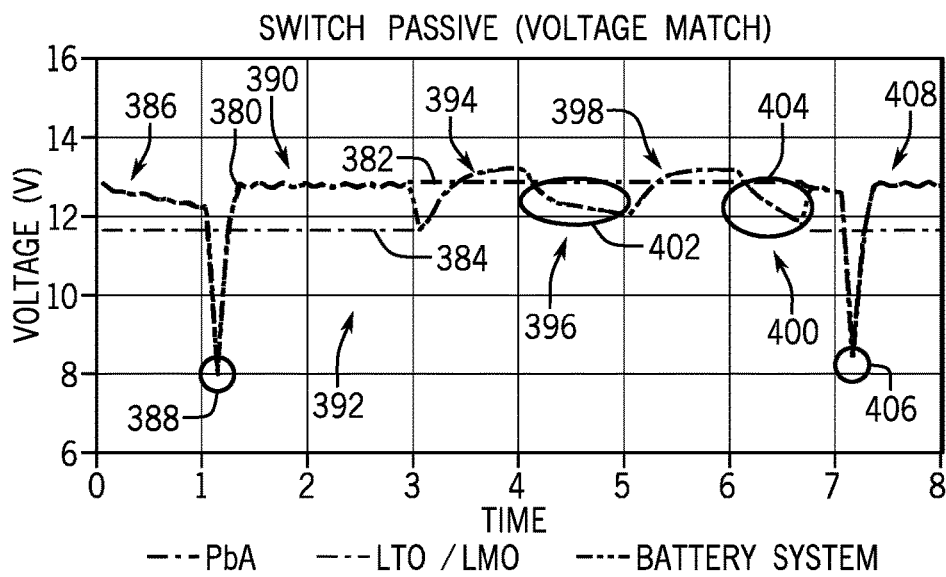
FIG. 14D is a graph illustrating the voltage of a switch passive battery system with voltage matched battery chemistries for the vehicle described in FIG. 9, in accordance with an embodiment of the present approach.

Utilizing the techniques discussed in relation to the third partial voltage match embodiment described in FIG. 14C, the voltage match embodiment may also increase the utilization of the second battery storage capacity. Illustratively, FIG. 14D depicts a battery system voltage curve 380 (represented by dotted line), a lead-acid battery voltage curve 382, and a second battery voltage curve 384, which are based on the voltage characteristics described in FIG. 7. In other words, a lead-acid battery 30 and a LTO/LMO battery 32. Thus, the lead-acid battery 30 is generally maintained between 95-100% state of charge and the LTO/LMO battery 32 is generally empty (e.g., 0% state of charge).

In the depicted embodiment, the first switch 286 is open and the second switch 288 is closed between time 0 and time 3 (e.g., key-off 386, cold crank 388, acceleration 390, and cruising 392) to enable the lead-acid battery 30 to supply power to the electrical system 66 by itself. Accordingly, as depicted, the battery system voltage 380 is the lead-acid battery voltage 382. During regenerative braking (e.g., 394 and 398), the first switch 286 is open and the second switch 288 is closed to enable the LTO/LMO battery 32 to capture the regenerative power. Accordingly, as depicted, the battery system voltage 380 is the second battery voltage 384 and the lead-acid battery voltage 382 remains constant (e.g., 12.9 volts).

Additionally, when the LTO/LMO battery 32 supplies power to the electrical system 66 (e.g., during cruising 396 or auto-stop 400), the first switch 286 may be open and the second switch 288 may be closed. Accordingly, as depicted, the battery system voltage 380 is the second battery voltage 384 when the LTO/LMO battery 32 supplies power by itself. Moreover, as depicted, the LTO/LMO battery 32 may continue to supply power even after it has discharged to the threshold voltage (e.g., 12.9 volts) because the lead-acid battery 30 is disconnected via the first switch 286 (e.g., discharge 402 and 404). Accordingly, switch passive embodiment enables the storage capacity of the second battery 32 to be more fully be utilized than in the semi-passive and passive embodiments.

Furthermore, as in the depicted embodiment, the first switch 286 may close and the second switch 288 may open once the LTO/LMO battery 32 is depleted or reaches a minimum state of charge to enable the lead-acid battery 30 to supply power. Accordingly, because the LTO/LMO battery 32 is depleted, the lead-acid battery 30 may warm crank 406 and supply power during acceleration 408 by itself and the battery system voltage 380 is the lead-acid battery voltage 382.

As discussed above with regard to the switch passive embodiments described in FIGS. 14A-14D, the first switch 286 may be open to disconnect the lead-acid battery 30 when the second battery 32 is charging (e.g., during regenerative braking) and discharging (e.g., during cruising or auto-stop). Accordingly, as in the depicted embodiments, the lead-acid battery 30 may be maintained at a relatively constant voltage (e.g., 12.9 volts). Comparatively, with regard to the passive embodiments and semi-passive embodiments, the lead-acid battery 30 may be put at a higher voltage when the second battery 32 is charging/discharging because it is directly connected to the bus 68. In other words, the lifespan of the lead-acid battery 30 may be better controlled by limiting its exposure to high charging voltages (e.g., overvoltage), for example during regenerative braking. Accordingly, the overall cost of a switch passive battery system 56 may be reduced.

Based on the various embodiments of switch passive battery systems 56 described above, the control algorithm utilized by the battery control unit 34 may be more complex than the algorithm utilized for semi-passive battery systems 54. More specifically, in addition to controlling the alternator 64, the battery control unit 34 may close and open both the first switch 286 and the second switch 288 to control the operation of the switch passive battery system 56. As described above, the first switch may be closed when the lead-acid battery 30 supplies power and open otherwise, for example to enable the second battery 32 to be more efficiently charged while protecting the lead-acid battery 30 from overvoltage. Additionally, the second switch 288 may be closed when the second battery 32 is charging or discharging and may be open otherwise. Accordingly, the battery control unit 34 may turn on/off the alternator 64 as well as open/close the first switch 286 and the second switch 288 to maintain each of the batteries 30 and 32 at their respective target states of charge. Furthermore, in some situations, both the first switch 286 and the second switch 288 may both be closed, for example to warm crank, based on the power requirements of the particular vehicle operation and the state of charge of the batteries 30 and 32. Moreover, although not described in the embodiments described above, in other embodiments, both the first switch 286 and the second switch 288 may be open to enable the alternator 64 to supply power to the electrical system 66 by itself.

Semi-Active and Active Architectures for Dual Chemistry Batteries

As can be appreciated in the passive 52, semi-passive 54, and switch passive 54 embodiments described above, a variable voltage alternator may be used to charge the batteries 30 and 32. For example, when the lead acid battery 30 and the second battery 32 exhibit non-voltage matched characteristics as described in FIG. 5, the alternator 64 may increase its voltage output to 16.6 volts or more to charge the NMC battery 32. In other words, the alternator may be a variable voltage alternator that outputs a higher voltage during regenerative braking and a lower voltage otherwise. However, alternators are often constant voltage alternators, such as an alternator that outputs a constant 13.3, 14.4, or 14.8 volts. Accordingly, to minimize the modifications to existing vehicle platforms, the present techniques may be adapted to utilize a constant voltage variable power alternator. More specifically, a semi-active 58 or active architecture 60 may be utilized. In other embodiments, a variable alternator may be used, which may reduce the voltage boosting (e.g., by a DC/DC converter) to charge/discharge the batteries. In such embodiments, the semi-active 58 and active architectures 60 may function similar to the semi-passive 54 and switch passive architectures 56, respectively.

Figure 15A:
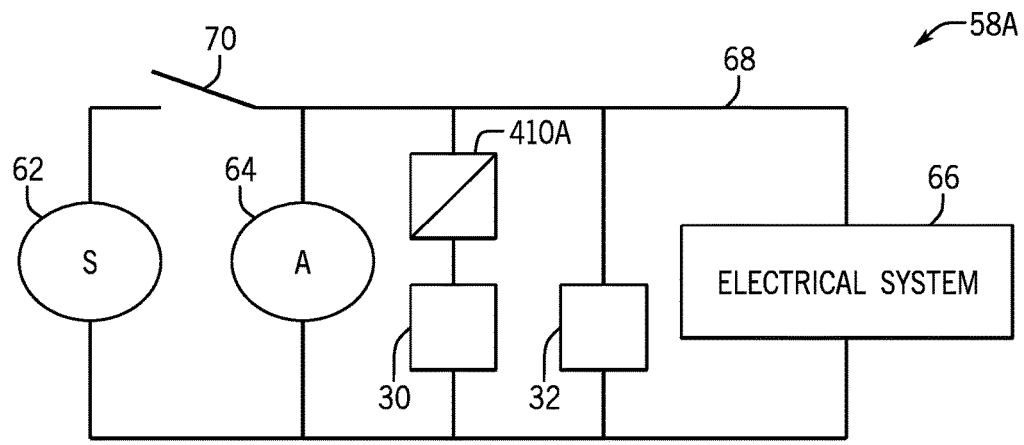
FIG. 15A is a schematic diagram of a semi-active battery architecture with a DC/DC converter to selectively connect a lead-acid battery, in accordance with an embodiment of the present approach.
Figure 15B:
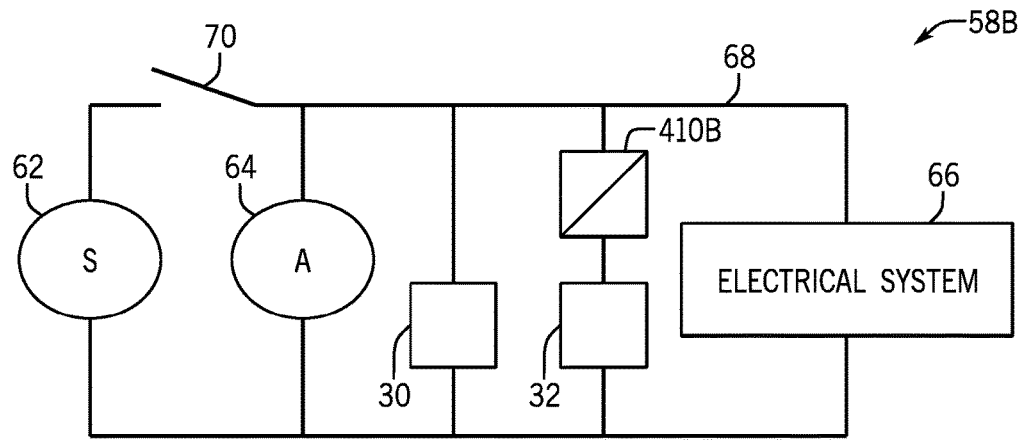
FIG. 15B is a schematic diagram of a semi-active battery architecture with a DC/DC converter to selectively connect a second battery, in accordance with an embodiment of the present approach.

Generally, replacing the switches (e.g., 188, 286, and 288) in the semi-passive 54 and switch-passive 56 architectures with DC/DC converters results in the semi-active 58 and active 60 architectures respectively. Illustratively, FIG. 15A depicts an embodiment of a semi-active architecture 58A with a DC/DC converter 410A included between the lead-acid battery 30 and the bus 68, and FIG. 15B depicts an embodiment of a semi-active architecture 58B with a DC/DC converter 410B included between the second battery 32 and the bus 68. Additionally, FIG. 19 depicts an embodiment of an active architecture 60 with a first DC/DC converter 412 included between the lead-acid battery 30 and the bus 68, and a second DC/DC converter 414 included between the second battery 32 and the bus 68. For the following illustrative embodiments, the alternator 64 will be described as a 13.3 volt constant voltage alternator. However, it should be appreciated that in other embodiments the alternator 64 may output a constant voltage between 7-18 volts.

The DC/DC converters (e.g., 410, 412, and 414) may function similar to the switches to selectively connect/disconnect the batteries 30 or 32 from the bus 68. In some embodiments, a DC/DC converter may disconnect a battery by outputting zero current, for example by closing the internal switch in a boost converter or opening the internal switch in a buck converter. Additionally, the DC/DC converters may step up or step down the voltage input to the battery or the voltage output by the battery. Illustratively, a first example will be described in regards to batteries 30 and 32 that exhibit the non-voltage match characteristics described in FIG. 5. As described in FIG. 5, the voltage of the NMC battery 32 ranges between 13.3 to 16.6 volts. Accordingly, to charge the NMC battery 32 with the 13.3 bus voltage, the DC/DC converter (e.g., 410 or 414) may step up the 13.3 volts input from the bus 68 to the NMC battery voltage (e.g., between 13.3 and 16.6 volts). A second example will be described in regards to batteries 30 and 32 that exhibit the voltage match characteristics described in FIG. 7. As described in FIG. 7, the voltage of the LTO/LMO battery 32 ranges between 11.7 and 13.2 volts. Accordingly, to discharge the LTO/LMO battery 32, the DC/DC converter (e.g., 410 or 414) may step up the voltage output by the LTO/LMO battery 32 to the bus voltage (e.g., 13.3 volts). In other words, the battery control unit 34 may selectively connect and disconnect each battery 30 or 32 to bus 68 by controlling the operation of the DC/DC converters (e.g., 410, 412, and 414).

In both of the examples described above, the DC/DC converter may be a boost converter. More specifically, in the first example, a boost converter may step up the bus voltage to charge the NMC battery 32. In the second example, a boost converter may step up the voltage output by the LTO/LMO battery 32 to supply power to the electrical system 66. In other embodiments, depending on the battery chemistries selected (e.g., non-voltage matched, partial voltage matched, or voltage matched), the DC/DC converter (e.g., 410, 412, and 414) may be a boost converter, a buck converter, or a bi-directional converter (e.g., boost-buck converter). For example, to further conform with existing vehicle designs, a buck converter may be utilized in the first example to step down the voltage output by the NMC battery 32 when discharging to approximately the bus voltage (e.g., 13.3 volts). Accordingly, to step up the voltage input to the NMC battery 32 when charging and to step down the voltage output by the NMC battery 32 when discharging, a bi-directional converter, such as a boost-buck converter, may be used.

In addition to enabling a battery 30 or 32 to be selectively connected and disconnected from the bus 68, the DC/DC converters (e.g., 410, 412, and 414) may provide additional control over the operation of the batteries. More specifically, a DC/DC converter may set the voltage output by the DC/DC converter. For example, in the first example described above, the DC/DC converter (e.g., 410, 412, and 414) may selectively step up the bus voltage to more optimally charge the NMC battery 32. Similarly, in the second example described above, the DC/DC converter may selectively output a voltage to the bus 68 to match the bus voltage and/or the voltage components in the electrical system 66 are designed to optimally function with. Additionally, the DC/DC converters (e.g., 410, 412, and 414) may limit the current that flows through the DC/DC converter. In some embodiments, this may enable control of the electrical power output to the vehicle.

It should be noted that with the increased functionality provided by the use of a DC/DC converter (e.g., 410, 412, and 414), DC/DC converters are generally not 100% efficient. In other words, some losses may be experience as each DC/DC converter adjusts (i.e., steps up or steps down) voltage. Generally, the efficiency of a DC/DC converter may be between 75-98% efficient. Accordingly, to reduce the losses that may result from use of a DC/DC converter, it may be beneficial to bypass the DC/DC converter. Illustratively, a block of a DC/DC converter (e.g., 410, 412, and 414) with an output bypass is described in FIG. 16 and a block diagram of a DC/DC converter (e.g., 410, 412, and 414) with an input bypass is depicted in FIG. 17.

Figure 16:
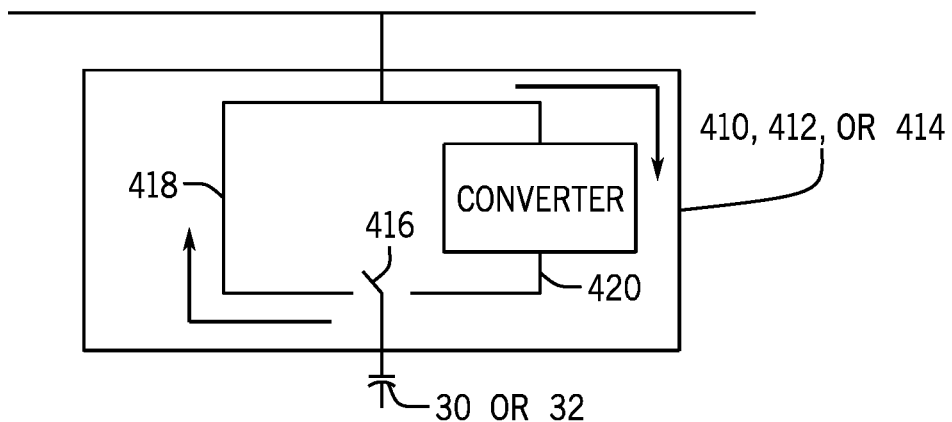
FIG. 16 is a block diagram of a first embodiment of a DC-DC converter with a bypass path for the semi-active or active architecture, in accordance with an embodiment of the present approach.
Figure 17:
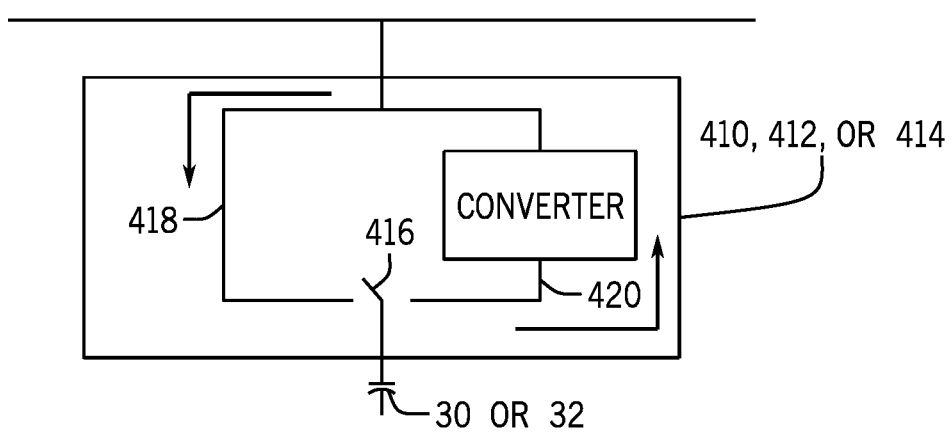
FIG. 17 is a block diagram of a second embodiment of a DC-DC converter with a bypass path for the semi-active or active architecture, in accordance with an embodiment of the present approach.

As depicted in both FIGS. 16 and 17, a converter switch 416 may select between a bypass path 418 and a converter path 420. More specifically, as described in FIG. 16, the converter switch 416 may select the converter path 420 when a battery 30 or 32 is charging. For example, as discussed above in the first example, the bus voltage may be stepped up to charge a NMC battery 32. Additionally, the switch 416 may select the bypass path 418 when a battery 30 or 32 is discharging. For example, because the voltage of a NMC battery 32 (e.g., between 13.3 and 16.6 volts) may be greater than the bus voltage (e.g., 13.3 volts), the NMC battery 32 will discharge due to its higher voltage. In other words, the bypass path 418 enables current to flow from the higher battery voltage to the lower bus voltage.

Conversely, as depicted in FIG. 17, the converter switch 416 may select converter path 420 when a battery 30 or 32 is discharging. For example, as discussed above in the second example, the voltage output by a LTO/LMO battery 32 may be stepped up to the bus voltage. Additionally, the converter switch 416 may select the bypass path 418 when a battery 30 or 32 is charging. For example, because the bus voltage (e.g., 13.3 volts) may be greater than the voltage of a LTO/LMO battery 32 (e.g., between 11.7 and 13.2 volts), the bus voltage will charge the LTO/LMO battery 32 due to its higher voltage. In other words, the bypass path 418 enables current to flow from the higher bus voltage to the lower second battery voltage. As can be appreciated, the control algorithm utilized by the battery control unit 34 may control the operation of the converter switch 416.

With the proceeding in mind, FIGS. 18A-18D describe the illustrative voltage of the semi-active battery system 58B, depicted in FIG. 15B, in relation to the hypothetical vehicle operation described above. FIGS. 18A-18D are XY plots that each includes a battery system voltage curve that describes the dynamic voltage of the semi-active battery system 58B and a second battery voltage curve that describes the dynamic voltage of the second battery 32 between time 0 and time 8, in which voltage is on the Y-axis and time is on the X-axis. More specifically, FIG. 18A describes a semi-active battery system 58B with a non-voltage matched battery pairing, FIG. 18B describes a semi-active battery system 58B with the first embodiment of a partial voltage matched battery pairing, FIG. 18C describes a semi-active battery system 58B with the second embodiment of a partial voltage matched battery pairing, and FIG. 18D describes a semi-active battery system 58B with a voltage matched battery pairing. As should be appreciated, since the lead-acid battery 30 is directly connected to the bus 68, the battery system voltage will be the same as the lead-acid battery voltage.

Semi-Active Architecture—Non-Voltage Matched

Figure 18A:
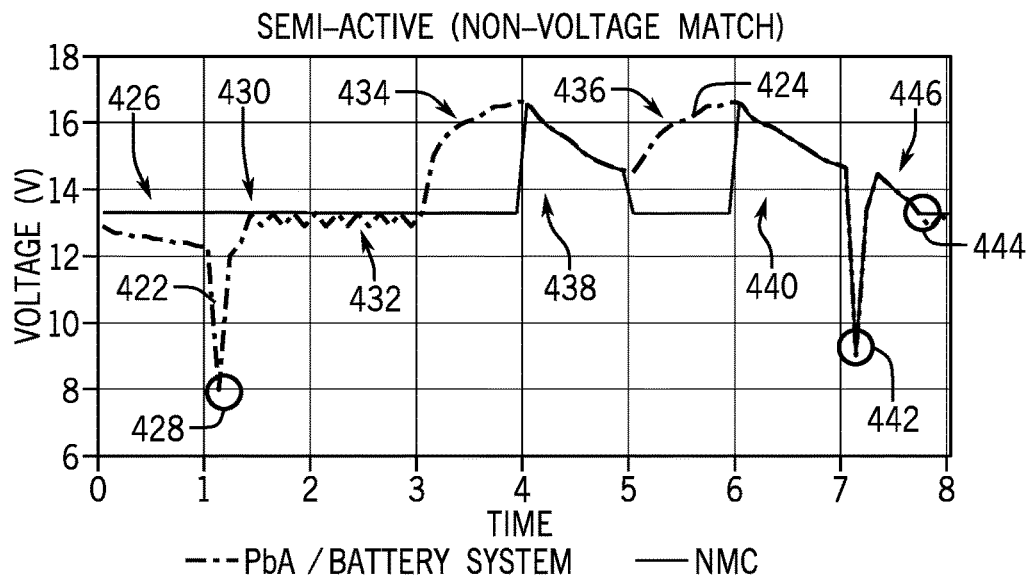
FIG. 18A is a graph illustrating the voltage of a semi-active battery system with non-voltage matched battery chemistries for the vehicle described in FIG. 9, in accordance with an embodiment of the present approach.

As described above, FIG. 18A describes a semi-active battery system 58B when the batteries 30 and 32 are non-voltage matched. FIG. 18A depicts a battery system voltage curve 422 and a second battery voltage curve 424. More specifically, the voltage curves 422 and 424 are based on the voltage characteristics described in FIG. 5. In other words, a lead-acid battery 30 and a NMC battery 32.

In the depicted embodiment, the lead-acid battery 30 supplies power to the electrical system 66 by itself during key-off 426 and to cold crank 428 the internal combustion engine. Accordingly, as depicted, the battery system voltage 422 decreases as the lead-acid battery state of charge decreases and sharply drops as the lead-acid battery 30 cold cranks 428. As the vehicle accelerates 430 and cruises 432, the alternator 64 periodically outputs 13.3 volts to microcycle the lead-acid battery 30 (e.g., to maintain between 95-100% state of charge). More specifically, the lead-acid battery 30 voltage is raised to the voltage output by the alternator 64 when the alternator 64 charges the lead-acid battery 30. For example, when the lead-acid battery 30 reaches a minimum target state of charge (e.g., 95% state of charge), the alternator 64 outputs 13.3 volts to charge the lead-acid battery 30 to a maximum target state of charge (e.g., 100% state of charge). Once the maximum target state of charge is reached, the alternator 64 turns off and the lead-acid battery 30 supplies power. Accordingly, as depicted, the battery system voltage 422 cycles between approximately 13.3 volts and 12.8 volts as the lead-acid battery 30 is micro-cycled. Comparatively, in the embodiments described above (e.g., passive, semi-passive, and switch passive), the variable voltage alternator may output approximately 12.9 volts to micro-cycle the lead-acid battery 30 between 12.9 volts (e.g., 100% state of charge) and 12.8 volts (e.g., 95% state of charge). Additionally, the NMC battery 32 may be disconnected via the DC/DC converter 410B during this period (e.g., between time 0 to time 3). Accordingly, as depicted, the second battery voltage 424 remains relatively constant (e.g., 13.3 volts).

In the depicted embodiment, to reduce the electrical power cost of the semi-active battery system 58, the DC/DC converter 410B may include a bypass path 418 as described in FIG. 16 (e.g., output bypass). More specifically, utilizing a bypass path 418 may reduce the cost of the DC/DC converter 410B because such a DC/DC converter may cost less than a similar bi-directional DC/DC converter (e.g., a boost-buck converter) and may reduce the losses associated with adjusting (e.g., stepping up or stepping down) voltage in the DC/DC converter. Accordingly, in the depicted embodiment, when the NMC battery 32 is charging, for example during regenerative braking 434 or 436, the converter path 420 may be selected. More specifically, as regenerative power is generated, the alternator 64 outputs a constant 13.3 volts. To charge the NMC battery 32 with the constant 13.3 volts, the battery control unit 34 may control the DC/DC converter 410B to step up the voltage to the second battery voltage 424 (e.g., between 13.3-16.6 volts). In other words, the DC/DC converter 410B may be a boost converter. Accordingly, as depicted, the second battery voltage 424 increases as the NMC battery 32 captures regenerative power while the battery system voltage 422 is maintained at a relatively constant the 13.3 volts output by the alternator 64.

Moreover, in some embodiments, the DC/DC converter 410B may enable the second battery 32 to be more efficiently charged while protecting the lead-acid battery 30 from overvoltage. For example, in the depicted embodiment to increase the charge power acceptance rate of the NMC battery 32, DC/DC converter 410B may boost the bus voltage up to the maximum charging voltage of the NMC battery 32 (e.g., 16.8 volts), which may be above the maximum charging voltage of the lead-acid battery 30 (e.g., overvoltage). However, since the bus voltage is unchanged, the lead-acid battery 30 may be protected from overvoltage.

On the other hand, when the NMC battery 32 supplies power, for example during cruising 438 or auto-stop 440, the battery control unit 34 may select the bypass path 418 via the converter switch 416 to enable the NMC battery 32 to discharge based on its higher voltage. Accordingly, as depicted, the battery system voltage 422 is the second battery voltage 424 during these periods.

As should be appreciated, when the bypass path 418 is selected, the battery system functions similarly to the passive battery system embodiments described above. In other words, the NMC battery 32 may supply power to the electrical system 66 until depleted or nearly depleted. Accordingly, as depicted, the lead-acid battery 30 along with the NMC battery 32 may supply power to cold crank 442 the internal combustion engine 18. Once depleted, the NMC battery 32 may be disconnected via the DC/DC converter 410B and the lead-acid battery 30 may supply electrical power to the electrical system 66 by itself. Accordingly, as depicted, the battery system voltage 422 decreases as the NMC battery 32 continues to supply power to the electrical system 66 and micro-cycles with the lead-acid battery 30 after the NMC battery 32 is depleted 444 (e.g., during acceleration 446).

Semi-Active Architecture—First Embodiment
Partial Voltage Matched

Figure 18B:
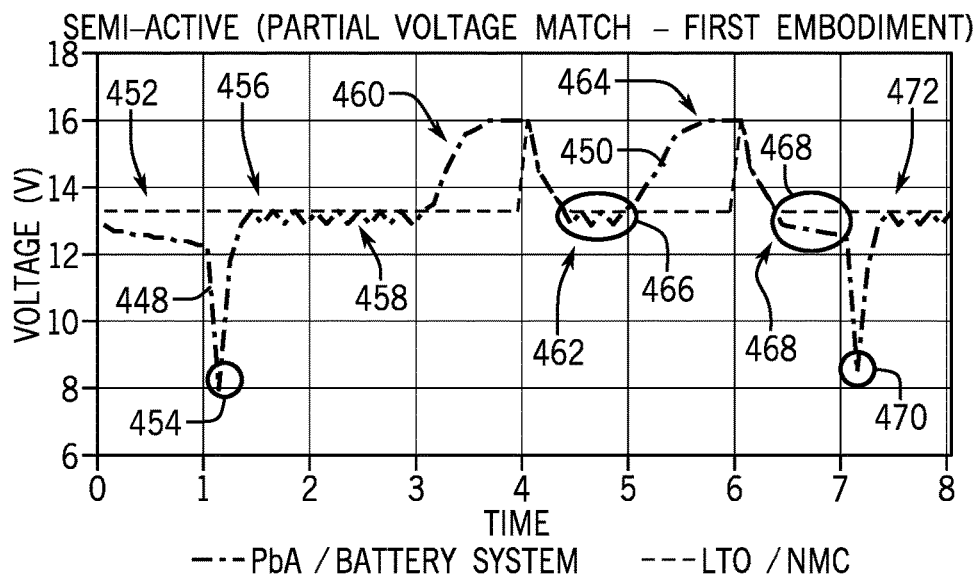
FIG. 18B is a graph illustrating the voltage of a first embodiment of a semi-active battery system with partial voltage matched battery chemistries for the vehicle described in FIG. 9, in accordance with an embodiment of the present approach.

As described above, FIG. 18B describes a semi-active battery system 58B when the batteries 30 and 32 are partial voltage matched, in accordance with the first embodiment. FIG. 18B depicts a battery system voltage curve 448 and a second battery voltage curve 450. More specifically, the voltage curves 448 and 450 are based on the voltage characteristics described in FIG. 6. In other words, a lead-acid battery 30 and a LTO/NMC battery 32.

In the present embodiment, similar to the first partial voltage match passive, semi-passive, and switch passive embodiments described above, the lead-acid battery 30 may be maintained at approximately 95-100% state of charge. However, because the alternator 64 to micro-cycle the lead-acid battery 30 up to 13.3 volts, the threshold voltage may be 13.3 volts. Accordingly, in the present embodiment, the LTO/NMC battery 32 may be maintained at approximately 50% state of charge (e.g., 13.3 volts).

Similar to the non-voltage match embodiment described in FIG. 18A, the battery system voltage 448 decreases as the lead-acid battery 30 supplies power to the electrical system 66 during key-off 452, sharply drop as the lead-acid battery 30 cold cranks 454 the internal combustion engine, and micro-cycles as the lead-acid battery is micro-cycled (e.g., to maintain between 95-100% state of charge).

The depicted embodiment also utilizes the DC/DC converter 410B similar to the one described in FIG. 16 (e.g., output bypass) with a bypass path 418 to reduce the cost of the semi-active battery system 58. Thus, when regenerative power is generated, the converter path 420 is selected to step up the voltage output by the alternator 64 and charge the LTO/NMC battery 32. Accordingly, as depicted, the battery system voltage remains constant (e.g., 13.3 volts) as the alternator 64 generates regenerative power during regenerative braking 460 and 464. More specifically, as discussed above, the DC/DC converter 410B steps up the voltage output by the alternator (e.g., 13.3 volts) to the second battery voltage 450 (e.g., between 13.3-16 volts). Additionally, as described above, the DC/DC converter 410B may enable the second battery 32 to be charge at a voltage up to the maximum charging voltage of the LTO/NMC battery 32 (e.g., 16.8 volts) while protecting the lead-acid battery 30 from overvoltage.

On the other hand, when the LTO/NMC battery 32 is supplying power to the electrical system 66, the bypass path 418 is selected to enable the LTO/NMC battery 32 to discharge based on its higher voltage (e.g., 13.3-16 volts). Accordingly, as depicted, the battery system voltage 448 is the second battery voltage 450.

The LTO/NMC battery 32 may continue supplying power until it reaches the threshold voltage (e.g., 13.3 volts). Once the threshold voltage is reached, the LTO/NMC battery 32 may be disconnected to enable the lead-acid battery 30 to supply power. Accordingly, as depicted, when the LTO/NMC battery 32 reaches the threshold voltage during cruising 462, the battery system voltage 448 micro-cycles 466 as the lead-acid battery 30 is micro-cycled by the alternator 64 (e.g., between 95-100% state of charge). Additionally, when the LTO/NMC battery 32 reaches the threshold voltage during auto-stop 468, the battery system voltage 448 decreases as the lead-acid battery 30 supplies power. Furthermore, after the LTO/NMC battery 32 reaches the threshold voltage, the lead-acid battery 30 may cold crank 470 and supply power during acceleration 472.

Semi-Active Architecture—Third Embodiment
Partial Voltage Matched

Figure 18C:
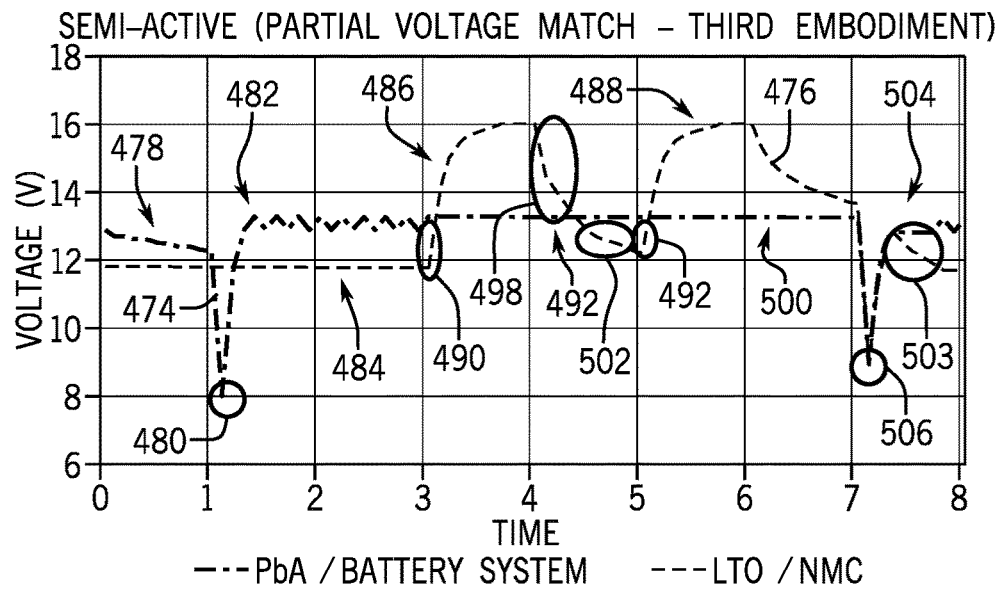
FIG. 18C is a graph illustrating the voltage of a third embodiment of a semi-active battery system with partial matched battery chemistries for the vehicle described in FIG. 9, in accordance with an embodiment of the present approach.
Figure 18D:
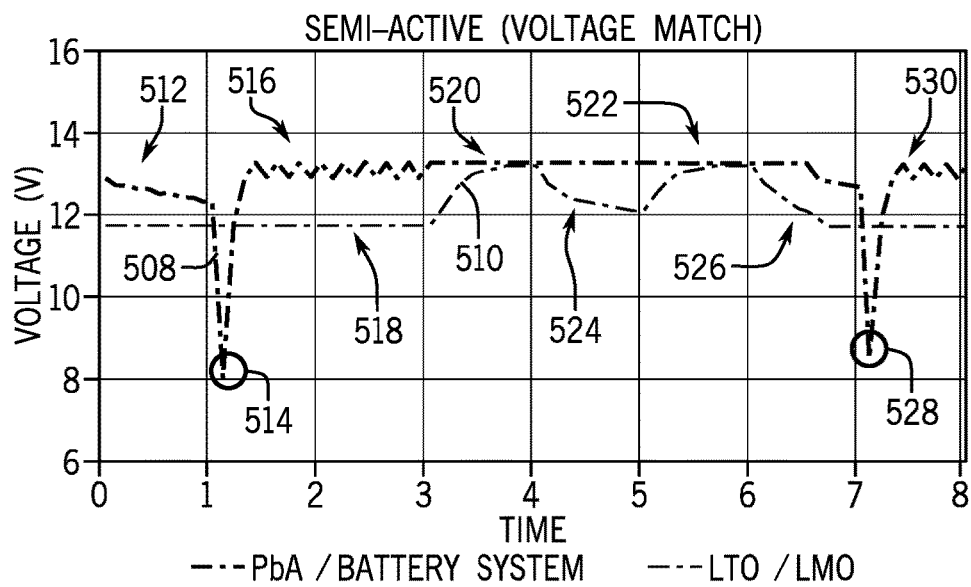
FIG. 18D is a graph illustrating the voltage of a semi-active battery system with voltage matched battery chemistries for the vehicle described in FIG. 9, in accordance with an embodiment of the present approach.

Based on the above description of the first embodiment of the semi-active battery system 58B with partial voltage matched batteries, the storage capacity of the LTO/NMC battery 32 may be further limited because the threshold voltage is set to 13.3 volts. Accordingly, similar to the passive and semi-passive embodiments described above, the threshold voltage may be lowered by lowering the voltage output by the alternator 64. Additionally or alternatively, a bi-direction converter (e.g., boost-buck converter) may be used. More specifically, a boost-buck converter may operate bi-directionally and both step up or step down the input voltage. Illustratively, FIG. 18C depicts a battery system voltage curve 474 and a second battery voltage curve 476 when the batteries 30 and 32 are partial voltage matched, in accordance with the third embodiment.

Similar to the first partial voltage match battery system described in FIG. 18B, the battery system voltage 474 decreases as the lead-acid battery 30 supplies electrical power to the electrical system 66 during key-off 478 (e.g., between time 0 and time 1), sharply drops as the lead-acid battery 30 cold cranks 480 the internal combustion engine (e.g., at time 1), and micro-cycles (e.g., to maintain the lead-acid battery between 95-100% state of charge) while the vehicle accelerates 482 and cruises 484 (e.g., between time 1 and time 3). Additionally, instead of maintaining the LTO/NMC battery 32 at approximately 50% state of charge as in FIG. 18B, the LTO/NMC battery 32 is maintained at approximately 0% state of charge by disconnecting the second battery via the DC/DC converter 410B.

When regenerative power is generated, for example during regenerative braking 486 or 488, the alternator 64 outputs a constant voltage (e.g., 13.3 volts). Accordingly, as depicted, the battery system voltage 474 is maintained at a relatively constant 13.3 volts. Additionally, the regenerative power generated by the alternator 64 charges the LTO/NMC battery 32. More specifically, when the second battery voltage 476 is less than the bus voltage (e.g., voltage output by the alternator), for example during charging 490 or 492, the DC/DC converter 410B may set the voltage (e.g., step down the bus voltage (e.g., 13.3 volts) to the second battery voltage (e.g., between 11.7-13.2 volts)) to charge the LTO/NMC battery 32. Once the second battery voltage 476 reaches the voltage output by the alternator 64, the DC/DC converter may step up the bus voltage (e.g., 13.3) to the second battery voltage (e.g., 13.3-16 volts) and charge the LTO/NMC battery 32. Additionally, as described above, the DC/DC converter 410B may enable the second battery 32 to be charge at a voltage up to the maximum charging voltage of the LTO/NMC battery 32 (e.g., 16.8 volts) while protecting the lead-acid battery 30 from overvoltage.

When the LTO/NMC battery 32 supplies power to the electrical system 66, for example during cruising 494 or auto-stop 496, the DC/DC converter 410B may maintain the bus voltage at approximately the same voltage output by the alternator 64 (e.g., 13.3 volts). For example, when the second battery voltage 476 is greater than 13.3 volts (e.g., discharging 498 and auto-stop 500), the DC/DC converter 410B may step down the voltage. On the other hand, when the second battery voltage is less than 13.3 volts (e.g., discharging 502 and 503), the DC/DC converter 410B may step up the voltage. Accordingly, as depicted, the battery system voltage 474 is maintained at 13.3 volts during this period. Furthermore, the LTO/NMC battery 32 may continue to supply power until depleted. For example, as depicted, the LTO/NMC battery 32 may supply power during acceleration 504 until depleted and may supplement the lead-acid battery 30 to warm crank 506 the internal combustion engine 18.

Semi-Active Architecture—Voltage Matched

As described above, FIG. 18D depicts a battery system voltage curve 508 that describes the semi-active battery system voltage and a second battery voltage curve 510 when the batteries 30 and 32 are voltage matched. More specifically, the voltage curves 508 and 510 are based on the voltage characteristics described in FIG. 7. In other words, a lead-acid battery 30 and a LTO/LMO battery 32. Additionally, similar to the third partial voltage match embodiment described in FIG. 18C, in the present embodiment, the lead-acid battery 30 may generally be maintained between 95-100% state of charge and the LTO/LMO battery 32 may be maintained generally at 0% state of charge even though the voltage (e.g., 11.7 volts) is less than the threshold voltage (e.g., 13.3 volts) to enable the second battery to utilize its full storage capacity to capture regenerative power.

Similar to the partial voltage match embodiment described in FIG. 18C, the battery system voltage 508 decreases as the lead-acid battery 30 supplies electrical power to the electrical system 66 during key-off 512 (e.g., between time 0 and time 1), sharply drops as the lead-acid battery 30 cold cranks 514 the internal combustion engine (e.g., at time 1), and micro-cycles (e.g., to maintain the lead-acid battery between 95-100% state of charge) while the vehicle accelerates 516 and cruises 518 (e.g., between time 1 and time 3). Additionally, the LTO/LMO battery 32 is maintained at approximately 0% state of charge (e.g., 11.7 volts) by disconnecting the second battery via the DC/DC converter 410B.

When regenerative power is generated, for example during regenerative braking 520 or 522, the alternator 64 outputs a constant voltage (e.g., 13.3 volts). Accordingly as depicted, the battery system voltage 508 is maintained at a constant 13.3 volts. Additionally, the regenerative power generated by the alternator 64 charges the LTO/LMO battery 32. In the depicted embodiment, the second battery voltage 510 ranges between 11.7 volts (e.g., at 0% state of charge) and 13.2 volts (e.g., at 100% state of charge). In other words, the second battery voltage 510 is less than the 13.3 volts output by the alternator 64. Accordingly, in some embodiments, the DC/DC converter 410B may set the voltage (e.g., step down the bus voltage (e.g., 13.3 volts) to the second battery voltage (e.g., between 11.7-13.2 volts)) to charge the LTO/LMO battery 32.

When the LTO/LMO battery 32 supplies power to the electrical system, for example during cruising 524 or auto-stop 526, the DC/DC converter 410B may maintain the bus voltage at approximately the same voltage as output by the alternator 64. More specifically, since the second battery voltage 510 (e.g., between 11.8-13.2 volts) is less than the voltage output by the alternator 64 (e.g., 13.3 volts), the DC/DC converter 410B may step up the voltage output by the LTO/LMO battery 32. Accordingly, as depicted, the battery system voltage 508 is maintained generally at 13.3 volts. Furthermore, the LTO/LMO battery 32 may supply power until depleted. For example, as depicted, when the LTO/LMO battery 32 is depleted during auto-stop 526, the battery system voltage 508 decreases as the lead-acid battery 30 supplies power. Furthermore, after the LTO/LMO battery 32 is depleted, the lead-acid battery 30 supplies power to cold crank 528 and during acceleration 530.

In some embodiments described above, the DC/DC converter 410B is described as a bi-directional converter (e.g., boost-buck) that steps down the bus voltage to charge the second battery 32 and steps up the second battery voltage 510 to supply power to the electrical system 66. Additionally or alternatively, the DC/DC converter 410B may be a converter with a bypass path similar to the DC/DC converter described in FIG. 17 (e.g., input bypass). More specifically, the bypass path 418 may be selected when the LTO/LMO battery 32 is being charged to enable current to flow from the higher bus voltage (e.g., 13.3 volts) to the lower second battery voltage (e.g., between 11.8-13.2 volts). On the other hand, the converter path 420 may be selected when the LTO/LMO battery 32 is supplying power to step up the voltage output by the second battery.

Based on the various embodiments of the semi-active battery systems 58 described above, the control algorithm utilized by the battery control unit 34 may be more complex than the algorithm utilized for semi-passive battery systems 54. More specifically, in addition to controlling the alternator 64, the battery control unit 34 may control the operation of the DC/DC converter 410, which may include opening/closing internal switches in the DC/DC converter 410. For example, in some embodiments, the battery control unit 34 may utilize the DC/DC converter 410B to enable the second battery 32 to be more optimally charged (e.g., with a higher charging voltage) while protecting the lead-acid battery 30 from overvoltage. Accordingly, the battery control unit 34 may turn on/off the alternator 64 as well as open/close the internal switches in the DC/DC converter 410 to maintain each of the batteries 30 and 32 at their respective target states of charge. Additionally, the battery control unit 34 may control other operational parameter with the DC/DC converter 410, such as limiting current or voltage. Furthermore, when a converter with a bypass path (e.g., as described in FIGS. 16 and 17) is utilized, the battery control unit 34 may also control the operation of the converter switch 416 that selectively switches between the bypass path 418 and the converter path 420.

As described above, replacing the switches 286 and 288 in a switch battery system 56 with the first DC/DC converter 412 and the second DC/DC converter 414 results in an active battery system 60. As will be described in more detail below, including the first DC/DC converter 412 to selectively connect/disconnect the lead-acid battery 30 from the bus 68 may enable the battery system voltage to be generally maintained at a constant voltage (e.g., 13.3 volts) for the duration of the operation of the vehicle (e.g., between time 0 and time 8).

With the proceeding in mind, FIGS. 20A-20D describe the illustrative voltage of the active battery system 60 in relation to the hypothetical vehicle operation described above. FIGS. 20A-20D are XY plots that each includes a voltage curve that describes the dynamic voltage of the active battery system 60, a lead-acid battery voltage curve that describes the dynamic voltage of the lead-acid battery 30, and a second battery voltage curve that describes the dynamic voltage of the second battery 32 between time 0 and time 8, in which voltage is on the Y-axis and time is on the X-axis. More specifically, FIG. 20A describes an active battery system 60 with a non-voltage matched battery pairing, FIG. 20B describes an active battery system 60 with the first embodiment of a partial voltage matched battery pairing, FIG. 20C describes an active battery system 60 with the third embodiment of a partial voltage matched battery pairing, and FIG. 20D describes an active battery system 60 with a voltage matched battery pairing.

Active Architecture—Non-Voltage Matched

As described above, FIG. 20A depicts a battery system voltage curve 532, a lead-acid battery voltage curve 534, and a second battery voltage curve 424 when the lead-acid battery 30 and the second battery 32 are non-voltage matched. More specifically, the voltage curves 532, 534, and 536 are based on the voltage characteristics described in FIG. 5. In other words, a lead-acid battery 30 and a NMC battery 32. Similar to the non-voltage match embodiments described above, the lead-acid battery 30 may be maintained generally between 95-100% state of charge and the NMC battery 32 may be maintained generally at approximately 0% state of charge.

In the depicted embodiment, the lead-acid battery 30 supplies power to the electrical system 66 by itself during key-off 538, cold crank 540, acceleration 542, and cruising 544. More specifically, the lead-acid battery voltage 534 decreases as the state of charge decreases during key-off 538, sharply drops to cold crank 540 the internal combustion engine, and micro-cycles (e.g., between 13.3 volts and 12.8 volts) during acceleration 542 and cruising 544. During this period (e.g., between time 0 and time 3), the lead-acid battery voltage 534 may be stepped up to a constant voltage (e.g., 13.3 volts) by the first DC/DC converter 412 (e.g., boost converter). Accordingly, as depicted, the battery system voltage 532 is generally maintained at a constant 13.3 volts. Additionally, the NMC battery 32 may be maintained at approximately 0% state of charge and disconnected via the second DC/DC converter 414.

As regenerative power is generated, for example during regenerative braking 546 or 548, the alternator 64 outputs a constant voltage (e.g., 13.3 volts). Accordingly, as depicted, the battery system voltage 532 is maintained generally at a constant 13.3 volts. Additionally, to charge the NMC battery 32 with the constant 13.3 volts, the second DC/DC converter 414 may step up the voltage to match the second battery voltage 536. Furthermore, the lead-acid battery 30 may be disconnected via the first DC/DC converter 412. In other embodiments, the first DC/DC converter 412 may maintain the lead-acid battery 30 at its target operating point by controlling the voltage. Accordingly, as depicted, the second battery voltage 536 increases as the NMC battery 32 captures regenerative power and the lead-acid battery voltage 534 remains relatively constant (e.g., 12.9 volts).

Moreover, in some embodiments, the DC/DC converters 412 and 414 may enable the second battery 32 to be more efficiently charged while protecting the lead-acid battery 30 from overvoltage. For example, in the depicted embodiment to increase the charge power acceptance rate of the NMC battery 32, the second DC/DC converter 414 may boost the bus voltage up to the maximum charging voltage of the NMC battery 32 (e.g., 16.8 volts), which may be above the maximum charging voltage of the lead-acid battery 30 (e.g., overvoltage). However, the first DC/DC converter 412 may control the voltage applied to the lead-acid battery 30 to protect the lead-acid battery 30 from overvoltage.

As the NMC battery 32 supplies power to the electrical system 66, for example during cruising 550 or auto-stop 552, the second DC/DC converter 414 may step down the second battery voltage 536 to match the voltage output by the alternator 64. Accordingly, as depicted, the second battery voltage 536 decreases as the NMC battery 32 supplies power and the battery system voltage 532 is maintained at 13.3 volts. Furthermore, the NMC battery 32 may continue supplying power until depleted. Accordingly, as depicted, the NMC battery 32 supplies power to warm crank 554 the internal combustion engine and during acceleration 556. Once depleted, the NMC battery 32 may be disconnected via the second DC/DC converter 414 and the lead-acid battery may be connected via the first DC/DC converter 412 to supply power to the electrical system 66.

Active Architecture—First Embodiment Partial Voltage Matched

As described above, FIG. 20B describes an active battery system when the batteries 30 and 32 are partial voltage matched, in accordance with the first embodiment. FIG. 20B depicts a battery system voltage curve 558, a lead-acid battery curve 560, and a second battery voltage curve 562. More specifically, the voltage curves 558, 560, and 562 are based on the voltage characteristics described in FIG. 6. In other words, a lead-acid battery 30 and a LTO/NMC battery 32. Similar to the first partial voltage match embodiments described above, the lead-acid battery 30 may be maintained generally between 95-100% state of charge and the LTO/NMC battery 32 may be generally maintained above the threshold voltage (e.g., 50% state of charge).

Figure 20A:
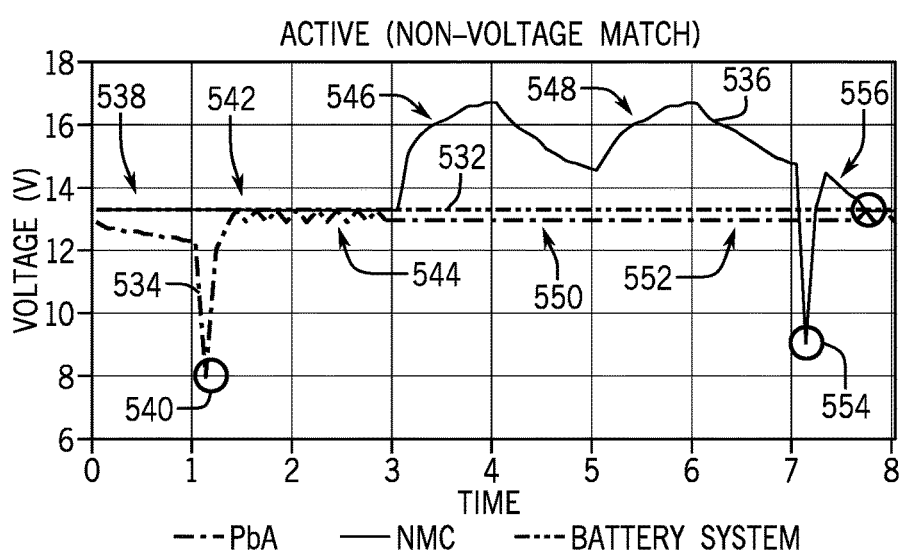
FIG. 20A is a graph illustrating the voltage of an active battery system with non-voltage matched battery chemistries for the vehicle described in FIG. 9, in accordance with an embodiment of the present approach.
Figure 20B:
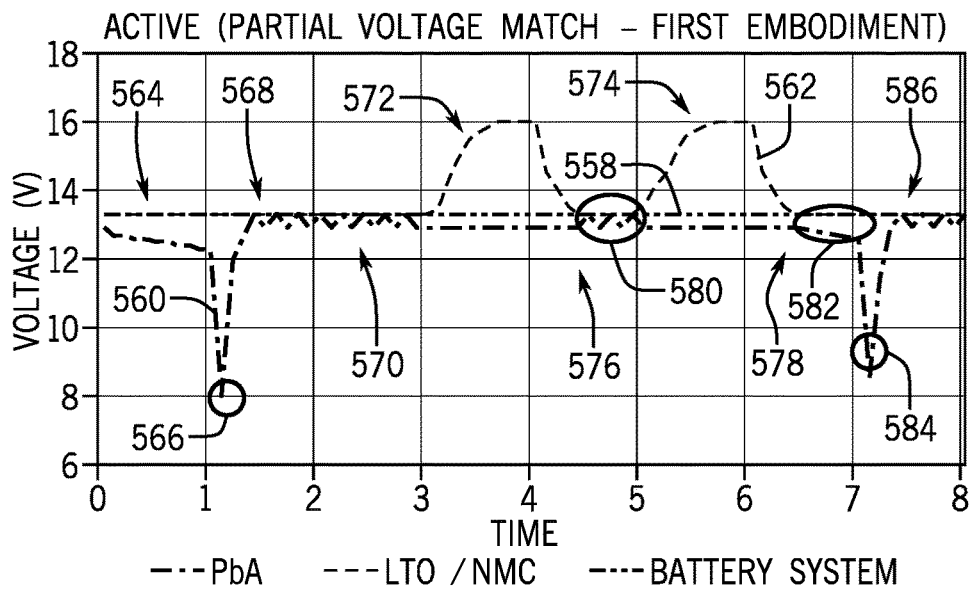
FIG. 20B is a graph illustrating the voltage of a first embodiment of an active battery system with partial voltage matched battery chemistries for the vehicle described in FIG. 9, in accordance with an embodiment of the present approach.

Operationally, the present embodiment may be similar to the non-voltage matched embodiment described in FIG. 20A. More specifically, the lead-acid battery 30 supplies power to the electrical system 66 by itself during key-off 564, cold crank 566, acceleration 568, and cruising 570. During this period (e.g., between time 0 and time 3), the lead-acid battery voltage 560 may be stepped up to a constant voltage (e.g., 13.3 volts) by the first DC/DC converter 412 (e.g., boost converter) and the LTO/NMC battery 32 may be maintained at approximately 50% state of charge and disconnected via the second DC/DC converter 414.

Accordingly, as depicted, the battery system voltage 558 and the second battery voltage 562 remain relatively constant at approximately 13.3 volts. Additionally, as regenerative power is generated (e.g., regenerative braking 572 or 574), the alternator 64 outputs a constant voltage (e.g., 13.3 volts), the second DC/DC converter 414 steps up the voltage to match the second battery voltage 562, and the lead-acid battery 30 is disconnected via the first DC/DC converter 412. Accordingly, as depicted, the battery system voltage 558 is maintained generally at a constant 13.3 volts, the second battery voltage 562 increases as the LTO/NMC battery 32 captures regenerative power, and the lead-acid battery voltage 534 remains relatively constant (e.g., 12.9 volts). Additionally, as described above, the DC/DC converters 412 and 414 may enable the second battery 32 to be charge at a voltage up to the maximum charging voltage of the LTO/NMC battery 32 (e.g., 16.8 volts) while protecting the lead-acid battery 30 from overvoltage.

Furthermore, as the LTO/NMC battery 32 supplies power to the electrical system 66 (e.g., during cruising 576 or auto-stop 578), the second DC/DC converter 414 steps down the second battery voltage 562 to match the voltage output by the alternator 64. Accordingly, as depicted, the second battery voltage 562 decreases as the LTO/NMC battery 32 supplies power and the battery system voltage 532 is maintained at 13.3 volts.

Furthermore, the LTO/NMC battery 32 may continue supplying power until the second battery voltage 562 reaches the threshold voltage (e.g., 13.3 volts). Once the threshold voltage is reached, the LTO/NMC battery 32 may be disconnected via the second DC/DC converter 414 and the lead-acid battery 30 may be connected via the first DC/DC converter 412 to enable the lead-acid battery 30 to supply power. For example, as depicted, when the threshold voltage is reached during cruising 576, the lead-acid battery 30 may be micro-cycled 580. Additionally, when the threshold voltage is reached during auto-stop 578, the lead-acid battery state of charge may decrease as the lead-acid battery 30 discharges 582. Furthermore, since the second battery voltage 562 has reached the threshold voltage, the lead-acid battery may supply power to the electrical system 66 during warm crank 584 and acceleration 586. During this period, the first DC/DC converter 412 may step up the voltage output by the lead-acid battery 30 to match the voltage output by the alternator 64. Accordingly, as depicted, the battery system voltage 558 remains constant at 13.3 volts.

Active Architecture—Third Embodiment Partial Voltage Matched

Figure 20C:
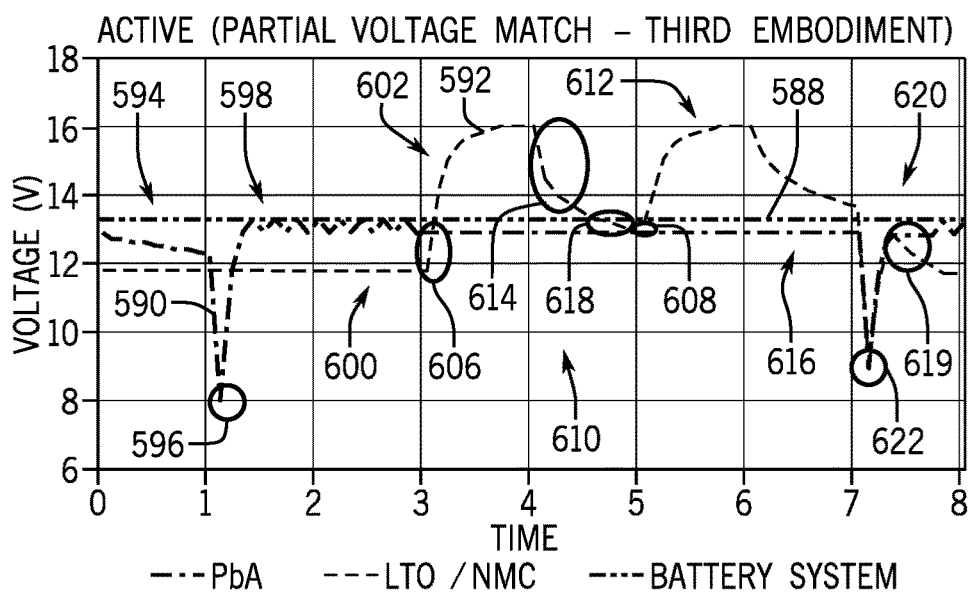
FIG. 20C is a graph illustrating the voltage of a third embodiment of an active battery system with partial voltage matched battery chemistries for the vehicle described in FIG. 9, in accordance with an embodiment of the present approach.

As with the first embodiment of the semi-active battery system with partial voltage matched batteries described in FIG. 18B, the storage capacity of the LTO/NMC battery 32 may be limited because the threshold voltage is increased to 13.3 volts. Accordingly, a bi-direction converter (e.g., boost-buck converter) may similarly be used. Illustratively, FIG. 20C depicts a battery system voltage curve 588, a lead-acid battery voltage curve 590, and a second battery voltage curve 592 when the batteries 30 and 32 are partial voltage matched, in accordance with the third embodiment. As in the semi-active embodiment, the lead-acid battery 30 may be generally maintained between 95-100% state of charge and the LTO/NMC battery 32 may generally be maintained at 0% state of charge.

Similar to the first partial voltage match battery system described in FIG. 20B, the lead-acid battery 30 supplies power to the electrical system 66 by itself during key-off 594, cold crank 596, acceleration 598, and cruising 600. During this period (e.g., between time 0 and time 3), the lead-acid battery voltage 590 may be stepped up to a constant voltage (e.g., 13.3 volts) by the first DC/DC converter 412 (e.g., boost converter) and the LTO/NMC battery 32 may be maintained at approximately 0% state of charge and disconnected via the second DC/DC converter 414. Accordingly, as depicted, the battery system voltage 588 remains relatively constant at 13.3 volts.

When regenerative power is generated, for example during regenerative braking 602 or 604, the alternator 64 outputs a constant voltage (e.g., 13.3 volts). Accordingly, as depicted, the battery system voltage 588 is maintained at a relatively constant 13.3 volts. To charge the LTO/NMC battery 32, when the second battery voltage 592 is less that the bus voltage (e.g., charging 606 or 608), the second DC/DC converter 414 may step down the bus voltage (e.g., 13.3 volts) to the second battery voltage 592. Additionally, when the second battery voltage 592 is greater than the bus voltage, the second DC/DC converter 414 may step up the bus voltage to the second battery voltage 592. Furthermore, as described above, the DC/DC converters 412 and 414 may enable the second battery 32 to be charge at a voltage up to the maximum charging voltage of the LTO/NMC battery 32 (e.g., 16.8 volts) while protecting the lead-acid battery 30 from overvoltage.

When the LTO/NMC battery 32 supplies power to the electrical system 66, for example during cruising 610 or auto-stop 612, the second DC/DC converter 414 may maintain the bus voltage at approximately the voltage output by the alternator 64 (e.g., 13.3 volts). For example, as depicted, when the second battery voltage 592 is greater than 13.3 volts (e.g., discharging 614 or auto-stop 616) the second DC/DC converter 414 may step down the voltage. On the other hand, when the second battery voltage is less than 13.3 volts (e.g., discharging 618 and 619), the second DC/DC converter 414 may step up the voltage. Accordingly, as depicted, the battery system voltage 588 is generally maintained at 13.3 volts during this period.

Furthermore, the LTO/NMC battery 32 may continue to supply power until depleted. For example, as depicted, the LTO/NMC battery 32 may supply power during acceleration 620 until depleted and may supplement the lead-acid battery 30 to warm crank 622 the internal combustion engine. More specifically, both the lead-acid battery 30 and the LTO/NMC battery 32 may be connected via the first DC/DC converter 412 and the second DC/DC converter 414 to warm crank 622. As in the embodiments described above, the battery control unit 34 may determine whether to warm crank with the lead-acid battery 30, the second battery 32, or both depending on the state of charge of each battery and the minimum state of charge for performing each vehicle operation (e.g., warm crank 622). Once depleted, the LTO/NMC battery 32 may be disconnected via the second DC/DC converter 414 and the lead-acid battery 30 may be connected via the first DC/DC converter 412 to enable the lead-acid battery 30 to supply power.

Active Architecture—Voltage Matched

Figure 20D:
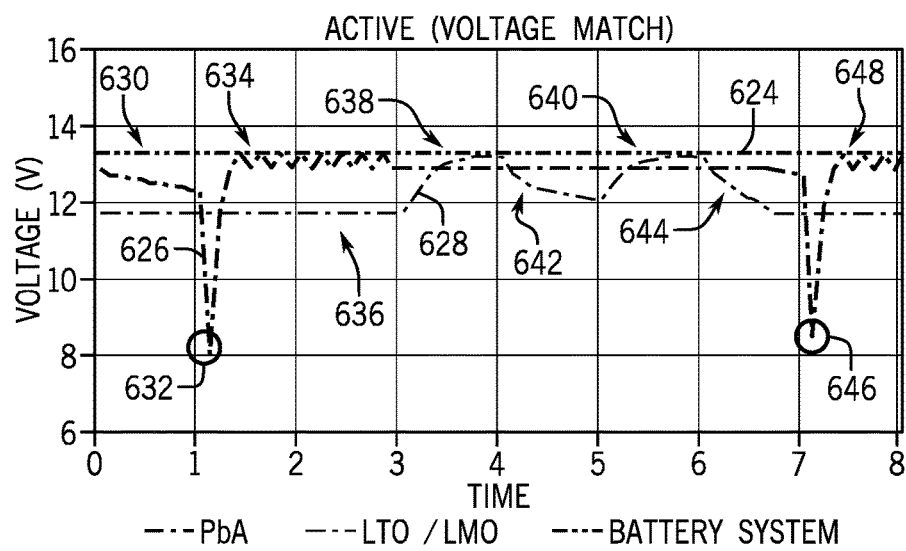
FIG. 20D is a graph illustrating the voltage of an active battery system with voltage matched battery chemistries for the vehicle described in FIG. 9, in accordance with an embodiment of the present approach.

As described above, FIG. 20D describes an active battery system when the batteries 30 and 32 are voltage matched. FIG. 20D depicts a battery system voltage curve 624, a lead-acid battery voltage curve 626, and a second battery voltage curve 628. More specifically, the voltage curves 624, 626, and 628 are based on the voltage characteristics described in FIG. 7. In other words, a lead-acid battery 30 and a LTO/LMO battery 32. Additionally, similar to the third partial voltage match embodiment described in FIG. 20C, the lead-acid battery 30 may generally be maintained between 95-100% state of charge and the LTO/LMO battery 32 may be maintained generally at 0% state of charge even though the second battery voltage 628 is less than the threshold voltage to enable the second battery to utilize its full storage capacity to capture regenerative power.

Similar to the partial voltage match embodiment described in FIG. 20C, the lead-acid battery 30 supplies power to the electrical system 66 by itself during key-off 630, cold crank 632, acceleration 634, and cruising 636. During this period (e.g., between time 0 and time 3), the lead-acid battery voltage 626 may be stepped up to a constant voltage (e.g., 13.3 volts) by the first DC/DC converter 412 (e.g., boost converter) and the LTO/LMO battery 32 may be maintained at approximately 0% state of charge and disconnected via the second DC/DC converter 414. Accordingly, as depicted, the battery system voltage 624 remains relatively constant at 13.3 volts.

When regenerative power is generated (e.g., regenerative braking 638 or 640), the alternator 64 outputs a constant voltage (e.g., 13.3 volts) and the lead-acid battery 30 is disconnected via the first DC/DC converter 412. To charge the LTO/LMO battery 32, the second DC/DC converter 414 may set the voltage (e.g., step down the bus voltage (e.g., 13.3 volts) to the second battery voltage (e.g., between 11.7-13.2 volts)). Accordingly, as depicted, the battery system voltage 624 is maintained at a relatively constant 13.3 volts, the lead-acid battery voltage 626 is maintained at a relatively constant 12.9 volts, and the second battery voltage 628 increases as the LTO/LMO battery 32 captures regenerative power.

When the LMO/LTO battery 32 supplies power to the electrical system 66 (e.g., cruising 642 or auto-stop 644), the second DC/DC converter 414 may maintain the bus voltage at approximately the same voltage output by the alternator 64 (e.g., 13.3 volts) by stepping up the second battery voltage (e.g., 11.7-13.2 volts). Accordingly, as depicted, the battery system voltage 624 is maintained at a relatively constant 13.3 volts and the second battery voltage 626 decreases as the LMO/LTO battery 32 supplies power.

Furthermore, the LMO/LTO battery 32 may continue to supply power until depleted. Once depleted, the LMO/LTO battery 32 may be disconnected via the second DC/DC converter 414 and the lead-acid battery 30 may be connected via the first DC/DC converter 412. Additionally, the first DC/DC converter 412 steps up the lead-acid battery voltage 626 to match the voltage output by the alternator 64. According, as depicted, when the LTO/NMC battery 32 is depleted during auto-stop 644, lead-acid battery voltage 626 decreases as the lead-acid battery 30 supplies power and the battery system voltage 624 is maintained relatively constant at 13.3 volts. Furthermore, since the LMO/LTO battery is depleted, the lead-acid battery 30 may supply power to cold crank 646 and during acceleration 648. During these periods, the first DC/DC converter 412 may continue stepping up the lead-acid battery voltage 626 to maintain the battery system voltage 624 relatively constant.

Based on the various embodiments of the active battery systems 60 described above, the control algorithm utilized by the battery control unit 34 may be more complex than the algorithm utilized for semi-active battery systems 58 and switch passive battery systems 56. More specifically, in addition to controlling the alternator 64, the battery control unit 34 may control the operation of both the first DC/DC converter 412 and the second DC/DC converter 414, which may include opening/closing internal switches in each. For example, in some embodiments, the battery control unit 34 may utilize the DC/DC converters 412 and 414 to enable the second battery 32 to be more optimally charged (e.g., with a higher charging voltage) while protecting the lead-acid battery 30 from overvoltage. Accordingly, the battery control unit 34 may turn on/off the alternator 64 as well as open/close the internal switches in the DC/DC converters 412 and 414 to maintain each of the batteries 30 and 32 at their respective target states of charge. Additionally, the battery control unit 34 may control other operational parameter with the DC/DC converters 412 and 414, such as limiting current or voltage.

In each of the active battery system 60 embodiments described above, the battery system voltage (e.g., 532, 558, 588, and 624) remains relatively constant during operation of the vehicle (e.g., time 0 to time 8). More specifically, in each of the embodiments, the second DC/DC converter 414 is described as a bi-directional converter (e.g., boost-buck converter) to bi-directionally step up or step down voltage. For example, in the non-voltage match embodiment described in FIG. 20A, the second DC/DC converter 414 steps up the bus voltage to charge the second battery 32 and steps down the second battery voltage to supply a constant voltage (e.g., 13.3 volts). However, as described above, DC/DC converters may be less than 100% efficient. Additionally, the cost of a bi-directional converter may be greater than a converter with a bypass path 418 as described in FIGS. 16 and 17. Accordingly, the active battery system embodiments described above may alternatively utilize a second DC/DC converter 414 with a bypass path 418. Illustratively, in the non-voltage match embodiment, the second battery 32 may discharge (e.g., during cruising or auto-stop) via the bypass path 418 due to the higher voltage.

Figure 21:
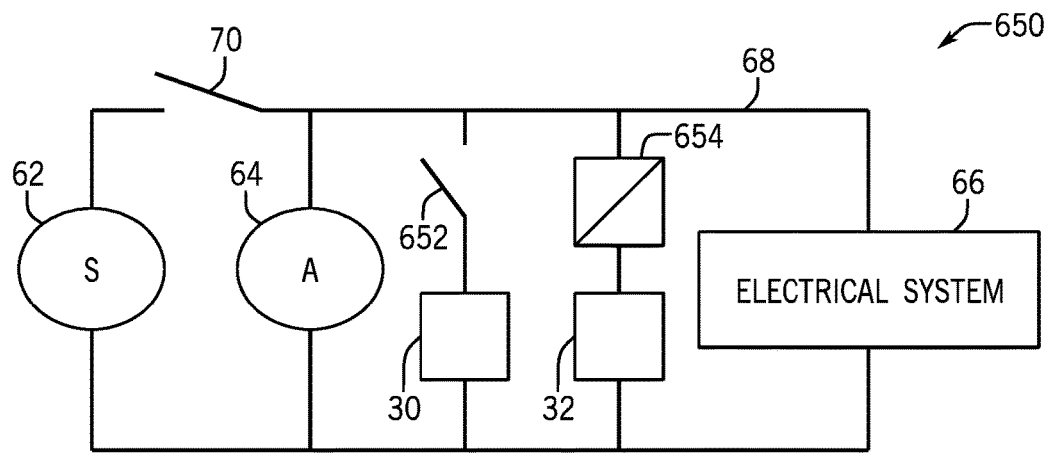
FIG. 21 is a schematic diagram of a switch-active battery architecture, in accordance with an embodiment of a present approach.

As described above, starting (e.g., cranking) the internal combustion engine 18 may require a significant amount of power. In some embodiments, the starter 62 may utilize 5 kW or more. However, DC/DC converters capable of meeting such power requirements may be costly. Accordingly, FIG. 21 depicts an embodiment of a switch active battery system 650. As depicted, a switch 652 is included between the lead-acid battery 30 and the bus 68, and a DC/DC converter 654 is included between the second battery 32 and the bus 68. Thus, the switch 652 selectively connects/disconnects the lead-acid battery 30 and the DC/DC converter 654 selectively connects/disconnects the second battery 32. More specifically, the switch 652 is utilized because switches are generally less costly and more robust by enabling more power to pass through when compared to a DC/DC converter. Additionally, the switch 652 may be included to selectively connect the lead-acid battery 30 because the lead-acid battery may be capable of providing a larger amount of power as compared to the second battery 32. Additionally or alternatively, the switch 652 and the DC/DC converter 654 may be switched.

The described techniques enable improved power storage and power distribution efficiency for battery systems in vehicular contexts (e.g., micro-hybrid and regenerative braking vehicles) as well as other energy storage/expending applications (e.g., energy storage for an electrical grid). In some embodiments, the techniques described herein may increase fuel economy and/or reduce undesirable emissions by 3-5% as compared to traditional battery systems (e.g., a single 12 volt lead-acid battery) because the load on the alternator is reduced by more efficiently capturing regenerative power, which may then be used to supply electrical power to the vehicle's electrical system 66 in place of the alternator (e.g., fuel energy).

More specifically, in some embodiments, the disclosed battery system includes a battery 30 and a second battery 32 that each utilizes a different battery chemistry (e.g., lead-acid or nickel manganese cobalt oxide). Additionally, the battery 30 and the second battery 32 are arranged in various parallel architectures such as passive, semi-passive, switch passive, semi-active, active, or switch active. As described above, the various architectures may provide varying levels of control over the battery system via switches and/or DC/DC converters. Based on the battery chemistries and architecture selected, the battery 30 and the second battery 32 may operate in tandem. For example, the first battery 30 may be capable of supplying large amounts of current while the second battery (e.g., power device) 32 may be capable of efficiently capturing, storing, and distributing regenerative power because of its higher coulombic efficiency and/or higher power charge rate. In other words, the first battery may be the primary source of electrical power and the second battery may supplement the first battery, which may also enable a reduction in the battery's storage capacity. Furthermore, the batteries utilized in the battery system may generally conform with a traditional battery system by outputting voltages ranging between 7-18 volts.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. An automotive battery module comprising:
   a housing;
   a first terminal and a second terminal coupled to the housing of the automotive battery module;
   a first battery that utilizes a first battery chemistry, wherein the first battery is disposed in the housing and electrically coupled to the second terminal of the automotive battery module;
   a second battery that utilizes a second battery chemistry different from the first battery chemistry, wherein the second battery is disposed in the housing and electrically coupled to the second terminal of the automotive battery module;
   one or more switching devices disposed in the housing and electrically coupled between the first terminal and the second terminal of the automotive battery module; and
   a battery control unit disposed in the housing of the automotive battery module, wherein the battery control unit is communicatively coupled to each of the one or more switching devices to enable the battery control unit to selectively control a first electrical connection between the first battery and the first terminal of the automotive battery module, a second electrical connection between the second battery and the first terminal of the automotive battery module, or both.

2. The automotive battery module of claim 1, wherein:
   the one or more switching devices comprise a first switching device electrically between the first battery and the first terminal of the automotive battery module; and
   the battery control unit is configured to selectively control the first electrical connection between the first battery and the first terminal by controlling switching of the first switching device.

3. The automotive battery module of claim 2, wherein:
   the one or more switching devices comprise a second switching device electrically between the second battery and the first terminal of the automotive battery module; and
   the battery control unit is configured to selectively control the second electrical connection between the second battery and the first terminal by controlling switching of the second switching device.

4. The automotive battery module of claim 2, wherein the battery control unit is configured to control switching of the first switching device by:
   instructing the first switching device to switch from an open position to a closed position, to maintain the closed position, or both to enable the first electrical connection between the first battery and the first terminal of the automotive battery module; and
   instructing the first switching device to switching from the open position to the closed position, to maintain the open position, or both to disable the first electrical connection between the first battery and the first terminal of the automotive battery module.

5. The automotive battery module of claim 2, wherein:
   the second battery is electrically coupled to the first terminal of the automotive battery module;
   the second battery chemistry provides a higher charging efficiency compared to the first battery chemistry; and
   the battery control unit is configured to control switching of the first switching device by instructing the first switching device to switch from an open position to a closed position, to maintain the closed position, or both when electrical energy is being supplied to the automotive battery module from a regenerative braking system.

6. The automotive battery module of claim 1, wherein:
   the first battery chemistry is a lithium nickel manganese cobalt oxide battery chemistry, a lithium nickel cobalt aluminum oxide battery chemistry, a lithium nickel manganese cobalt oxide-lithium nickel cobalt aluminum oxide battery chemistry, a lithium-titanate/lithium nickel manganese cobalt oxide batter chemistry, a nickel-metal hydride battery chemistry, or a lithium iron phosphate battery chemistry; and
   the first battery chemistry is a lead-acid battery chemistry.

7. The automotive battery module of claim 1, wherein:
the first battery comprises a first one or more battery cells each configured to store electrical energy using a first electrochemical reaction; and
the second battery comprises a second one or more battery cells each configured to store electrical energy using a second electrochemical reaction different from the first electrochemical reaction.

8. The automotive battery module of claim 1, wherein the housing is a single continuous housing.

9. The automotive battery module of claim 1, wherein the automotive battery module is a twelve volt battery module.

10. A method for implementing an automotive battery module, comprising:
disposing a first battery implemented using a first battery chemistry in a housing of the automotive battery module;
electrically coupling the first battery to a first terminal of the automotive battery module;
disposing a second battery implemented using a second battery chemistry different from the first battery chemistry in the housing of the automotive battery module;
electrically coupling the second battery to the first terminal of the automotive battery module;
electrically coupling one or more switching devices between the first terminal and a second terminal of the automotive battery module;
coupling a battery control unit to the housing of the automotive battery module; and
communicatively coupling the battery control unit to each of the one or more switching devices to enable the battery control unit to selectively control a first electrical connection between the first battery and the second terminal of the automotive battery module, a second electrical connection between the second battery and the second terminal of the automotive battery module, or both.

11. The method of claim 10, wherein:
electrically coupling the one or more switching devices between the first terminal and the second terminal comprises electrically coupling a first switching device between the first battery and the second terminal of the automotive battery module; and
communicatively coupling the battery control unit to each of the one or more switching devices comprises communicatively coupling the battery control unit to the first switching device to enable the battery control unit to selectively control the first electrical connection between the first battery and the second terminal by controlling switching of the first switching device.

12. The method of claim 11, wherein:
electrically coupling the one or more switching devices between the first terminal and the second terminal comprises electrically coupling a second switching device between the second battery and the second terminal of the automotive battery module; and
communicatively coupling the battery control unit to each of the one or more switching devices comprises communicatively coupling the battery control unit to the second switching device to enable the battery control unit to selectively control the second electrical connection between the second battery and the second terminal by controlling switching of the second switching device.

13. The method of claim 10, comprising electrically coupling the second battery to the second terminal of the automotive battery module, wherein:
electrically coupling the one or more switching devices between the first terminal and the second terminal comprises electrically coupling a switching device between the first battery and the second terminal of the automotive battery module; and
communicatively coupling the battery control unit to each of the one or more switching devices comprises communicatively coupling the battery control unit to the switching device to enable the battery control unit to instruct the switching device to switch from an open position to a closed position, to maintain the closed position, or both when electrical energy is being supplied to the automotive battery module from a regenerative braking system.

14. The method of claim 10, wherein communicatively coupling the battery control unit to each of the one or more switching devices comprises communicatively coupling the battery control unit to a first switching device to enable the battery control unit to:
instruct the first switching device to switch from an open position to a closed position, to maintain the closed position, or both to form the first electrical connection between the first battery and the second terminal of the automotive battery module; and
instruct the first switching device to switching from the open position to the closed position, to maintain the open position, or both to break the first electrical connection between the first battery and the second terminal of the automotive battery module.

15. The method of claim 10, comprising:
electrically coupling a plurality of lead-acid battery cells in series to implement the first battery; and
electrically coupling a plurality of lithium-ion battery cells in series to implement the second battery.

16. The method of claim 10, wherein coupling the battery control unit to the housing comprises:
disposing the battery control unit within the housing of the automotive battery module; or
coupling the battery control unit to an exterior surface of the automotive battery module.

17. A battery system configured to be electrically coupled to an electrical system of an automotive vehicle, comprising:
a lead-acid battery;
a lithium nickel manganese cobalt oxide battery coupled in series with a first relay, wherein the lithium nickel manganese cobalt oxide battery and the first relay are coupled in parallel with the lead-acid battery; and
a control unit communicatively coupled to the first relay, wherein the control unit is configured to:
determine whether electrical power being supplied to the battery system is greater than a maximum charging power of the lithium nickel manganese cobalt oxide battery; and
instruct the first relay to switch from a closed position to an open position, to maintain the open position, or both to electrically disconnect the lithium nickel manganese cobalt oxide battery when the electrical power being supplied to the battery system is greater than the maximum charging power of the lithium nickel manganese cobalt oxide battery.

18. The battery system of claim 17, comprising:
a housing, wherein the lead-acid battery, the lithium nickel manganese cobalt oxide battery, and the relay are disposed within the housing; and a first terminal and a second coupled to the housing, wherein:
   the lead-acid battery is electrically coupled between the first terminal and the second terminal; and
   lithium nickel manganese cobalt oxide battery and the relay are coupled in series between the first terminal and the second terminal.

19. The battery system of claim 17, wherein, to determine whether the electrical power being supplied to the battery system is greater than the maximum charging power, the control unit is configured to determine whether voltage of the electrical power being supplied to the battery system is greater than a maximum charging voltage of the lithium nickel manganese cobalt oxide battery.

20. The battery system of claim 17, wherein, to determine whether the electrical power being supplied to the battery system is greater than the maximum charging power, the control unit is configured to determine whether current of the electrical power being supplied to the battery system is greater than a maximum charging current of the lithium nickel manganese cobalt oxide battery.

\* \* \* \* \*